United States Patent
Park et al.

(10) Patent No.: US 12,160,310 B2
(45) Date of Patent: Dec. 3, 2024

(54) SEMI-DYNAMIC RATE MATCHING

(71) Applicant: QUALCOMM Incorporated, San Diego, CA (US)

(72) Inventors: Sungwoo Park, San Diego, CA (US); Tao Luo, San Diego, CA (US); Mostafa Khoshnevisan, San Diego, CA (US); Xiaoxia Zhang, San Diego, CA (US); Jing Sun, San Diego, CA (US); Wooseok Nam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 194 days.

(21) Appl. No.: 16/805,623

(22) Filed: Feb. 28, 2020

(65) Prior Publication Data

US 2020/0304232 A1    Sep. 24, 2020

Related U.S. Application Data

(60) Provisional application No. 62/821,984, filed on Mar. 21, 2019.

(51) Int. Cl.
*H04L 1/00* (2006.01)
*H04W 72/1273* (2023.01)
*H04W 72/23* (2023.01)

(52) U.S. Cl.
CPC ....... *H04L 1/0013* (2013.01); *H04W 72/1273* (2013.01); *H04W 72/23* (2023.01)

(58) Field of Classification Search
CPC ... H04L 1/0013; H04L 5/0096; H04L 5/0051; H04L 5/0044; H04L 5/0023;
(Continued)

(56) References Cited

U.S. PATENT DOCUMENTS

2020/0107400 A1* 4/2020 Sun ................ H04B 7/024
2020/0383091 A1* 12/2020 Park ................ H04W 72/23
(Continued)

FOREIGN PATENT DOCUMENTS

WO    WO-2019090774 A1    5/2019
WO    WO-2020201995 A1    10/2020

OTHER PUBLICATIONS

3GPP, "5G; NR; Multiplexing and channel coding (3GPP TS 38.212 version 15.2.0 Release 15)"; 3GPP ETSI TS 138.212 version 15.2.0 V15.2., Section 7.3.1.2.2 Format 1_1. p. 91. (Year: 2018).*
(Continued)

*Primary Examiner* — Huy D Vu
*Assistant Examiner* — Robert Ma
(74) *Attorney, Agent, or Firm* — Holland & Hart LLP

(57) ABSTRACT

Methods, systems, and devices for wireless communications are described. A UE may communicate with a set of transceiver nodes (e.g., transmission reception points (TRPs)) in a first transceiver node operation mode (e.g., a multi-TRP mode). A first transceiver node of the set of transceiver nodes may receive, from a second of the set of transceiver nodes, an indication to switch between rate matching states. The first transceiver node may switch from a first rate matching state to a second rate matching state and may transmit a downlink shared channel based on a resource configuration associated with the second rate matching state. The UE may receive the shared channel based on an antenna port configuration determined by the UE based on the first transceiver node operation and rate matching information. The rate matching information may be provided by the first transceiver node.

26 Claims, 26 Drawing Sheets

(58) Field of Classification Search
CPC ............ H04L 5/0035; H04W 72/1273; H04W 72/1289; H04B 7/0413
See application file for complete search history.

(56) References Cited

U.S. PATENT DOCUMENTS

| | | | |
|---|---|---|---|
| 2021/0337548 A1* | 10/2021 | Gao | H04W 72/23 |
| 2022/0104244 A1* | 3/2022 | Matsumura | H04L 1/1614 |
| 2022/0116180 A1* | 4/2022 | Liu | H04W 72/0453 |
| 2022/0167321 A1* | 5/2022 | Zhang | H04L 5/0044 |
| 2022/0217729 A1* | 7/2022 | Kim | H04W 72/1263 |

OTHER PUBLICATIONS

3GPP, "5G; NR; Physical layer procedure for data (3GPP TS 38.214 version 156.3.0 Release 15)", 3GPP ETSI TS 138.214 V15.3, Section 5.1.5 Antenna Ports quasi co-location, p. 26. (Year: 2018).*
Huawei, et al., "Enhancements on Multi-TRP/panel Transmission," 3GPP Draft, 3GPP TSG RAN WG 1 Meeting #96, R1-1901567, 3rd Generation Partnership Project (3GPP), Mobile Competence Centre, 650, Route Des Lucioles, F-06921, Sophia-Antipolis Cedex, France, vol. RAN WG1, No. Athens, Greece; Feb. 25, 2019-Mar. 1, 2019, Feb. 16, 2019 (Feb. 16, 2019), XP051599264, 14 pages, Retrieved from the Internet: URL: http://www.3gpp.org/ftp/tsg%5Fran/WG1%5FRL1/TSGR1%5F96/Docs/R1%2D1901567%2Ezip [retrieved on Feb. 16, 2019], paragraph [2.1.3].
Partial International Search Report—PCT/US2020/020683—ISA/EPO—May 28, 2020 (191857WO).
ZTE: "Enhancements on Multi-TRP/Panel Transmission," 3GPP Draft, 3GPP TSG RAN WG1 #96, R1-1901634, Enhancements on Multi-TRP/Panel Transmission, 3rd Generation Partnership Project (3GPP), Mobile Competence Centre, 650, Route Des Lucioles, F-06921, Sophia-Antipolis Cedex, France, vol. RAN WG1, No. Athens. Greece; Feb. 25, 2019-Mar. 1, 2019, Feb. 16, 2019 (Feb. 16, 2019), XP051599331, 19 pages, Retrieved from the Internet: URL: http://www.3gpp.org/ftp/tsg%5Fran/WG1%5FRL1/TSGR1%5F96/Docs/R1%2D1901634%2Ezip [retrieved on Feb. 16, 2019] paragraph [02.1]—paragraph [02.2]<span id="_wysihtml5-undo" class="_wysihtml5-temp">.
International Search Report and Written Opinion—PCT/US2020/020683—ISA/EPO—Aug. 19, 2020 (191857WO).

* cited by examiner

SEMI-DYNAMIC RATE MATCHING

CROSS REFERENCE

The present application for patent claims the benefit of U.S. Provisional Patent Application No. 62/821,984 by PARK et al., entitled "SEMI-DYNAMIC RATE MATCHING," filed Mar. 21, 2019, assigned to the assignee hereof, and expressly incorporated herein.

BACKGROUND

The following relates generally to wireless communications, and more specifically to semi-dynamic rate matching.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some cases, a UE may communicate with a set of transceiver nodes. If the UE is only communicating with a first transceiver node of the set of transceiver nodes, the UE may receive downlink transmissions with a first configuration from the first transceiver node. If the UE is communicating with multiple of the set of transceiver nodes, the UE may receive downlink transmissions with a second configuration from the first transceiver node. The downlink transmissions with the second configuration may contain less resource elements (REs) dedicated to downlink data than the first configuration. As such, the first transceiver node may convey less data to the UE per slot when operating with other transceiver nodes.

SUMMARY

The described techniques relate to improved methods, systems, devices, and apparatuses that support semi-dynamic rate matching. Generally, the described techniques provide for transceiver nodes to convey more data to a UE per slot when operating in a multi-transceiver-node mode. For example, a first and second transceiver node may coordinate with each other such that a physical downlink shared channel (PDSCH) transmitted from the first transceiver node when both transceiver nodes are transmitting has a different configuration (e.g., a different number of resource elements (REs) devoted to PDSCH data) than a PDSCH transmitted from the first transceiver node when the first transceiver node is transmitting alone.

A UE may communicate with a set of transceiver nodes (e.g., transmission reception points (TRPs)) in a first transceiver node operation mode (e.g., a multi-TRP mode). A first transceiver node of the set of transceiver nodes may receive, from a second of the set of transceiver nodes, an indication to switch between rate matching states. The first transceiver node may switch from a first rate matching state to a second rate matching state and may transmit a downlink shared channel based on a resource configuration associated with the second rate matching state. In some cases, there may be a delay between receiving the indication to switch between rate matching states and switching from the first rate matching state. During such a delay, the first transceiver node may transmit downlink shared channels based on a resource configuration associated with the first rate matching state.

The UE may receive the PDSCH based on an antenna port configuration determined by the UE based on the first transceiver node operation and rate matching information. The rate matching information may be provided by the first transceiver node. In some cases, the UE may determine the antenna port configuration by consulting an antenna port mapping table.

A method of wireless communications at a UE is described. The method may include identifying a transceiver node operation mode for the UE, receiving an indication of rate matching information for a downlink shared channel for the UE, determining an antenna port configuration for the downlink shared channel based on the transceiver node operation mode and the rate matching information, and monitoring for the downlink shared channel based on the antenna port configuration.

An apparatus for wireless communications at a UE is described. The apparatus may include a processor, memory in electronic communication with the processor, and instructions stored in the memory. The instructions may be executable by the processor to cause the apparatus to identify a transceiver node operation mode for the UE, receive an indication of rate matching information for a downlink shared channel for the UE, determine an antenna port configuration for the downlink shared channel based on the transceiver node operation mode and the rate matching information, and monitor for the downlink shared channel based on the antenna port configuration.

Another apparatus for wireless communications at a UE is described. The apparatus may include means for identifying a transceiver node operation mode for the UE, receiving an indication of rate matching information for a downlink shared channel for the UE, determining an antenna port configuration for the downlink shared channel based on the transceiver node operation mode and the rate matching information, and monitoring for the downlink shared channel based on the antenna port configuration.

A non-transitory computer-readable medium storing code for wireless communications at a UE is described. The code may include instructions executable by a processor to identify a transceiver node operation mode for the UE, receive an indication of rate matching information for a downlink shared channel for the UE, determine an antenna port configuration for the downlink shared channel based on the transceiver node operation mode and the rate matching information, and monitor for the downlink shared channel based on the antenna port configuration.

Some examples of the method, apparatuses, and non-transitory computer-readable medium described herein may further include operations, features, means, or instructions for identifying an antenna port mapping table of a set of antenna port mapping tables based on the transceiver node operation mode, and determining the antenna port configuration for the downlink shared channel based on the antenna port mapping table.

Some examples of the method, apparatuses, and non-transitory computer-readable medium described herein may further include operations, features, means, or instructions for receiving a downlink control channel that includes the indication of rate matching information, where the antenna port mapping table may be identified based on the downlink control channel.

Some examples of the method, apparatuses, and non-transitory computer-readable medium described herein may further include operations, features, means, or instructions for identifying the antenna port mapping table based on a media access control element (MAC-CE) of the downlink control channel.

In some examples of the method, apparatuses, and non-transitory computer-readable medium described herein, the antenna port mapping table includes a demodulation reference signal (DMRS) port mapping table indicating a number of DMRS code division multiplexing groups and a set of DMRS port indices.

In some examples of the method, apparatuses, and non-transitory computer-readable medium described herein, the antenna port mapping table of the set of antenna port mapping tables may be associated with the transceiver node operation mode, and a second antenna port mapping table of the set of antenna port mapping tables may be associated with a second transceiver node operation mode different from the transceiver node operation mode.

In some examples of the method, apparatuses, and non-transitory computer-readable medium described herein, the antenna port mapping table may be a repurposed version of the second antenna port mapping table such that a size of the antenna port mapping table may be the same as a size of the second antenna port mapping table.

Some examples of the method, apparatuses, and non-transitory computer-readable medium described herein may further include operations, features, means, or instructions for receiving the downlink shared channel based on the monitoring, where the downlink shared channel may be received via a set of REs allocated for DMRS transmission from another transceiver node based on the antenna port configuration, identifying a set of DMRSs and a set of DMRS port indices based on the antenna port configuration, and monitoring for data of the downlink shared channel via a set of resources allocated based on the antenna port configuration.

In some examples of the method, apparatuses, and non-transitory computer-readable medium described herein, the transceiver node operation mode includes one of a single TRP operation mode associated with a first antenna port mapping table or a multiple TRP operation mode associated with a set of antenna port mapping tables including at least a second antenna port mapping table different from the first antenna port mapping table.

In some examples of the method, apparatuses, and non-transitory computer-readable medium described herein, identifying the transceiver node operation mode may include operations, features, means, or instructions for receiving an indication of the transceiver node operation mode or a change in mode operation via control signaling.

A method of wireless communications at a transceiver node is described. The method may include identifying a transceiver node operation mode for a UE in communication with the transceiver node, determining an antenna port configuration for a downlink shared channel for the UE based on the transceiver node operation mode, transmitting, to the UE, an indication of rate matching information for the downlink shared channel, the rate matching information indicating the antenna port configuration, and transmitting the downlink shared channel to the UE according to the antenna port configuration.

An apparatus for wireless communications at a transceiver node is described. The apparatus may include a processor, memory in electronic communication with the processor, and instructions stored in the memory. The instructions may be executable by the processor to cause the apparatus to identify a transceiver node operation mode for a UE in communication with the transceiver node, determine an antenna port configuration for a downlink shared channel for the UE based on the transceiver node operation mode, transmit, to the UE, an indication of rate matching information for the downlink shared channel, the rate matching information indicating the antenna port configuration, and transmit the downlink shared channel to the UE according to the antenna port configuration.

Another apparatus for wireless communications at a transceiver node is described. The apparatus may include means for identifying a transceiver node operation mode for a UE in communication with the transceiver node, determining an antenna port configuration for a downlink shared channel for the UE based on the transceiver node operation mode, transmitting, to the UE, an indication of rate matching information for the downlink shared channel, the rate matching information indicating the antenna port configuration, and transmitting the downlink shared channel to the UE according to the antenna port configuration.

A non-transitory computer-readable medium storing code for wireless communications at a transceiver node is described. The code may include instructions executable by a processor to identify a transceiver node operation mode for a UE in communication with the transceiver node, determine an antenna port configuration for a downlink shared channel for the UE based on the transceiver node operation mode, transmit, to the UE, an indication of rate matching information for the downlink shared channel, the rate matching information indicating the antenna port configuration, and transmit the downlink shared channel to the UE according to the antenna port configuration.

Some examples of the method, apparatuses, and non-transitory computer-readable medium described herein may further include operations, features, means, or instructions for identifying an antenna port mapping table of a set of antenna port mapping tables based on the transceiver node operation mode, and determining the antenna port configuration for the downlink shared channel based on the antenna port mapping table.

Some examples of the method, apparatuses, and non-transitory computer-readable medium described herein may further include operations, features, means, or instructions for transmitting, to the UE, a downlink control channel that includes the indication of rate matching information and the antenna port mapping table.

In some examples of the method, apparatuses, and non-transitory computer-readable medium described herein, the antenna port mapping table may be indicated by a MAC-CE of the downlink control channel.

In some examples of the method, apparatuses, and non-transitory computer-readable medium described herein, the antenna port mapping table includes a DMRS port mapping table indicating a number of DMRS code division multiplexing groups and a set of DMRS port indices.

In some examples of the method, apparatuses, and non-transitory computer-readable medium described herein, the antenna port mapping table of the set of antenna port mapping tables may be associated with the transceiver node operation mode, and a second antenna port mapping table of the set of antenna port mapping tables may be associated with a second transceiver node operation mode different from the transceiver node operation mode.

In some examples of the method, apparatuses, and non-transitory computer-readable medium described herein, the antenna port mapping table may be a repurposed version of the second antenna port mapping table such that a size of the antenna port mapping table may be the same as a size of the second antenna port mapping table.

Some examples of the method, apparatuses, and non-transitory computer-readable medium described herein may further include operations, features, means, or instructions for transmitting the downlink shared channel via a set of resources over which an associated DMRS may be transmitted.

Some examples of the method, apparatuses, and non-transitory computer-readable medium described herein may further include operations, features, means, or instructions for identifying a set of REs allocated for DMRS transmission from another transceiver node based on the antenna port configuration and allocating the set of REs to at least a portion of data based on the antenna port configuration and the transceiver node operation mode.

Some examples of the method, apparatuses, and non-transitory computer-readable medium described herein may further include operations, features, means, or instructions for emptying the set of REs based on the antenna port configuration and the transceiver node operation mode or identifying a set of DMRSs and a set of DMRS port indices based on the antenna port configuration and transmitting the downlink shared channel based on the set of DMRSs and the set of DMRS port indices.

In some examples of the method, apparatuses, and non-transitory computer-readable medium described herein, the transceiver node operation mode includes one of a single TRP operation mode associated with a first antenna port mapping table or a multiple TRP operation mode associated with a set of antenna port mapping tables including at least a second antenna port mapping table different from the first antenna port mapping table.

Some examples of the method, apparatuses, and non-transitory computer-readable medium described herein may further include operations, features, means, or instructions for transmitting, to the UE, an indication of the transceiver node operation mode or a change in mode operation via control signaling.

A method of wireless communications at a first transceiver node of a set of transceiver nodes is described. The method may include identifying a buffer of data for transmission to a UE in communication with the first transceiver node, receiving, from a second transceiver node of the set of transceiver nodes, an indication to switch between rate matching states at the first transceiver node, switching from a first rate matching state to a second rate matching state based on receiving the indication, and transmitting, to the UE, a downlink shared channel transmission based on a resource configuration associated with the second rate matching state.

An apparatus for wireless communications at a first transceiver node of a set of transceiver nodes is described. The apparatus may include a processor, memory in electronic communication with the processor, and instructions stored in the memory. The instructions may be executable by the processor to cause the apparatus to identify a buffer of data for transmission to a UE in communication with the first transceiver node, receive, from a second transceiver node of the set of transceiver nodes, an indication to switch between rate matching states at the first transceiver node, switch from a first rate matching state to a second rate matching state based on receiving the indication, and transmit, to the UE, a downlink shared channel transmission based on a resource configuration associated with the second rate matching state.

Another apparatus for wireless communications at a first transceiver node of a set of transceiver nodes is described. The apparatus may include means for identifying a buffer of data for transmission to a UE in communication with the first transceiver node, receiving, from a second transceiver node of the set of transceiver nodes, an indication to switch between rate matching states at the first transceiver node, switching from a first rate matching state to a second rate matching state based on receiving the indication, and transmitting, to the UE, a downlink shared channel transmission based on a resource configuration associated with the second rate matching state.

A non-transitory computer-readable medium storing code for wireless communications at a first transceiver node of a set of transceiver nodes is described. The code may include instructions executable by a processor to identify a buffer of data for transmission to a UE in communication with the first transceiver node, receive, from a second transceiver node of the set of transceiver nodes, an indication to switch between rate matching states at the first transceiver node, switch from a first rate matching state to a second rate matching state based on receiving the indication, and transmit, to the UE, a downlink shared channel transmission based on a resource configuration associated with the second rate matching state.

Some examples of the method, apparatuses, and non-transitory computer-readable medium described herein may further include operations, features, means, or instructions for delaying switching from the first rate matching state to the second rate matching state for a number of slots after receiving the indication, and switching from the first rate matching state to the second rate matching state after the number of slots.

Some examples of the method, apparatuses, and non-transitory computer-readable medium described herein may further include operations, features, means, or instructions for transmitting a second downlink shared channel transmission based on a resource configuration associated with the first rate matching state, where the second downlink shared channel transmission may be transmitted after receiving the indication and before switching from the first rate matching state to the second rate matching state.

Some examples of the method, apparatuses, and non-transitory computer-readable medium described herein may further include operations, features, means, or instructions for delaying switching may be based on the buffer of data being non-empty.

Some examples of the method, apparatuses, and non-transitory computer-readable medium described herein may further include operations, features, means, or instructions for switching from the first rate matching state to the second rate matching state in a first slot consecutive to a slot in which the indication may be received.

Some examples of the method, apparatuses, and non-transitory computer-readable medium described herein may further include operations, features, means, or instructions for transmitting the downlink shared channel transmission in the first slot based on the buffer of data being empty.

Some examples of the method, apparatuses, and non-transitory computer-readable medium described herein may further include operations, features, means, or instructions for determining, after transmitting the downlink shared channel transmission, that the buffer of data may have changed from non-empty to empty, and transmitting, to the second transceiver node, a second indication to switch between rate matching states at the second transceiver node.

Some examples of the method, apparatuses, and non-transitory computer-readable medium described herein may further include operations, features, means, or instructions for determining that the buffer of data may have changed from empty to non-empty, transmitting, to the second transceiver node, a second indication to switch between rate matching states at the second transceiver node, and transmitting a second downlink shared channel transmission to the UE after transmitting the second indication to switch between rate matching states at the second transceiver node.

Some examples of the method, apparatuses, and non-transitory computer-readable medium described herein may further include operations, features, means, or instructions for delaying transmission of the second downlink shared channel transmission for a number of slots after transmitting the second indication to switch between rate matching states at the second transceiver node, where delaying the transmission may be based on a rate matching state of the first transceiver node at a time of receipt of the indication to switch between rate matching states at the first transceiver node, and transmitting the downlink shared channel transmission after the number of slots.

Some examples of the method, apparatuses, and non-transitory computer-readable medium described herein may further include operations, features, means, or instructions for monitoring for a response to the second indication to switch between rate matching states at the second transceiver node, where monitoring for the response may be based on a rate matching state of the first transceiver node at a time of receipt of the indication to switch between rate matching states at the first transceiver node, and transmitting the second downlink shared channel transmission upon receiving the response.

Some examples of the method, apparatuses, and non-transitory computer-readable medium described herein may further include operations, features, means, or instructions for transmitting an acknowledgement to the second transceiver node in response to receiving the indication.

Some examples of the method, apparatuses, and non-transitory computer-readable medium described herein may further include operations, features, means, or instructions for transmitting a non-acknowledgement to the second transceiver node after receiving the indication, and receiving, from the second transceiver node, a third indication to switch between rate matching states at the first transceiver node.

In some examples of the method, apparatuses, and non-transitory computer-readable medium described herein, the resource configuration includes a set of REs allocated for a set of DMRS resources and a set of data resources and downlink shared channel transmissions from the first transceiver node in the first rate matching state may be associated with a second resource configuration that includes a second set of REs, the second set of REs including a second set of DMRS resources and a second set of data resources.

In some examples of the method, apparatuses, and non-transitory computer-readable medium described herein, a number of the second set of data resources may be greater than the first set of data resources.

In some examples of the method, apparatuses, and non-transitory computer-readable medium described herein, a number of the second set of data resources may be fewer than the first set of data resources.

In some examples of the method, apparatuses, and non-transitory computer-readable medium described herein, the indication may be received via a backhaul link.

DETAILED DESCRIPTION

Figure 1:
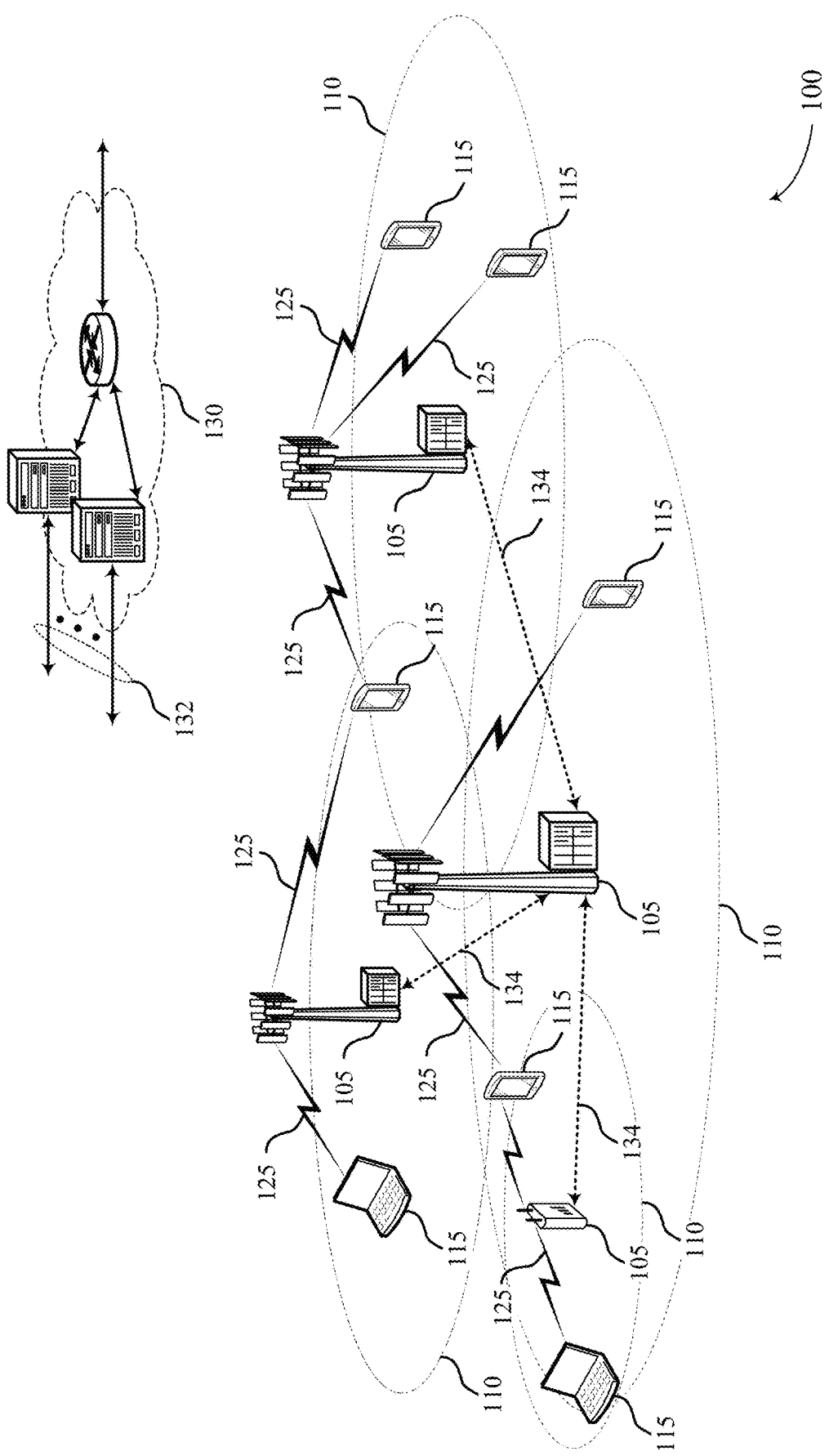
FIG. 1 illustrates an example of a wireless communications system that supports semi-dynamic rate matching in accordance with aspects of the present disclosure.

A UE may perform communications with a single transceiver node or multiple transceiver nodes within a set of transceiver nodes. Communications may include receiving a physical downlink control channel (PDCCH) scheduling one or more physical downlink shared channel (PDSCH) transmissions. The PDSCH transmissions may convey data stored in a buffer within the transceiver node that sent the PDCCH. If there are multiple transceiver nodes within the set of transceiver nodes communicating with the UE, PDSCH transmissions from any one of the multiple transceiver nodes may be associated with a PDCCH sent from that transceiver node (e.g., PDSCH transmissions from a first transceiver node may be associated with a PDCCH from the first transceiver node, and PDSCH transmissions from a second transceiver node may be associated with a PDCCH from the second transceiver node).

In some cases, the type of PDSCH transmissions that a UE receives may depend on whether the UE is communicating with a single transceiver node (e.g., a single transmission reception point (TRP)) or multiple transceiver nodes (e.g., multiple TRPs). For instance, if the UE is only communicating with a first transceiver node of the set of transceiver nodes, the UE may receive PDSCH transmissions with a first configuration. If the UE is communicating with multiple of the set of transceiver nodes, including the first transceiver node, the UE may receive PDSCH transmissions with a second configuration from the first transceiver node. The transceiver node may switch to the PDSCH transmissions with the second configuration to prevent interference between demodulation reference signal (DMRS) resources associated with PDSCH transmissions from the first or second transceiver node and PDSCH data resources associated with PDSCH transmissions from the second or first transceiver node, respectively. The second configuration may contain less resource elements (REs) dedicated to PDSCH data than the first configuration. As such, the first transceiver node may convey less data to the UE per slot when operating with a second transceiver node.

To enable a transceiver node to convey more PDSCH data to a UE per slot when operating in a multi-transceiver-node mode, a first transceiver node may switch from a first rate matching state to a second rate matching state upon receiving a trigger from a second transceiver node (e.g., via a backhaul link). Each rate matching state may be associated with a PDSCH configuration. The second transceiver node may provide the indication if one or more events occur at the second transceiver node. In one example, the second transceiver node may provide an indication to the first transceiver node if a size of a buffer associated with communications to the UE empties. In such examples, the first transceiver node may transition from a rate matching state associated with the first PDSCH configuration to a rate matching state associated with the second PDSCH configuration. In another example, the second transceiver node may provide an indication to the first transceiver node if a size of a buffer for communications to the UE transitions from an empty to a non-empty value (e.g., if the second transceiver node receives data from a higher entity while the buffer is empty). In such examples, the first transceiver node may transition from a rate matching state associated with the second PDSCH configuration to a rate matching state associated with the first PDSCH configuration.

To inform the UE of the rate matching adaption, the first or second transceiver node(s) may provide an indication of rate matching information to the UE. For instance, the first or second transceiver node(s) may provide a row index to an antenna port mapping table via dynamic control signaling (e.g., via downlink control information (DCI)) that may indicate which ports the UE is to expect to receive PDSCH transmissions from. In some cases, the UE may use a first antenna port mapping table for a single-transceiver-node-mode and may use one or more antenna port mapping tables when operating in a multi-transceiver-node mode. To indicate which of the one or more antenna port mapping tables the UE is to consult when operating in a multi-transceiver-node mode, and assuming that the one or more antenna port mapping tables includes multiple antenna port mapping tables, the first or second transceiver node(s) may provide semi-static or dynamic control signaling (e.g., a media access control (MAC) control element (MAC-CE)) indicating which antenna port mapping table the UE is to consult.

Aspects of the disclosure are initially described in the context of wireless communications systems. Additional aspects of the disclosure are described in the context of a PDSCH transmission scheme, rate matching state switching schemes, and process flows. Aspects of the disclosure are further illustrated by and described with reference to apparatus diagrams, system diagrams, and flowcharts that relate to semi-dynamic rate matching.

FIG. 1 illustrates an example of a wireless communications system 100 that supports semi-dynamic rate matching in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a TRP. In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A MAC layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or resource blocks) within a carrier (e.g., "in-band" deployment of a narrowband protocol type).

In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may include one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

A UE 115 may communicate with a set of transceiver nodes (e.g., TRPs) in a first transceiver node operation mode (e.g., a multi-TRP mode). A first transceiver node of the set of transceiver nodes may identify a set of data for transmission to the UE 115 and may place the set of data within a buffer. Additionally, the first transceiver node may determine a rate matching state of a second transceiver node of the set of transceiver nodes. For instance, the first transceiver node may determine that the second transceiver node has an empty buffer or a non-empty buffer for transmission to the UE 115. The first transceiver node may provide an indication of rate matching information (e.g., whether the second transceiver node has an empty buffer or a non-empty buffer) for a downlink shared channel transmission to the UE 115. The indication may be contained within DCI of a PDCCH scheduling the downlink shared channel transmission. In some cases, the downlink shared channel transmission may be a PDSCH transmission that conveys at least a subset of the set of data.

The UE 115 may receive the indication and may determine an antenna port configuration for the downlink shared channel transmission based on the operation mode and the rate matching information. The UE 115 may, for instance, use the indication as a row index for an antenna port mapping table and may determine the antenna port configuration from the table. The UE 115 may monitor for the downlink shared channel transmission based on the antenna port configuration. The first transceiver node may transmit the downlink shared channel transmission based on the rate matching state of the second transceiver node. For instance, if the rate matching state of the second transceiver node indicates that the second transceiver node has an empty buffer for transmission to the UE 115, the first transceiver node may transmit the downlink shared channel transmission in a first configuration. Otherwise, the first transceiver node may transmit the downlink shared channel transmission in a second configuration.

Figure 2:
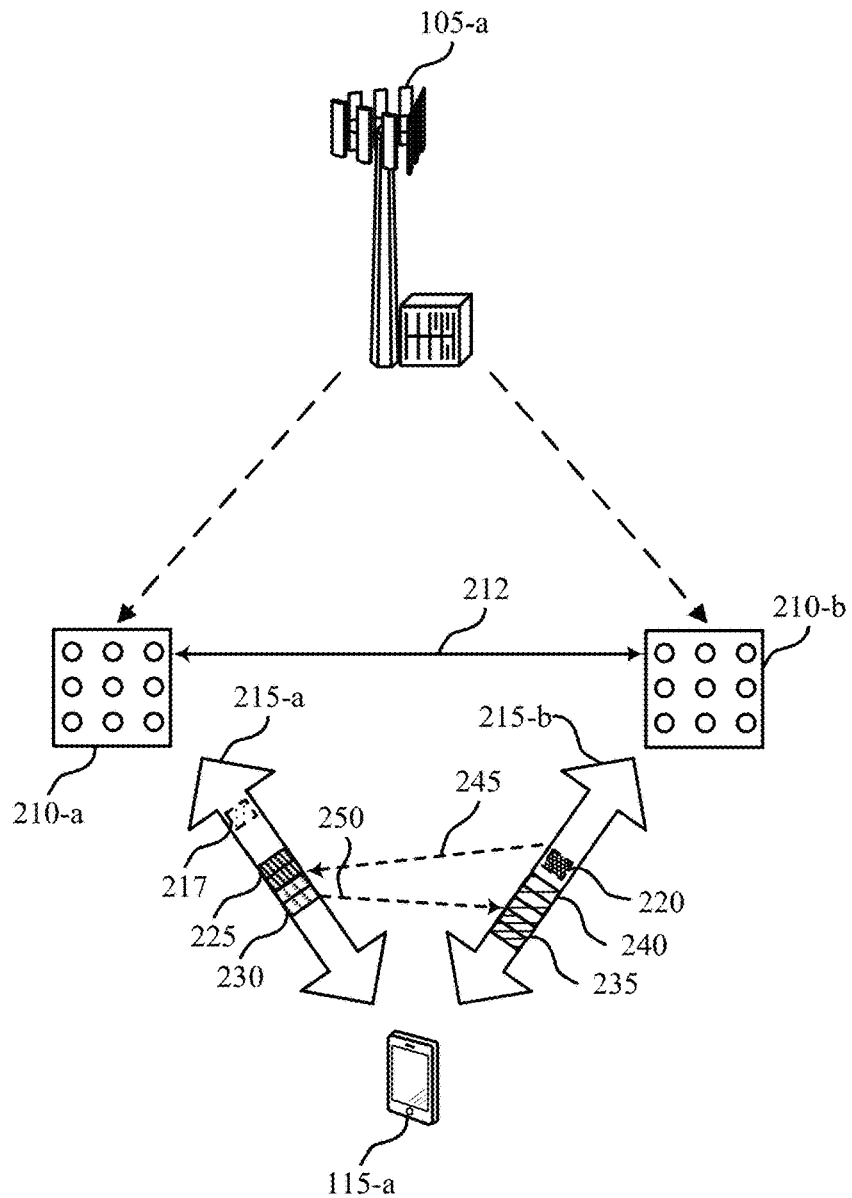
FIG. 2 illustrates an example of a wireless communications system that supports semi-dynamic rate matching in accordance with aspects of the present disclosure.
Figure 2:
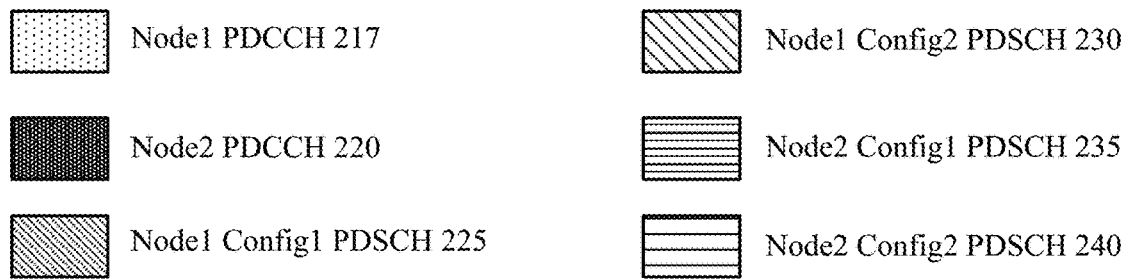

FIG. 2 illustrates an example of a wireless communications system 200 that supports semi-dynamic rate matching in accordance with aspects of the present disclosure. In some examples, wireless communications system 200 may implement aspects of wireless communications system 100. For example, wireless communications system 200 may include UE 115-a and base station 105-a, which may be examples of UEs 115 and base stations 105 as described with reference to FIG. 1.

Base station 105-*a* may communicate with UE 115-*a* via one or more transceiver nodes 210 (e.g., transceiver nodes 210-*a* and 210-*b*). Transceiver nodes 210 and UE 115-*a* may establish communication links 215 (e.g., communication link 215-*a* for transceiver node 210-*a* and communication link 215-*b* for transceiver node 210-*b*). In some cases, transceiver node 210-*a* and transceiver node 210-*b* may each be an example of, or associated with, a base station 105 as described herein. In some cases, transceiver node 210-*a* and transceiver node 210-*b* may each be a TRP. Transceiver node 210-*a* and 210-*b* may communicate with each other through backhaul link 212.

In some cases, transceiver node 210-*a* may transmit a PDCCH 217 to UE 115-*a* that schedules PDSCH transmissions from transceiver node 210-*a* (e.g., PDSCHs 225 and 230) over one or more slots. Alternatively, transceiver node 210-*a* may transmit a PDCCH for each PDSCH that transceiver node 210-*a* transmits (e.g., transceiver node 210-*a* may transmit four PDCCHs corresponding to four PDSCHs). Transceiver node 210-*b* may transmit a PDCCH 220 to UE 115-*a* that schedules one or more PDSCHs from transceiver node 210-*b* (e.g., PDSCHs 235 and 240). Alternatively, transceiver node 210-*b* may transmit a PDCCH for each PDSCH that transceiver node 210-*b* transmits (e.g., transceiver node 210-*b* may transmit four PDCCHs corresponding to four PDSCHs). In some cases, transceiver node 210-*a* may transmit PDSCHs on a first set of ports (e.g., ports 0, 1, 4, 5, or a combination thereof) and transceiver node 210-*b* may transmit PDSCHs on a second set of ports (e.g., ports 2, 3, 6, 7 or a combination thereof).

Transceiver node 210-*a* may determine whether to transmit a PDSCH 225 with a first configuration or a PDSCH 230 with a second configuration based on a rate matching state of transceiver node 210-*b*. Transceiver node 210-*b* may determine whether to transmit a PDSCH 235 or a PDSCH 240 based on a rate matching state of transceiver node 210-*a*. In either case, the rate matching state may be indicated over backhaul link 212.

In general, each transceiver node 210 may have one of two rate matching states. In a first rate matching state (i.e., RMmTRPempty), a transceiver node 210 may not assign PDSCH data to REs that may be used for DMRSs at other transceiver nodes 210. Additionally, when operating in RMmTRPempty, the transceiver node 210 may assume that multiple code division multiplexing (CDM) groups are being used and that one CDM group is assigned to the transceiver node 210 while other CDM groups are assigned to other transceiver nodes. In a second rate matching state (i.e., RMmTRPfilled), a transceiver node 210 (e.g., transceiver node 210-*a*) may assign PDSCH data to REs that may be used for DMRSs at other transceiver nodes (e.g., transceiver node 210-*b*). Additionally, the transceiver node 210 may assume that one CDM group is assigned for the transceiver node and that there are no other transceiver nodes 210 to which CDM groups are assigned.

A first transceiver node 210 may switch from one rate matching state to another rate matching state if the first transceiver node 210 receives an indication (e.g., via backhaul link 212) of rate matching state from a second transceiver node 210. The second transceiver node 210 may provide such an indication if one or more events occur. In one case, if a buffer size of the second transceiver node 210 reaches zero, the second transceiver node 210 may transmit an indication to the transceiver node 210. Such an event may be referred to as a zero-buffer event. The indication may trigger the first transceiver node 210 to transition to an RMmTRPfilled state (e.g., from an RMmTRPempty state).

In another case, if a buffer size of the second transceiver node 210 transitions from a zero to a non-zero value (e.g., if new data arrives at the second transceiver node 210 via a higher entity when the buffer is empty), the second transceiver node 210 may transmit the indication indicating a buffer change from empty to non-empty. Such an event may be referred to as a new data event. The indication may trigger the first transceiver node 210 to transition to an RMmTRPempty state (e.g., from an RMmTRPfilled state).

In one example, transceiver node 210-*a* may have data to convey to UE 115-*a* and may initially have an RMmTRPfilled state. Upon determining that transceiver node 210-*a* has data to transmit, transceiver node 210-*a* may transmit an indication of a new data event to transceiver node 210-*b*. As such, transceiver node 210-*b* may set its rate matching state to be an RMmTRPempty state. At a later time, transceiver node 210-*b* may have data to convey to UE 115-*a* and may transmit an indication 245 of a new data event to transceiver node 210-*a*. Upon receiving the signaling, transceiver node 210-*a* may switch from an RMmTRPfilled state to an RMmTRPempty and may begin transmitting PDSCHs 230. After a delay or upon reception of an acknowledgement (ACK), transceiver node 210-*b* may begin transmitting PDSCHs 240. In some cases, transceiver node 210-*a* may change from transmitting PDSCHs 225 to PDSCHs 230 because PDSCH data resources of PDSCH 225 may interfere with PDSCH DMRS resources of PDSCH 240, while PDSCH data resources of PDSCH 230 may not interfere with PDSCH DMRS resources of PDSCH 240.

At a later time, a buffer size of transceiver node 210-*a* may empty or transceiver node 210-*a* may cease transmitting PDSCHs 230. Accordingly, transceiver node 210-*a* may transmit an indication 250 of an empty buffer event to transceiver node 210-*b*. Upon receiving the indication, transceiver node 210-*b* may switch from a RMmTRPempty state to a RMmTRPfilled state and may begin transmitting PDSCHs 235 instead of PDSCHs 240. In some cases, transceiver node 210-*b* may switch from transmitting PDSCHs 240 to transmitting PDSCHs 235 because PDSCHs 235 may carry more data than PDSCH 240. PDSCH 235 may interfere with PDSCH DMRS resources of PDSCHs 225 and 230, but, as transceiver node 210-*a* has signaled an empty buffer, transceiver node 210-*b* may assume that transceiver node 210-*a* is not to transmit additional PDSCHs. Transceiver node 210-*b* may continue to convey any additional data with PDSCHs 235 until transceiver node 210-*b* receives an indication from transceiver node 210-*a* that transceiver node 210-*a* has a non-empty buffer.

Figure 3:
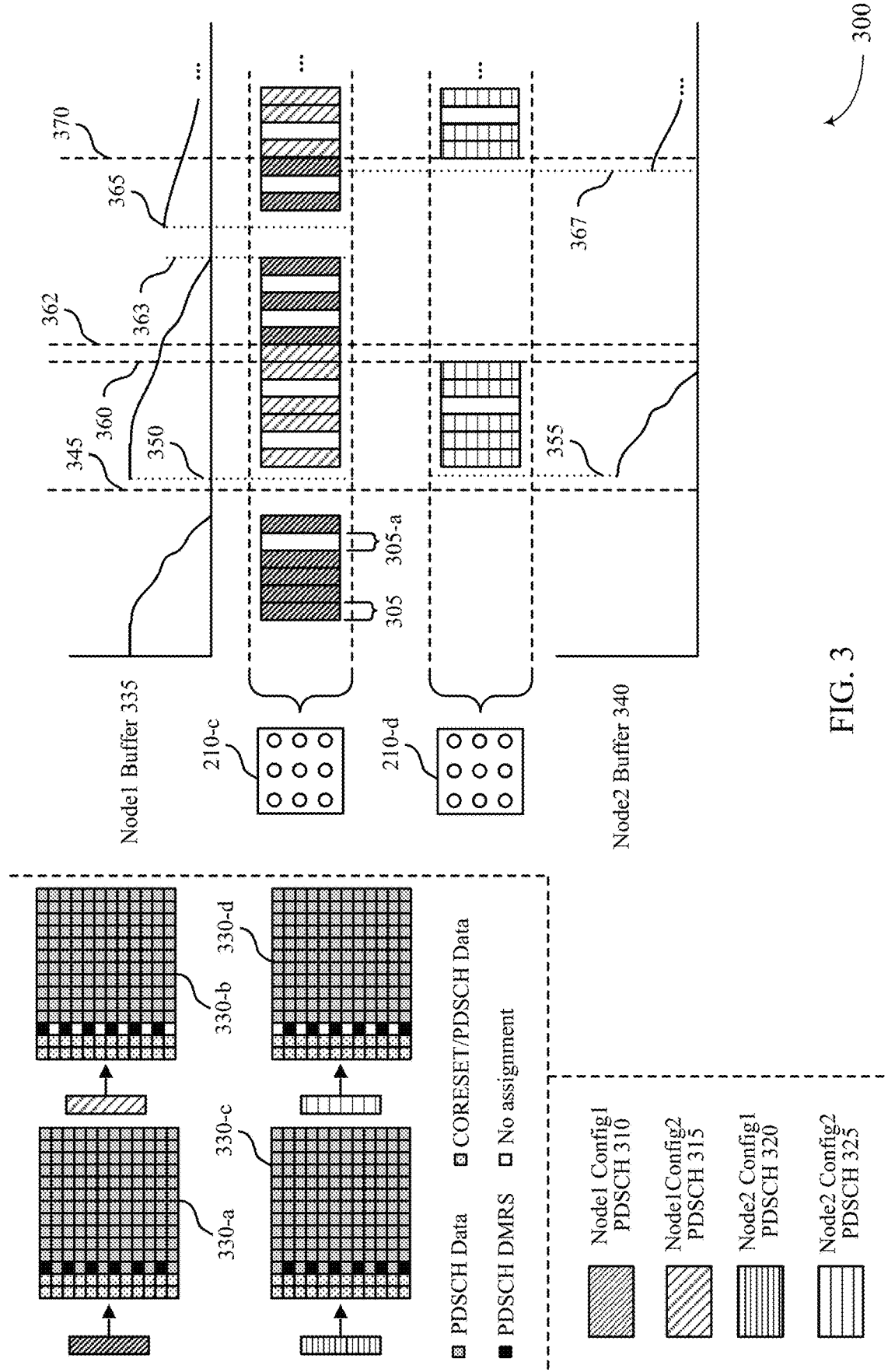
FIG. 3 illustrates an example of a physical downlink shared channel (PDSCH) transmission scheme that supports semi-dynamic rate matching in accordance with aspects of the present disclosure.

FIG. 3 illustrates an example of a PDSCH transmission scheme 300 that supports semi-dynamic rate matching in accordance with aspects of the present disclosure. In some examples, PDSCH transmission scheme 300 may include aspects of wireless communications systems 100 or 200. For instance, PDSCH transmission scheme may be implemented by transceiver node 210-*c* and transceiver node 210-*d*, which may be examples of transceiver nodes 210 as described with reference to FIG. 2. Additionally, PDSCHs 310, 315, 320, and 325 may be examples of PDSCHs 225, 230, 235, and 240, respectively, as described with reference to FIG. 2.

Transceiver nodes 210-*c* and 210-*d* may transmit PDSCHs to a UE 115 over one or more slots 305. Transceiver node 210-*c* may transmit one of PDSCHs 310 and 315 and transceiver node 210-*d* may transmit one of PDSCHs 320 and 325. Each PDSCH may cover a resource block 330 that may span a number of OFDM symbols (e.g., 14 OFDM symbols) versus a number of subcarriers (e.g., 12 subcarriers). In some cases, PDSCHs transmitted to the UE 115 concurrently (e.g., within a same time slot) may have overlapping resource blocks 330 (e.g., a PDSCH 310 or 315 transmitted from transceiver node 210-c may cover a resource block 330 with the same subcarriers as a resource block 330 covered by a PDSCH 320 or 325 transmitted from transceiver node 210-d). In some cases, a scheduler of transceiver nodes 210-c and 210-d may schedule some slots for PDSCHs to the UE 115 and may schedule other slots for data transmissions (e.g., PDSCHs) to other UEs 115 or to refrain from transmitting (e.g., slot 305-a). The UE 115 may receive an indication of the scheduling via a corresponding PDCCH.

PDSCH 310 may be associated with resource block 330-a. The first two OFDM symbols of resource block 330-a may contain a control resource set (CORESET) or PDSCH data. The third OFDM symbol of resource block 330-a may contain an alternating pattern of PDSCH DMRS resources and PDSCH data. The PDSCH DMRS resources may be associated with a first set of antenna ports (e.g., 0, 1, 4, 5 or a combination thereof). The other OFDM symbols of resource block 330-a may contain PDSCH data. Transceiver node 210-c may transmit a PDSCH 310 when transceiver node 210-c has a RMmTRPfilled state.

PDSCH 315 may be associated with resource block 330-b. The first two OFDM symbols of resource block 330-b may contain a CORESET or PDSCH data. The third OFDM symbol of resource block 330-b may contain an alternating pattern of PDSCH DMRS resources and resources with no scheduled transmissions. The PDSCH DMRS resources may be associated with the first set of antenna ports. The alternating pattern of resource block 330-b may follow the alternating pattern of resource block 330-a. The other OFDM symbols of resource block 330-a may contain PDSCH data. Transceiver node 210-c may transmit a PDSCH 310 when transceiver node 210-c has a RMmTRPempty state.

PDSCH 320 may be associated with resource block 330-c. The first two OFDM symbols of resource block 330-c may contain a CORESET or PDSCH data. The third OFDM symbol of resource block 330-c may contain an alternating pattern of PDSCH DMRS resources and PDSCH data. The other OFDM symbols of resource block 330-c may contain PDSCH data. The alternating pattern of resource block 330-c may complement the alternating pattern of resource block 330-a (e.g., resource block 330-c may contain PDSCH DMRS resources where resource block 330-a may not and may contain PDSCH data resources where resource block 330-a may not). In some cases, transmitting PDSCH 310 and 320 concurrently (e.g., within a same slot) may create interference between PDSCH DMRS resources of resource block 330-c and PDSCH data resources of resource block 330-a or may create interference between PDSCH data resources of resource block 330-c and PDSCH DMRS resources of resource block 330-a. When transmitting PDSCHs 315 and 320 concurrently (e.g., within a same slot), PDSCH data resources of resource block 330-c may interfere with PDSCH DMRS resources of resource block 330-b. The PDSCH DMRS resources may be associated with a second set of antenna ports (e.g., antenna ports 2, 3, 6, 7 or a combination thereof). Transceiver node 210-d may transmit a PDSCH 310 when transceiver node 210-c has a RMmTRPfilled state.

PDSCH 325 may be associated with resource block 330-d. The first two OFDM symbols of resource block 330-d may contain a CORESET or PDSCH data. The third OFDM symbol of resource block 330-d may contain an alternating pattern of PDSCH DMRS resources and resources with no scheduled transmission. The other OFDM symbols of resource block 330-d may contain PDSCH data. In some cases, transmitting PDSCH 310 and 320 concurrently (e.g., within a same slot) may create interference between PDSCH DMRS resources of resource block 330-d and PDSCH data resources of resource block 330-a. However, transmitting PDSCHs 315 and 325 concurrently (e.g., within a same slot) may mitigate interference because PDSCH DMRS resources of resource block 330-d may overlap with resources without assignment in resource block 330-b and PDSCH DMRS resources of resource block 330-b may overlap with resources without assignment in resource block 330-d. The PDSCH DMRS resources may be associated with the second set of antenna ports. Transceiver node 210-c may transmit a PDSCH 310 when transceiver node 210-c has a RMmTRP-filled state.

Transceiver node 210-c may be associated with node1 buffer 335 and transceiver node 210-d may be associated with node2 buffer 340. At an initial time, node1 buffer 335 may contain data to be sent to a wireless device, such as a UE 115. At the initial time, transceiver node 210-c may be operating in a single-transceiver-node mode (e.g., a single-TRP mode) and may transmit PDSCHs 310. Transceiver node 210-c may transmit the PDSCHs 310 because transceiver node 210-d may not be transmitting to the UE 115 while transceiver node 210-c and the UE 115 are operating in the single-transceiver-node mode. Transceiver node 210-c may receive a PDCCH for each PDSCH 310.

At 345, transceiver node(s) 210-c or 210-d may receive an indication or otherwise determine to operate according to a multi-transceiver-node mode (e.g., multi-TRP mode) with a UE 115 (e.g., with the UE 115 that transceiver node 210-c was communicating with at the initial time). Transceiver nodes 210-c or 210-d may transmit control signaling to the UE 115 (e.g., semi-static control signaling, such as RRC signaling) indicating that transceiver nodes 210-c and 210-d may communicate with the UE 115 according to the multi-transceiver node mode.

At 350, transceiver node 210-c may determine that transceiver node 210-c has new data to transmit to the UE 115 and may place the new data in node1 buffer 335. As such, transceiver node 210-c may transmit an indication of a new data event to transceiver node 210-d and transceiver node 210-d may transition to an RMmTRPempty state. At 355, transceiver nodes 210-d may determine that transceiver nodes 210-d has new data to transmit to the UE 115 and may place the new data in node2 buffer 340. As such, transceiver node 210-d may transmit an indication of a new data event to transceiver node 210-c and transceiver node 210-d may transition to an RMmTRPempty state. In some cases, 350 and 355 may occur at a same time or within a time interval of each other (e.g., within a threshold time interval). In some cases, 350 and 355 may occur independently of each other.

Transceiver node 210-c may begin transmitting PDSCHs 315 and transceiver node 210-d may begin transmitting PDSCHs 325. In the present example, both transceiver nodes 210 may begin transmitting their respective PDSCHs at a same time slot. Each PDSCH 315 may be scheduled by a PDCCH transmitted by transceiver node 210-c after or at 350 and each PDSCH 325 may be scheduled by a PDCCH transmitted by transceiver node 210-d after or at 355.

At 360, node2 buffer 340 may become empty and transceiver node 210-d may cease transmitting PDSCHs 225 to the UE 115. Additionally, at 360, transceiver node 210-d may provide an indication of an empty buffer event to transceiver node 210-c. Upon receiving the indication, transceiver node 210-c may switch from a RMmTRPempty state to a RMmTRPfilled state. Additionally, transceiver node 210-c may begin transmitting PDSCHs 310 instead of PDSCHs 315. Transceiver node 210-c may perform the switch at 360 or may switch at a next slot 305. For instance, transceiver node 210-c may receive the indication during a slot 305 immediately prior to 362 and may switch to transmitting PDSCHs 315 at 362. Although a single slot is depicted in FIG. 3 between 360 and 362, it should be noted that there may be multiple slots 305 between 360 and 362 without deviating from the scope of the present disclosure. Additional details concerning empty buffer events may be demonstrated with regards to FIG. 4. In any case, if transceiver node 210-d has provided an indication of an empty buffer event, transceiver node 210-c may assume that transceiver node 210-d is not to transmit additional PDSCHs 225 to the UE 115 and may, therefore, assume that PDSCHs 310 would not interfere with PDSCH DMRS resources. Transceiver node 210-c may transmit a PDCCH for each PDSCH 315.

At 363, node1 buffer 335 may become empty and transceiver node 210-c may cease transmitting PDSCHs 310 to the UE 115. Additionally, at 363, transceiver node 210-c may provide an indication of an empty buffer event to transceiver node 210-d. Upon receiving the indication, transceiver node 210-d may switch from an RMmTRPempty state to an RMmTRPfilled state. Additional details concerning empty buffer events may be demonstrated with regards to FIG. 4.

At 365, transceiver node 210-c may determine that transceiver node 210-c has new data to transmit to the UE 115 and may place the new data in node1 buffer 335. The new data may be conveyed via PDSCHs 310, as opposed to PDSCHs 315, because transceiver nodes 210-d may not have indicated to transceiver node 210-c that transceiver node 210-d (e.g., between 360 and 365) has new data to transmit. As such, transceiver node 210-c may still assume that transceiver node 210-d is not to transmit PDSCHs 320 or 325 to the UE 115 and, as such, may transmit PDSCHs 310. In some cases, transceiver node 210-c may provide an indication of a new data event to transceiver node 210-d. Upon receiving the indication, transceiver node 210-d may switch from an RMmTRPfilled state to an RMmTRPempty state.

At 367, transceiver node 210-d may determine that transceiver node 210-d has new data to transmit to the UE 115 and may place the new data in node2 buffer 340. The new data may be received while the node2 buffer 340 is empty (e.g., after transceiver node 210-c ceases to transmit PDSCHs 325 at 360). Transceiver node 210-d may provide an indication of a new data event (e.g., via a backhaul link 212, as described with reference to FIG. 2) to transceiver node 210-c. Transceiver node 210-c may receive the indication and may switch from an RMmTRPfilled state to an RMmTRPempty state. Additionally, transceiver node 210-d may begin transmitting PDSCHs 325. For instance, transceiver node 210-c may receive the indication in a slot 305 immediately prior to 370 and may begin transmitting PDSCHs 325 at 370. After receiving the indication, transceiver node 210-c may transmit an ACK or a non-acknowledgement (NACK) back to transceiver node 210-d. In some cases, transceiver node 210-d may hold off on transmitting PDSCHs 325 until receiving the ACK from transceiver node 210-c. In one example, transceiver node 210-d may receive an ACK from transceiver node 210-c in a slot immediately prior to 370 and may begin transmitting PDSCHs 325 at 370. Transceiver node 210-d may transmit a PDCCH for each PDSCH 325.

In some aspects, transceiver node 210-c may receive the indication of the new data event in a slot 305 and may wait $K_{RM}$ slots before transmitting the PDSCHs 315. Transceiver node 210-c may wait $K_{RM}$ slots to begin transmitting the PDSCHs 315 if it is anticipated that the ACK may take multiple slots (e.g., $K_{RM}$ slots) to be received by transceiver node 210-d. During this time, transceiver node 210-c may continue to transmit PDSCHs 310.

Additionally or alternatively, transceiver node 210-d may wait $N_{RM}$ slots from providing the indication of the new data event at 367 to begin transmitting PDSCHs 325. In such cases, transceiver node 210-c may begin transmitting PDSCHs 315 in a slot 305 immediately following the slot 305 in which transceiver node 210-c received the indication. Additionally, transceiver node 210-c may not transmit an ACK or a NACK after receiving the indication. Transceiver node may wait $N_{RM}$ slots if it is anticipated that the indication may take multiple slots (e.g., $N_{RM}$ slots) to be received by transceiver node 210-c. During this time, transceiver node 210-d may refrain from transmitting any PDSCHs 325. More details about this scenario may be discussed with regards to FIGS. 5 and 6.

In general, transceiver nodes 210-c or 210-d may inform the UE 115 of the rate matching adaption via semi-static or dynamic control signaling (e.g., a MAC-CE or DCI). MAC-CE signaling may provide an indication of which among a set of DMRS port mapping tables the UE 115 is to search use when interpreting rate matching information. DCI may provide the rate matching information via a row index, which the UE 115 may use to determine a row of a DMRS port mapping table (e.g., the DMRS port mapping table selected via MAC-CE) to consult.

In one example, a UE 115 may use a first DMRS port mapping table when operating in a single-transceiver-node mode (e.g., a single-TRP mode) and may use a second DMRs port mapping table when operating in a multi-transceiver-node mode (e.g., a multi-TRP mode). The change in mode may be configured via semi-static signaling (e.g., RRC signaling), such as described with regards to 345. When operating in the single-transceiver-node mode, the UE 115 may interpret the row index as pointing to a row of the first DMRS port mapping table and, when operating in the multi-transceiver-node mode, the UE 115 may interpret the row index as pointing to a row of the second DMRS port mapping table (e.g., the row index may correspond to the parameter "value" in Tables 1 and 2).

The first DMRS port mapping table may be represented by Table 1, as shown below.

TABLE 1

Single-transceiver-node mode DMRS port mapping table

| Value | Number of DMRS CDM group(s) without data | DMRS port(s) |
| --- | --- | --- |
| 0 | 1 | 0 |
| 1 | 1 | 1 |
| 2 | 1 | 0, 1 |
| 3 | 2 | 0 |
| 4 | 2 | 1 |
| 5 | 2 | 2 |
| 6 | 2 | 3 |
| 7 | 2 | 0, 1 |
| 8 | 2 | 2, 3 |
| 9 | 2 | 0-2 |

TABLE 1-continued

Single-transceiver-node mode DMRS port mapping table

| Value | Number of DMRS CDM group(s) without data | DMRS port(s) |
|---|---|---|
| 10 | 2 | 0-3 |
| 11 | 2 | 0, 2 |
| 12-15 | Reserved | Reserved |

The number of DMRS CDM group(s) without data (e.g., without a data parameter) may refer to a number of CDM groups that may be assigned to the transceiver nodes 210 serving the UE 115. Each CDM group may be associated with antenna ports that a transceiver node 210 may transmit over. For instance, antenna ports 0 and 1 may be associated with a first CDM group and antenna ports 2 and 3 may be associated with a second CDM group. In one example, if transceiver node 210-c indicates (e.g., via DCI) that the number of DMRS CDM groups is equal to 1, the UE 115 may assume that one CDM group is assigned to transceiver node 210-c (e.g., either the first CDM group or the second CDM group). As such, the UE 115 may assume that transceiver node 210-c may transmit corresponding PDSCHs associated with just that CDM group (e.g., just PDSCH 310 or PDSCH 320). Alternatively, if the number of DMRS CDM groups is greater than 1, the UE may assume that multiple CDM groups may be assigned to transceiver node 210-c. For instance, if the number of DMRS CDM groups is two, the UE 115 may assume that two CDM groups are assigned to transceiver node 210-c (e.g., both the first CDM group and the second CDM group). As such, the UE 115 may assume that transceiver node 210-c may transmit corresponding PDSCHs associated with either of the CDM groups.

The DMRS port(s) parameter may refer to which DMRS port that PDSCH DMRS within a resource block 330 are associated with. For instance, even though the number of DMRS CDM group(s) parameter may indicate which CDM groups are associated with DMRS transmissions, the parameter may not specify which port specifically a UE 115 may receive DMRS transmissions from. The DMRS port(s) parameter may specify which port the UE 115 may receive DMRS from. For instance, if the DMRS port(s) parameter is equal to 1, the UE 115 may receive the DMRSs of the corresponding PDSCHs from antenna port 1 of transceiver node 210-c.

The second DMRS port mapping table, meanwhile, may be represented by Table 2, as shown below.

TABLE 2

Multi-transceiver-node mode DMRS port mapping table

| Value | Number of DMRS CDM group(s) without data | DMRS port(s) |
|---|---|---|
| 0 | 1 | 0 |
| 1 | 1 | 1 |
| 2 | 1 | 0, 1 |
| 3 | 2 | 0 |
| 4 | 2 | 1 |
| 5 | 2 | 2 |
| 6 | 2 | 3 |
| 7 | 2 | 0, 1 |
| 8 | 2 | 2, 3 |
| 9 | 1 | 2 |
| 10 | 1 | 3 |
| 11 | 1 | 2, 3 |
| 12-15 | Reserved | Reserved |

The rows associated with values 0-8 and 12-15 of Table 2 may be the same as those of Table 1. The rows associated with values 9-11, however, may be different than those of Table 1. The rows associated with values 9-11 may be valid for a single-transceiver-node mode, but may be invalid for a multi-transceiver-node mode. For instance, the maximum rank per transceiver node may be limited to two when using semi-static DMRS partitioning. The DMRS ports associated with values 9 and 10, however, may have a rank of 3 and 4, respectively. As such, the DMRS ports associated with 9 and 10 may be invalid for a multi-transceiver-node mode. Value 11, meanwhile, may be associated with DMRS ports in different CDM groups. For instance, ports 0 and 1 may be associated with a first CDM group and ports 2 and 3 may be associated with a second CDM group. However, for multi-transceiver-node mode cases, transceiver nodes 210 may be limited to having one CDM group per transceiver node 210 (e.g., transceiver node 210-c may be associated with the first CDM group but not the second and transceiver node 210-d may be associated with the second CDM group but not the first). As such, Table 2 may be considered a repurposed version of Table 1 that contains valid values for multi-transceiver-node mode.

Since there may be multiple transceiver nodes 210 and each transceiver node 210 may have one CDM group, the UE 115 may interpret the DMRS CDM group(s) without data (e.g., without a data parameter) differently from the single-transceiver-node case. For instance, if transceiver node 210-c indicates (e.g., via DCI) that the number of DMRS CDM groups is equal to 1, the UE 115 may assume that there is one CDM group assigned to transceiver node 210-c and that there are no other transceiver nodes 210 to which CDM groups are assigned. As such, the UE 115 may assume that transceiver node 210-c has an RMmTRPfilled state and may expect PDSCHs that assign PDSCH data to REs that may be used for PDSCH DMRS at another transceiver node (e.g., transceiver node 210-d), such as PDSCHs 310 or 320. Alternatively, if transceiver node 210-c indicates (e.g., via DCI) that the number of DMRS CDM groups is greater than 1, the UE 115 may assume, as there may be one CDM group assigned to transceiver node 210-c, that there are CDM groups assigned to other transceiver nodes 210. As such, the UE 115 may assume that transceiver node 210-c is has an RMmTRPempty state.

In general, values 0, 1, 2, 9, 10, and 11 of Table 2 may be considered counterparts to values 3, 4, 7, 5, 6, and 8, respectively, of Table 2. That is, the DMRS ports of each of these values may be the same as their counterparts, but their number of DMRS CDM group(s) without data may be different.

Whenever the UE 115 receives a PDCCH from a transceiver node 210, the UE 115 may determine a row of Table 2 based on a row index included within a DCI of the PDCCH. For instance, the UE may receive a row index of 11 and may determine that a number of DMRS CDM code groups is equal to 1 and that the corresponding DMRS ports may be either 2 or 3. As such, the UE 115 may assume that the UE 115 may receive a resource block 330-c. Alternatively, since 8 may be the counterpart of 11, the UE 115 may assume that the UE 115 may also receive a resource block 330-d, which may be associated with a number of DMRS CDM code groups equal to 2 and DMRS ports 2 and 3.

In another example, the UE 115 may use a first DMRS port mapping table when operating in a single-transceiver-node mode (e.g., a single-TRP mode) and may select between one of a set of DMRS port mapping tables when operating in a multi-transceiver-node mode (e.g., a multi- TRP mode). The change in mode may be configured via semi-static signaling (e.g., RRC signaling), such as described with regards to 345. When operating in the single-transceiver-node mode, the UE 115 may interpret the row index as pointing to a row of the first DMRS port mapping table and, when operating in the multi-transceiver-node mode, the UE 115 may interpret the row index as pointing to the one of the set of DMRS port mapping tables (e.g., the row index may correspond to the parameter "value" in Tables 3-5). The UE 115 may determine which of the set of DMRS port mapping tables to use for the multi-transceiver-node mode based on semi-static or dynamic signaling (e.g., a MAC-CE or DCI) that indicates which table to use.

The first DMRS port mapping table may be represented by Table 3, as shown below.

TABLE 3

Single-transceiver-node mode DMRS port mapping table

| Value | Number of DMRS CDM group(s) without data | DMRS port(s) | Number of front-load symbols |
|---|---|---|---|
| 0 | 1 | 0 | 1 |
| 1 | 1 | 1 | 1 |
| 2 | 1 | 0, 1 | 1 |
| 3 | 2 | 0 | 1 |
| 4 | 2 | 1 | 1 |
| 5 | 2 | 2 | 1 |
| 6 | 2 | 3 | 1 |
| 7 | 2 | 0, 1 | 1 |
| 8 | 2 | 2, 3 | 1 |
| 9 | 2 | 0-2 | 1 |
| 10 | 2 | 0-3 | 1 |
| 11 | 2 | 0, 2 | 1 |
| 12 | 2 | 0 | 2 |
| 13 | 2 | 1 | 2 |
| 14 | 2 | 2 | 2 |
| 15 | 2 | 3 | 2 |
| 16 | 2 | 4 | 2 |
| 17 | 2 | 5 | 2 |
| 18 | 2 | 6 | 2 |
| 19 | 2 | 7 | 2 |
| 20 | 2 | 0, 1 | 2 |
| 21 | 2 | 2, 3 | 2 |
| 22 | 2 | 4, 5 | 2 |
| 23 | 2 | 6, 7 | 2 |
| 24 | 2 | 0, 4 | 2 |
| 25 | 2 | 2, 6 | 2 |
| 26 | 2 | 0, 1, 4 | 2 |
| 27 | 2 | 2, 3, 6 | 2 |
| 28 | 2 | 0, 1, 4, 5 | 2 |
| 29 | 2 | 2, 3, 6, 7 | 2 |
| 30 | 2 | 0, 2, 4, 6 | 2 |
| 31 | Reserved | Reserved | Reserved |

As mentioned above, the number of DMRS CDM group(s) without data may refer to a number of CDM groups that may be assigned to the transceiver nodes 210 serving the UE 115. Each CDM group may be associated with antenna ports that a transceiver node 210 may transmit over. For instance, antenna ports 0, 1, 4, and 5 may be associated with a first CDM group and antenna ports 2, 3, 6, and 7 may be associated with a second CDM group. In one example, if transceiver node 210-c indicates (e.g., via DCI) that the number of DMRS CDM groups is equal to 1, the UE 115 may assume that one CDM group is assigned to transceiver node 210-c (e.g., either the first CDM group or the second CDM group). As such, the UE 115 may assume that transceiver node 210-c may transmit corresponding PDSCHs associated with just that CDM group (e.g., just PDSCH 310 or PDSCH 320). Alternatively, if the number of DMRS CDM groups is greater than 1, the UE may assume that multiple CDM groups may be assigned to transceiver node 210-c. For instance, if the number of DMRS CDM groups is two, the UE 115 may assume that two CDM groups are assigned to transceiver node 210-c (e.g., both the first CDM group and the second CDM group). As such, the UE 115 may assume that transceiver node 210-c may transmit corresponding PDSCHs associated with either of the CDM groups.

The DMRS port(s) parameter may refer to which DMRS port that PDSCH DMRS within a resource block 330 are associated with. For instance, even though the number of DMRS CDM group(s) parameter may indicate which CDM groups are associated with DMRS transmissions, the parameter may not specify which port specifically a UE 115 may receive DMRS transmissions from. The DMRS port(s) parameter may specify which port the UE 115 may receive DMRS from. For instance, if the DMRS port(s) parameter is equal to 1, the UE 115 may receive the DMRSs of the corresponding PDSCHs from antenna port 1 of transceiver node 210-c.

A first of the set of DMRS port mapping tables may be represented by Table 4, as shown below.

TABLE 4

Multi-transceiver-node DMRS port mapping table #1

| Value | Number of DMRS CDM group(s) without data | DMRS port(s) | Number of front-load symbols |
|---|---|---|---|
| 0 | Reserved | Reserved | Reserved |
| 1 | Reserved | Reserved | Reserved |
| 2 | Reserved | Reserved | Reserved |
| 3 | 2 | 0 | 1 |
| 4 | 2 | 1 | 1 |
| 5 | 2 | 2 | 1 |
| 6 | 2 | 3 | 1 |
| 7 | 2 | 0, 1 | 1 |
| 8 | 2 | 2, 3 | 1 |
| 9 | Reserved | Reserved | Reserved |
| 10 | Reserved | Reserved | Reserved |
| 11 | Reserved | Reserved | Reserved |
| 12 | 2 | 0 | 2 |
| 13 | 2 | 1 | 2 |
| 14 | 2 | 2 | 2 |
| 15 | 2 | 3 | 2 |
| 16 | 2 | 4 | 2 |
| 17 | 2 | 5 | 2 |
| 18 | 2 | 6 | 2 |
| 19 | 2 | 7 | 2 |
| 20 | 2 | 0, 1 | 2 |
| 21 | 2 | 2, 3 | 2 |
| 22 | 2 | 4, 5 | 2 |
| 23 | 2 | 6, 7 | 2 |
| 24 | 2 | 0, 4 | 2 |
| 25 | 2 | 2, 6 | 2 |
| 26 | 2 | 0, 1, 4 | 2 |
| 27 | 2 | 2, 3, 6 | 2 |
| 28 | 2 | 0, 1, 4, 5 | 2 |
| 29 | 2 | 2, 3, 6, 7 | 2 |
| 30 | Reserved | Reserved | Reserved |
| 31 | Reserved | Reserved | Reserved |

A second of the set of DMRS port mapping tables may be represented by Table 5, as shown below.

TABLE 5

Multi-transceiver node DMRS port mapping table #2

| Value | Number of DMRS CDM group(s) without data | DMRS port(s) | Number of front-load symbols |
|---|---|---|---|
| 0 | Reserved | Reserved | Reserved |
| 1 | Reserved | Reserved | Reserved |
| 2 | Reserved | Reserved | Reserved |

TABLE 5-continued

Multi-transceiver node DMRS port mapping table #2

| Value | Number of DMRS CDM group(s) without data | DMRS port(s) | Number of front-load symbols |
|---|---|---|---|
| 3 | 1 | 0 | 1 |
| 4 | 1 | 1 | 1 |
| 5 | 1 | 2 | 1 |
| 6 | 1 | 3 | 1 |
| 7 | 1 | 0, 1 | 1 |
| 8 | 1 | 2, 3 | 1 |
| 9 | Reserved | Reserved | Reserved |
| 10 | Reserved | Reserved | Reserved |
| 11 | Reserved | Reserved | Reserved |
| 12 | 1 | 0 | 2 |
| 13 | 1 | 1 | 2 |
| 14 | 1 | 2 | 2 |
| 15 | 1 | 3 | 2 |
| 16 | 1 | 4 | 2 |
| 17 | 1 | 5 | 2 |
| 18 | 1 | 6 | 2 |
| 19 | 1 | 7 | 2 |
| 20 | 1 | 0, 1 | 2 |
| 21 | 1 | 2, 3 | 2 |
| 22 | 1 | 4, 5 | 2 |
| 23 | 1 | 6, 7 | 2 |
| 24 | 1 | 0, 4 | 2 |
| 25 | 1 | 2, 6 | 2 |
| 26 | 1 | 0, 1, 4 | 2 |
| 27 | 1 | 2, 3, 6 | 2 |
| 28 | 1 | 0, 1, 4, 5 | 2 |
| 29 | 1 | 2, 3, 6, 7 | 2 |
| 30 | Reserved | Reserved | Reserved |
| 31 | Reserved | Reserved | Reserved |

The rows associated with values 3-8 and 12-29, and 31 of Tables 4 and 5 may be the same as those of Table 3. The rows associated with values 1-3, 9-11, and 30 however, may be different than those of Table 3. The rows associated with values 1-3, 9-11, and 30 may be valid for a single-transceiver-node mode, but may be invalid for a multi-transceiver-node mode. For instance, values 1-3, 9-11, and 30 may be associated with DMRS ports in different CDM groups. As such, Tables 4 and 5 may be considered repurposed versions of Table 3.

In general, values 0, 1, 2, 9, 10, and 11 of Table 2 may be considered counterparts to values 3, 4, 7, 5, 6, and 8, respectively, of Table 2. That is, the DMRS ports of each of these values may be the same as their counterparts, but their number of DMRS CDM group(s) without data may be different. Tables 3, 4, and 5 may be used (e.g., as opposed to Tables 1 and 2) for the increased number of invalid rows associated with Table 3. Additionally, it may be possible to downselect supportable rows of Tables 3, 4, or 5 and to impose constraints to use Tables 1 and 2.

Switching between Table 4 and Table 5 may occur when transceiver nodes 210-*c* or 210-*d* transition from a first rate matching state (e.g., RMmTRPempty) to a second rate matching state (e.g., RMmTRPfilled). For instance, when in RMmTRPempty, transceiver nodes 210-*c* or 210-*d* may use Table 4. Upon transitioning from RMmTRPempty to RMmTRPfilled, transceiver node 210-*c* or 210-*d* may transmit an indication via MAC-CE signaling to the UE 115 to switch from using Table 4 to using Table 5. Additionally or alternatively, upon transitioning from RMmTRPfilled to RMmTRPempty, transceiver nodes 210-*c* or 210-*d* may transmit an indication via MAC-CE signaling to the UE 115 to switch from Table 5 to Table 4.

Figure 4:
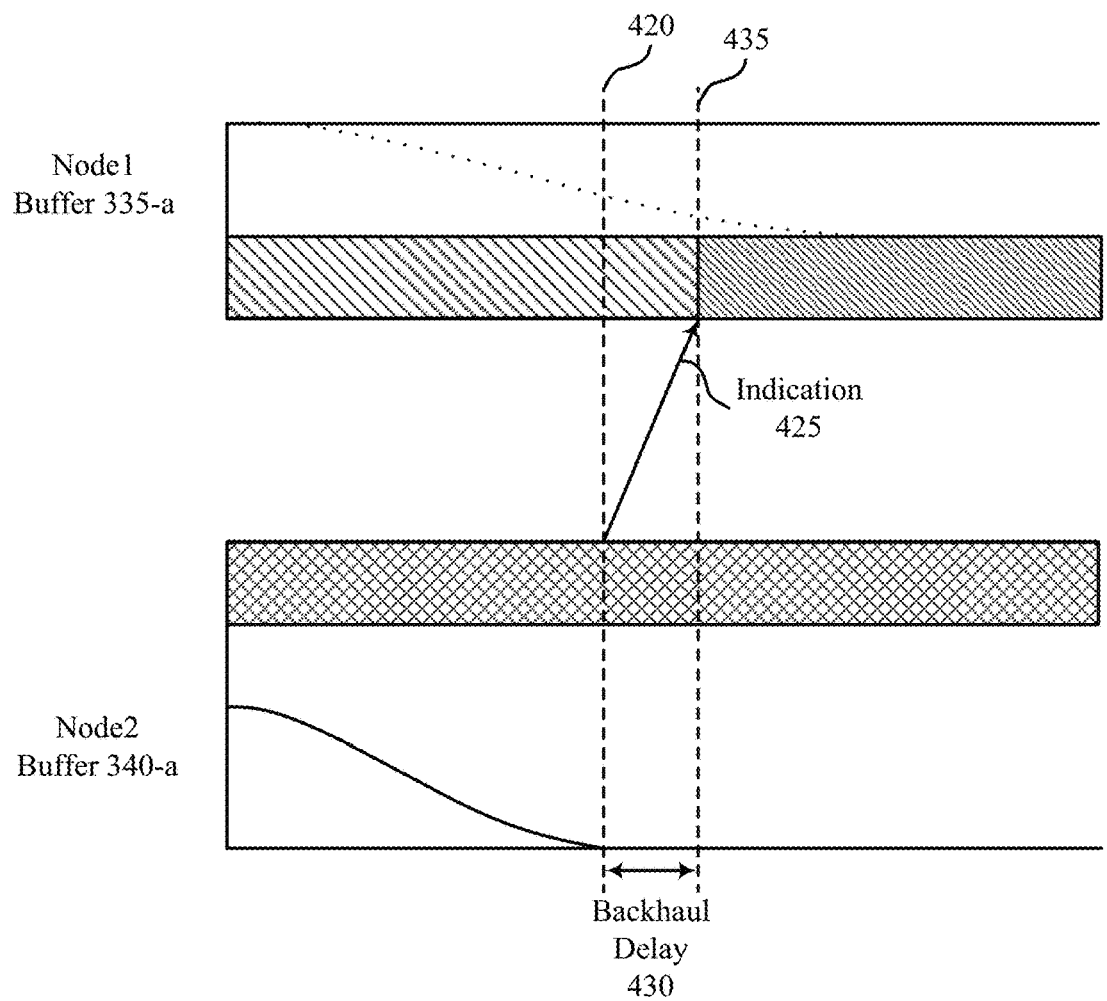
FIG. 4 illustrates an example of an empty buffer event scheme that supports semi-dynamic rate matching in accordance with aspects of the present disclosure.

FIG. 4 illustrates an example of an empty buffer event scheme 400 that supports semi-dynamic rate matching in accordance with aspects of the present disclosure. In some examples, empty buffer event scheme 400 may implement aspects of wireless communications system 200 and PDSCH transmission scheme 300. For instance, empty buffer event scheme 400 may be implemented by transceiver nodes 210 as described with reference to FIG. 2. Additionally, empty buffer event scheme 400 may include a node1 buffer 335-*a*, which may be an example of a node1 buffer 335 as described with reference to FIG. 3, and a node2 buffer 340-*a*, which may be an example of a node2 buffer 340 as described with reference to FIG. 3. In some cases, empty buffer event scheme 400 may provide an example of an empty buffer event as described with reference to FIGS. 2 and 3. Initially, a first transceiver node 210 containing node1 buffer 335-*a* may be operating within node1 empty rate matching state 405 (e.g., RMmTRPempty) and a second transceiver node 210 containing node2 buffer 340-*a* may be operating within a node2 rate matching state 415 (e.g., either of RMmTRPempty or RMmTRPfilled).

In one example, both node1 buffer 335-*a* and node2 buffer 340-*a* may initially contain data. In such an example, the node2 rate matching state 415 of the second transceiver node 210 may be RMmTRPempty. The first transceiver node 210 may transmit PDSCHs that do not contain assignments to REs that may be used for PDSCH DMRS at the second transceiver node 210 (e.g., one of PDSCHs 315 and 325) that and the second transceiver node 210 may transmit PDSCHs that do not contain assignments to REs that may be used for PDSCH DMRS at the first transceiver node 210 (e.g., the other of PDSCHs 315 and 325). As the first or second transceiver node(s) 210 transmit data, their respective buffer(s) (e.g., node1 buffer 335-*a* and node2 buffer 340-*a*) may decrease.

At 420, node2 buffer 340-*a* may reach zero. When node2 buffer 340-*a* reaches zero, the second transceiver node 210 may transmit an indication 425 of an empty buffer event to the first transceiver node 210. In some cases, the indication 425 may travel from the second transceiver node 210 to the first transceiver node 210 with a backhaul delay 430. While the indication 425 is traveling to the first transceiver node 210, the first transceiver node 210 may continue to transmit PDSCHs of the same configurations as before 420 (e.g., the one of PDSCH 315 or PDSCH 325). The second transceiver node 210 may maintain the node2 rate matching state 415 (e.g., RMmTRPempty) after transmitting the indication.

At 435, the first transceiver node 210 may receive the indication 425. Upon receiving the indication 425, the first transceiver node 210 may switch from the RMmTRPempty state to the RMmTRPfilled state. For example, the node1 buffer 335-*a* may have node1 filled rate matching state 410. Additionally, the first transceiver node 210 may switch to transmitting PDSCHs that assign PDSCH data to REs that may be used for PDSCH DMRS at the second transceiver node 210. For instance, if the first transceiver node 210 was transmitting PDSCHs 315, the first transceiver node 210 may begin transmitting PDSCHs 310 after or at 435 and if the first transceiver node 210 was transmitting PDSCHs 325, the first transceiver node 210 may begin transmitting PDSCHs 320 after or at 435.

In another example, node1 buffer 335-*a* may initially have no data and node2 buffer 340-*a* may initially contain data. In such an example, the node2 rate matching state 415 of the second transceiver node 210 may be RMmTRPfilled. The second transceiver node 210 may transmit PDSCHs that assign PDSCH data to REs that may be used for PDSCH DMRS at the second transceiver node 210 (e.g., one of PDSCHs 310 or 320). As the second transceiver node 210 transmits PDSCHs, node2 buffer 340-*a* may decrease.

At 420, node2 buffer 340-*a* may reach zero. When node2 buffer 340-*a* reaches zero, the second transceiver node 210 may transmit an indication of the empty buffer event. In some cases, the indication 425 may travel from the second transceiver node 210 to the first transceiver node 210 with a backhaul delay 430. While the indication 425 is traveling to the first transceiver node 210, the first transceiver node 210 may continue to transmit PDSCHs of the same configurations as before 420 (e.g., the one of PDSCH 310 or PDSCH 320). The second transceiver node 210 may maintain the node2 rate matching state 415 (e.g., RMmTRPfilled) after transmitting the indication.

At 435, the first transceiver node 210 may receive the indication 425. Upon receiving the indication 425, the first transceiver node 210 may switch from the RMmTRPempty state to the RMmTRPfilled state. The first transceiver node 210 may not transmit PDSCHs conveying data from node1 buffer 335-*a* because node1 buffer 335-*a* may be empty at 435.

Figure 5:
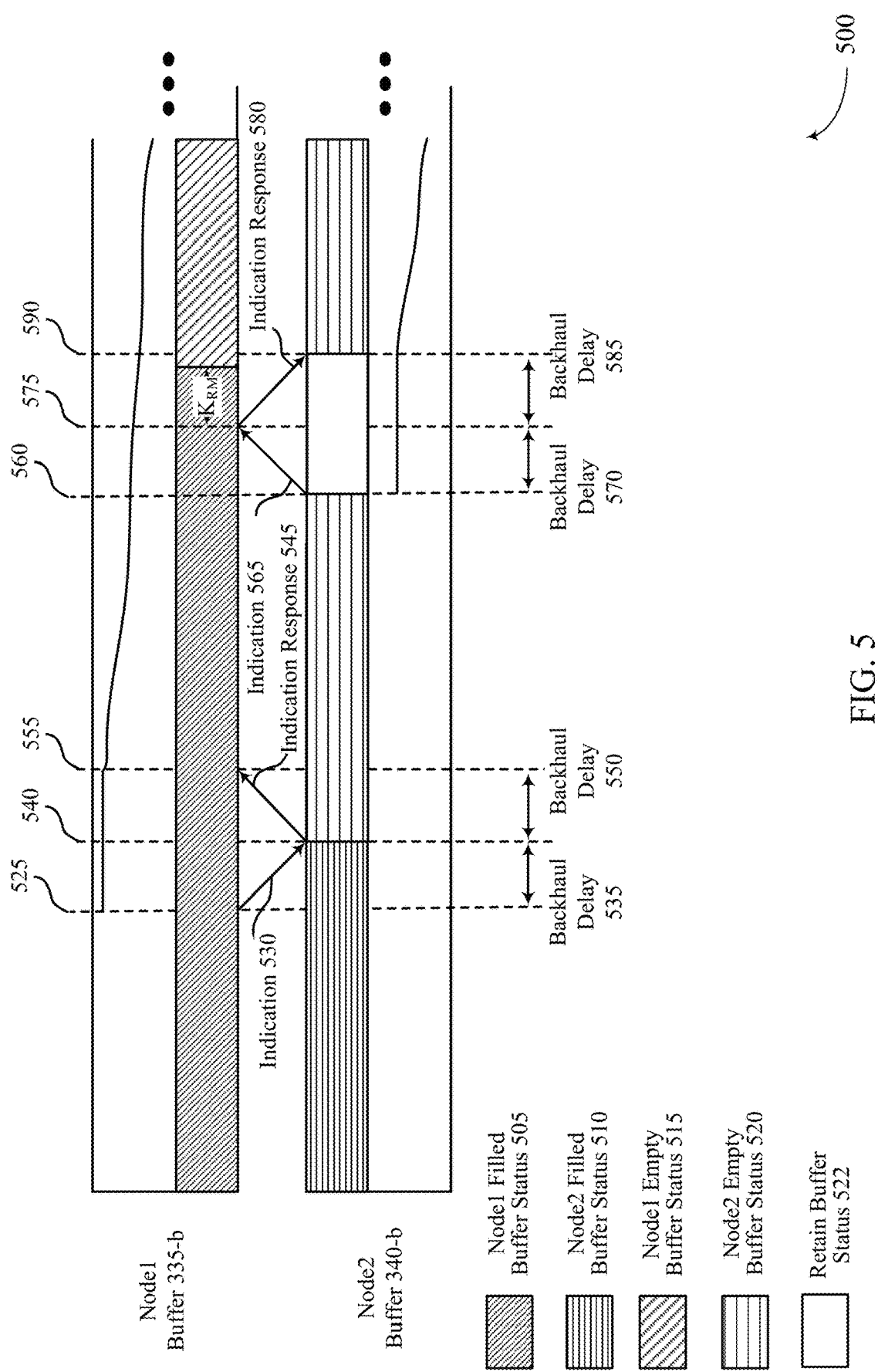
FIG. 5 illustrates an example of a new data event scheme that supports semi-dynamic rate matching in accordance with aspects of the present disclosure.

FIG. 5 illustrates an example of a new data event scheme 500 that supports semi-dynamic rate matching in accordance with aspects of the present disclosure. In some examples, new data event scheme 500 may implement aspects of wireless communications systems 200 and PDSCH transmission scheme 300. For instance, new data event scheme 500 may be implemented by transceiver nodes 210 as described with reference to FIG. 2. Additionally, new data event scheme 500 may include a node1 buffer 335-*b*, which may be an example of a node1 buffer 335 as described with reference to FIG. 3 and a node2 buffer 340-*b*, which may be an example of a node2 buffer 340 as described with reference to FIG. 3. New data event scheme 500 may demonstrate examples of new data events as described with reference to FIG. 2 and FIG. 3.

At an initial time, a first transceiver node 210 containing node1 buffer 335-*b* may be operating within node1 filled buffer status 505 (e.g., RMmTRPfilled) and a second transceiver node 210 containing node2 buffer 340-*b* may be operating within node2 filled buffer status 510 (e.g., RMmTRPfilled). Additionally, at the initial time, neither node1 buffer 335-*b* nor node2 buffer 340-*b* may contain data. As such, in between the initial time and 525, neither the first nor second transceiver nodes 210 may transmit PDSCHs to a UE 115.

At 525, node1 buffer 335-*b* may have new data to transmit to a UE 115 (e.g., the first transceiver node 210 may receive new data from a higher entity). The first transceiver node 210 may transmit an indication 530 of a new data event to the second transceiver node 210. The indication 530 may travel for a time spanning a backhaul delay 535 before arriving at the second transceiver node 210 at 540.

At 540, the second transceiver node 210 may receive the indication 530 and may transmit an indication response 545. If the second transceiver node 210 successfully decodes the indication, transceiver node 210 may transition from node2 filled buffer status 510 to node2 empty buffer status 520 (e.g., RMmTRPempty). Additionally, the indication response 545 may include an ACK. If the second transceiver node 210 does not successfully decode the indication, the indication response 545 may include a NACK. Upon receiving the NACK, the first transceiver node 210 may retransmit the indication 530. In some cases, there may be a delay between receiving the indication 530 and transmitting the indication response 545. In some cases, the second transceiver node 210 may switch from node2 filled buffer status 510 to node2 empty buffer status 520 based on receiving (e.g., as soon as receiving) the indication 530.

At 555, the first transceiver node 210 may receive the indication response 545 after a backhaul delay 550. The first transceiver node 210 may start transmitting PDSCHs that assign PDSCH data to REs that may be used for PDSCH DMRS at the second transceiver node 210 (e.g., one of PDSCHs 310 or 320) based on the new data arriving (e.g., as soon as the new data arrives, such as at 525). Alternatively, the first transceiver node may start transmitting such PDSCHs after receiving the ACK at 555. Between 555 and 560, the first transceiver node may transmit one or more PDSCHs.

At 560, node2 buffer 340-*b* may have new data to transmit to the UE 115 (e.g., the second transceiver node 210 may receive the new data from a higher entity). The second transceiver node 210 may transmit an indication 565 of the new data event to the first transceiver node 210. The indication 565 may travel for a time spanning a backhaul delay 570 before arriving at the first transceiver node 210 at 575. In between 560 and 575, the first transceiver node 210 may continue transmitting PDSCHs that assign PDSCH data to REs that may be used for PDSCH DMRS at the second transceiver node 210, if any. As such, node1 buffer 335-*a* may continue to decrease.

At 575, the first transceiver node 210 may receive the indication 565 and may transmit an indication response 580. If the second transceiver node 210 successfully decodes the indication, transceiver node 210 may wait $K_{RM}$ slots from 575 and then transition from node1 filled buffer status 505 to node1 empty buffer status 515 (e.g., RMmTRPempty). Additionally, the indication response 575 may contain an ACK. In some cases, $K_{RM}$ may be an approximation of the backhaul delay 585 and may be less than, equal to, or greater than the number of slots between 575 and 590. During the span of $K_{RM}$, transceiver node 210 may continue to transmit PDSCHs that assign PDSCH data to REs that may be used for PDSCH DMRS at the second transceiver node 210. At the end of the span of $K_{RM}$, the first transceiver node 210 may switch from operating within the node1 filled buffer status 505 to the node1 empty buffer status 515. After making the switch, the first transceiver node 210 may switch from transmitting PDSCHs that assign PDSCH data to REs that may be used for PDSCH DMRS at the second transceiver node 210 to transmitting PDSCHs that do not assign PDSCH data to REs that may be used for PDSCH DMRS at the second transceiver node 210. For instance, if the first transceiver node 210 transmits PDSCHs 310 before the end of the span of $K_{RM}$, the first transceiver node 210 may begin transmitting PDSCHs 315, and if the first transceiver node 210 transmits PDSCHs 320 before the end of the span of $K_{RM}$, the first transceiver node 210 may begin transmitting PDSCHs 325.

$K_{RM}$ may be an operation parameter that is configured by the network. $K_{RM}$ may be configured as an estimate (e.g., a suitable or best estimate) of a one-way backhaul delay 585. In general, the data throughput from the first transceiver node 210 may increase as $K_{RM}$ increases, as long as $K_{RM}$ remains smaller than the backhaul delay 585. If the first transceiver node 210 does not successfully decode the indication 565, the first transceiver node 210 may transmit a NACK to the second transceiver node 210. Upon receiving the NACK, the second transceiver node may retransmit the indication 565 of the new data event. Additionally, the first transceiver node 210 may not wait $K_{RM}$ slots until the first transceiver node 210 successfully decodes the indication 565. In some cases, there may be a delay between receiving the indication 565 and transmitting an indication response 580.

At 590, the second transceiver node 210 may receive the indication response 580. In between 560 and 590, the second transceiver node 210 may maintain a retain buffer status 522, in which the second transceiver node 210 refrains from transmitting the new data within node2 buffer 340-*b*. Upon receiving the ACK, the second transceiver node 210 may begin transmitting PDSCHs that convey the contents of node2 buffer 340-*b*. If the first transceiver node 210 was transmitting PDSCHs 310 before 560, the second transceiver node 210 may transmit PDSCHs 325. If the first transceiver node 210 was transmitting PDSCHs 320 before 560, the second transceiver node 210 may transmit PDSCHs 315.

Figure 6A:
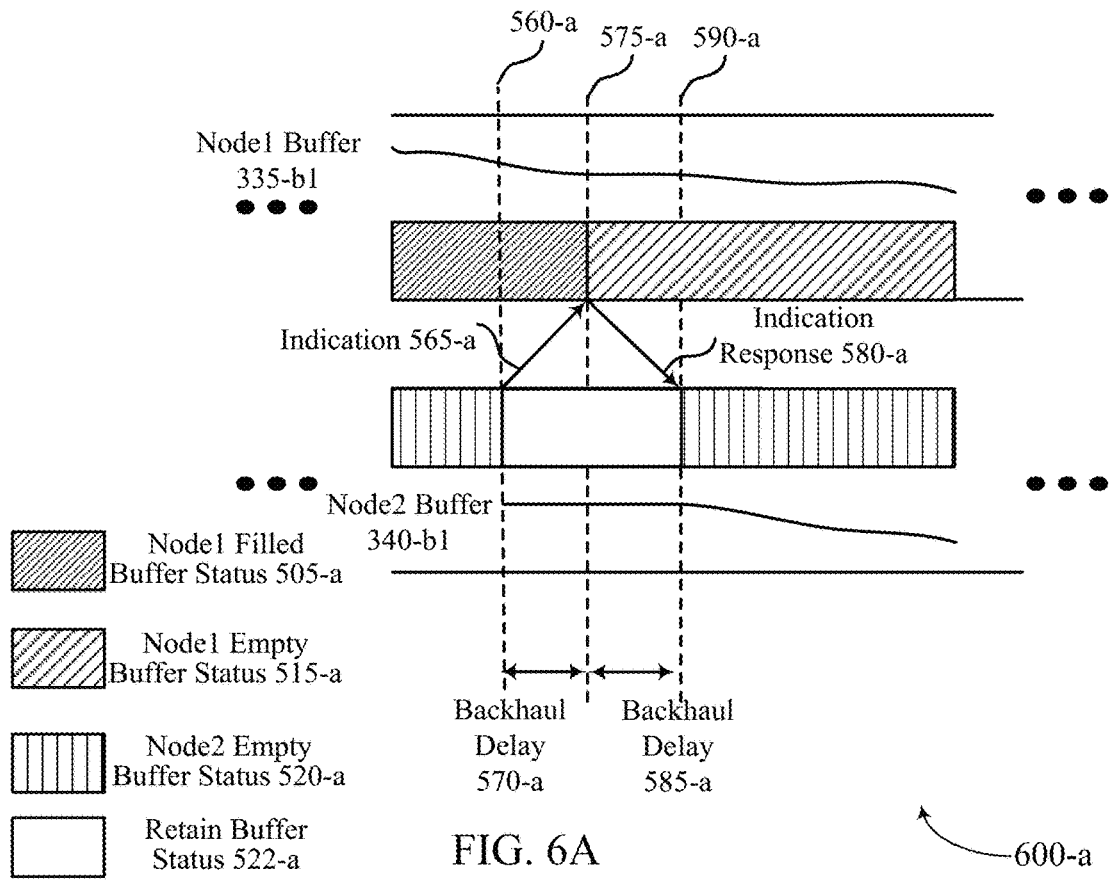
FIGS. 6A and 6B illustrate examples of new data event schemes that support semi-dynamic rate matching in accordance with aspects of the present disclosure.

FIG. 6A illustrates an example of a new data event scheme 600-*a* that supports semi-dynamic rate matching in accordance with aspects of the present disclosure. In some examples, new data event scheme 600-*a* may implement aspects of wireless communications system 200 and new data event scheme 500. For instance, new data event scheme 600-*a* may be implemented by transceiver nodes 210 as described with reference to FIG. 2. Additionally, new data event scheme 600-*a* may include a node1 buffer 335-*b*1, which may be an example of a node1 buffer 335-*b* as described with reference to FIG. 5 and a node2 buffer 340-*b*1, which may be an example of a node2 buffer 340-*b* as described with reference to FIG. 5. Additionally, new data event scheme 600-*a* may include node1 filled buffer status 505-*a*, node1 empty buffer status 515-*a*, node2 empty buffer status 520-*a*, retain buffer status 522-*a*, indication 565-*a*, backhaul delay 570-*a*, indication response 580-*a*, and backhaul delay 585-*a*, which may correspond to node1 filled buffer status 505, node1 empty buffer status 515, node2 empty buffer status 520, retain buffer status 522, indication 565, backhaul delay 570, indication response 580, and backhaul delay 585, respectively, as described with reference to FIG. 5.

At 560-*a*, node2 buffer 340-*b*1 may have new data to transmit to the UE 115. The second transceiver node 210 may transmit an indication 565-*a* of the new data event to the first transceiver node 210. The indication 565-*a* may travel for a time spanning a backhaul delay 570-*a* before arriving at the first transceiver node 210 at 575-*a*. In between 560-*a* and 575-*a*, the first transceiver node 210 may continue transmitting PDSCHs that assign PDSCH data to REs that may be used for PDSCH DMRS at the second transceiver node 210, if any. As such node1 buffer 335-*a* may continue to decrease.

At 575-*a*, the first transceiver node 210 may receive the indication 565-*a* and may transmit an indication response 580-*a*. If the second transceiver node 210 successfully decodes the indication, transceiver node 210 may transition from node1 filled buffer status 505-*a* to node1 empty buffer status 515-*a*. Additionally, the indication response 575-*a* may contain an ACK. After making the transition, the first transceiver node 210 may switch from transmitting PDSCHs that assign PDSCH data to REs that may be used for PDSCH DMRS at the second transceiver node 210 to transmitting PDSCHs that do not assign PDSCH data to REs that may be used for PDSCH DMRS at the second transceiver node 210. For instance, if first transceiver node 210 transmits PDSCHs 310 before 575-*a*, the first transceiver node 210 may begin transmitting PDSCHs 315, and if the first transceiver node 210 transmits PDSCHs 320 before 575-*a*, the first transceiver node 210 may begin transmitting PDSCHs 325.

If the first transceiver node 210 does not successfully decode the indication 565-*a*, the first transceiver node 210 may transmit a NACK to the second transceiver node 210. Upon receiving the NACK, the second transceiver node may retransmit the indication 565-*a*. The first transceiver node 210 may not make the transition from node1 filled buffer status 505-*a* to node1 empty buffer status 515-*a* until the first transceiver node 210 successfully decodes the indication 565-*a*. In some cases, there may be a delay between receiving the indication 565-*a* and transmitting the indication response 580-*a*.

At 590-*a*, the second transceiver node 210 may receive the indication response 580-*a*. In between 560-*a* and 590-*a*, the second transceiver node 210 may maintain a retain buffer status 522-*a*, in which the second transceiver node 210 refrains from transmitting the new data within node2 buffer 340-*b*1. Upon receiving the ACK, the second transceiver node 210 may begin transmitting PDSCHs that convey the contents of node2 buffer 340-*b*1. If the first transceiver node 210 was transmitting PDSCHs 310 before 560-*a*, the second transceiver node 210 may transmit PDSCHs 325. If the first transceiver node 210 was transmitting PDSCHs 320 before 560-*a*, the second transceiver node 210 may transmit PDSCHs 315.

Figure 6B:
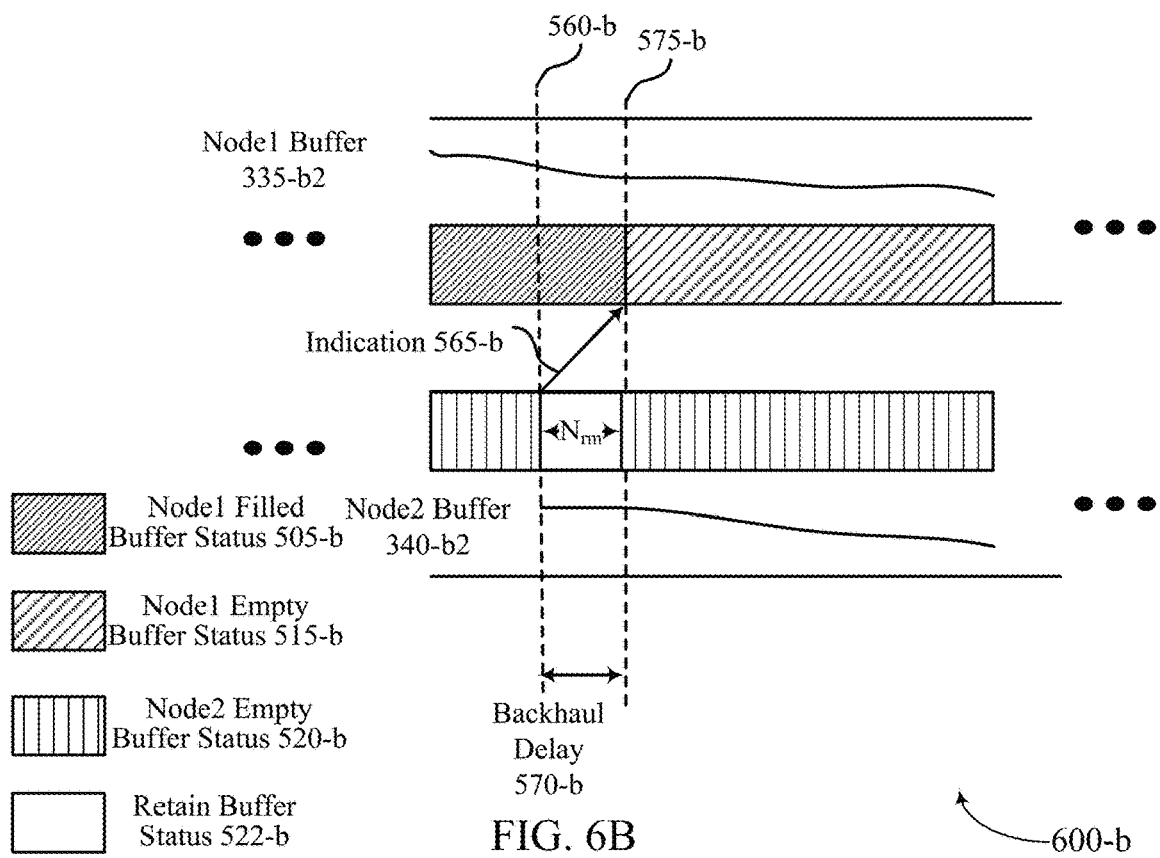

FIG. 6B illustrates an example of a new data event scheme 600-*b* that supports semi-dynamic rate matching in accordance with aspects of the present disclosure. In some examples, new data event scheme 600-*b* may implement aspects of wireless communications system 100. For instance, new data event scheme 600-*b* may be implemented by transceiver nodes 210 as described with reference to FIG. 2. Additionally, new data event scheme 600-*b* may include a node1 buffer 335-*b*2, which may be an example of a node1 buffer 335-*b* as described with reference to FIG. 5 and a node2 buffer 340-*b*2, which may be an example of a node2 buffer 340-*b* as described with reference to FIG. 5. Additionally, node1 filled buffer status 505-*b*, node1 empty buffer status 515-*b*, node2 empty buffer status 520-*b*, retain buffer status 522-*b*, indication 565-*b*, and backhaul delay 570-*b*, which may correspond to node1 filled buffer status 505, node1 empty buffer status 515, node2 empty buffer status 520, retain buffer status 522, indication 565, backhaul delay 570, indication response 580, and backhaul delay 585, as described with reference to FIG. 5.

At 560-*b*, node2 buffer 340-*b*2 may have new data to transmit to the UE 115. The second transceiver node 210 may transmit an indication 565-*b* of a new data event to the first transceiver node 210. The indication 565-*b* may travel for a time spanning a backhaul delay 570-*b* before arriving at the first transceiver node 210 at 575-*b*. In between 560-*b* and 575-*b*, the first transceiver node 210 may continue transmitting PDSCHs that assign PDSCH data to REs that may be used for PDSCH DMRS at the second transceiver node 210, if any. As such node1 buffer 335-*a* may continue to decrease.

Additionally, after 560-*b*, the second transceiver node 210 may operate within a retain buffer status 522-*b* for $N_{RM}$ slots. In some cases, $N_{RM}$ may be an approximation of the backhaul delay 570-*b* and may be less than, equal to, or greater than the number of slots between 560-*b* and 575-*b*. During the span of $N_{RM}$, the second transceiver node 210 may refrain from transmitting PDSCHs to the UE 115. At the end of the span of $N_{RM}$, the second transceiver node 210 may begin transmitting PDSCHs that convey the contents of node2 buffer 340-*b*2. If the first transceiver node 210 was transmitting PDSCHs 310 before 560-*b*, the second transceiver node 210 may transmit PDSCHs 325. If the first transceiver node 210 was transmitting PDSCHs 320 before 560-*b*, the second transceiver node 210 may transmit PDSCHs 315.

$N_{RM}$ may be an operation parameter that is configured by the network. $N_{RM}$ may be configured as an estimate (e.g., a best estimate) of a one-way backhaul delay 570-b. In general, the data throughput from the second transceiver node 210 may increase as $N_{RM}$ decreases as long as $N_{RM}$ remains larger than the backhaul delay 570-b. In some cases, $N_{RM}$ and $K_{RM}$, such as described with reference to FIG. 5 may be used in conjunction (e.g., the second transceiver node 210 may wait $N_{RM}$ slots from transmitting the indication 565-b and the first transceiver node 210 may wait $K_{RM}$ slots from receiving the indication 565-b). Additionally or alternatively, the second transceiver node 210 may begin transmitting PDSCHs depending on whichever of $N_{RM}$ or reception of an indication response 580 containing an ACK elapses earlier.

At 575-b, the first transceiver node 210 may receive the indication 565-b. The first transceiver node 210 may transition from node1 filled buffer status 505-b to node1 empty buffer status 515-b. After making the transition, the first transceiver node 210 may switch from transmitting PDSCHs that assign PDSCH data to REs that may be used for PDSCH DMRS at the second transceiver node 210 to transmitting PDSCHs that do not assign PDSCH data to REs that may be used for PDSCH DMRS at the second transceiver node 210. For instance, if the first transceiver node 210 transmits PDSCHs 310 before 575-b, the first transceiver node 210 may begin transmitting PDSCHs 315, and if the first transceiver node 210 transmits PDSCHs 320 before 575-b, the first transceiver node 210 may begin transmitting PDSCHs 325.

Figure 7:
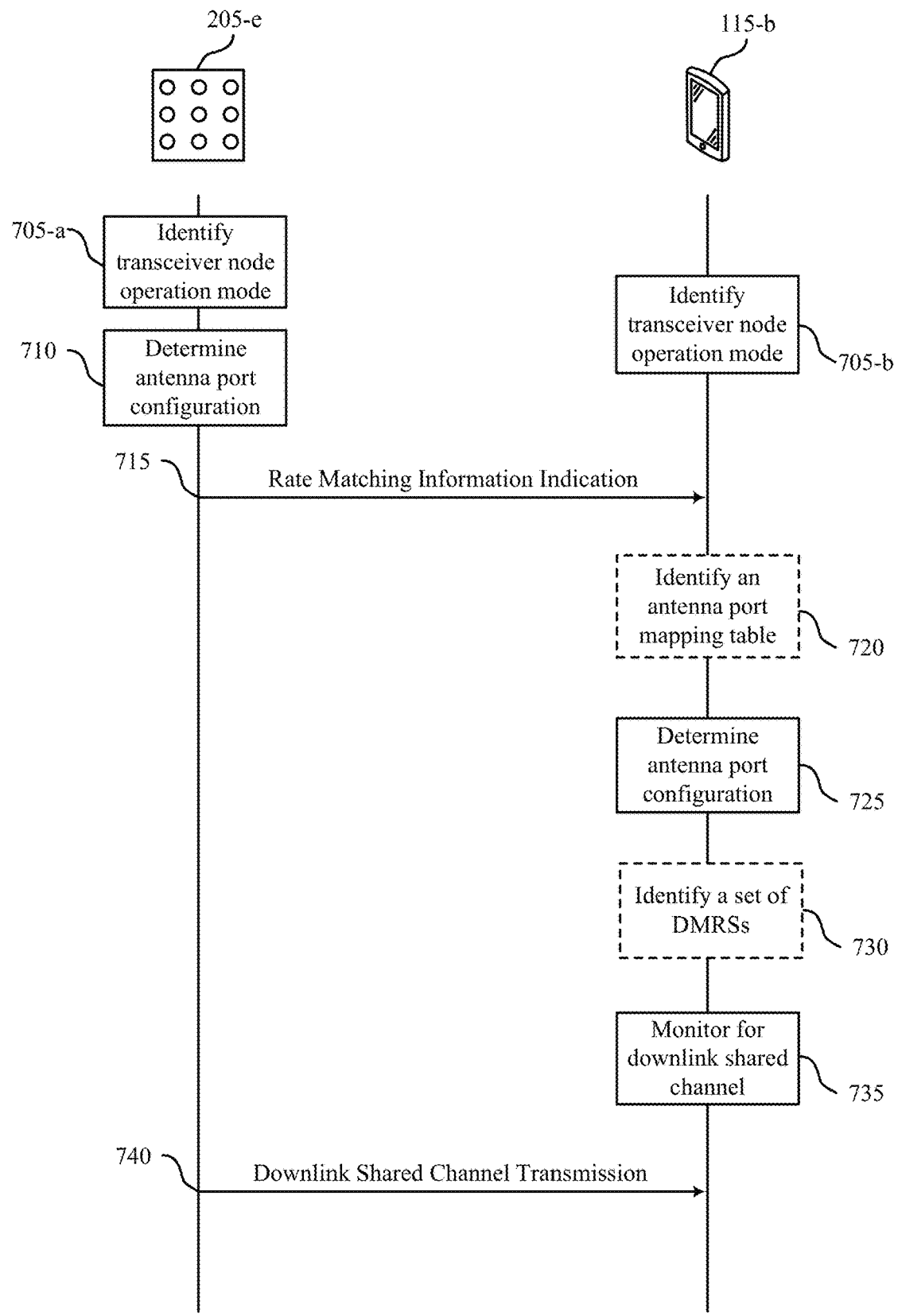
FIGS. 7 and 8 illustrates an example of a process flow that supports semi-dynamic rate matching in accordance with aspects of the present disclosure.

FIG. 7 illustrates an example of a process flow 700 that supports semi-dynamic rate matching in accordance with aspects of the present disclosure. In some examples, process flow 700 may implement aspects of wireless communications systems 100 and 200. For instance, process flow may include UE 115-b, which may be an example of a UE 115 as described with reference to FIG. 1, and transceiver node 205-e, which may be an example of a transceiver node 205 as described with reference to FIG. 2.

At 705-a, transceiver node 205-e may identify a transceiver node operation mode (e.g., a single-transceiver-node mode or a multi-transceiver-node mode) for UE 115-b. UE 115-b may be in communication with transceiver node 205-e.

At 705-b, UE 115-b may identify the transceiver node operation mode for UE 115-b.

At 710, transceiver node 205-e may determine an antenna port configuration for a downlink shared channel for UE 115-b based on the transceiver node operation mode.

At 715, transceiver node 205-e may transmit an indication of rate matching information for the downlink shared channel. The rate matching information may indicate the antenna port configuration. UE 115-b may receive the indication of rate matching information.

At 720, UE 115-b may identify an antenna port mapping table of a set of antenna port mapping tables based on the transceiver node mode operation.

At 725, UE 115-b may determine the antenna port configuration for the downlink shared channel based on the transceiver node operation mode and the rate matching information. Additionally, UE 115-b may determine the antenna port configuration based on the antenna port mapping table.

At 730, UE 115-b may identify a set of DMRSs and a set of DMRS ports for the set of DMRSs based on the antenna port configuration.

At 735, UE 115-b may monitor for the downlink shared channel transmission based on the antenna port configuration.

At 740, transceiver node 205-e may transmit the downlink shared channel transmission.

Figure 8:
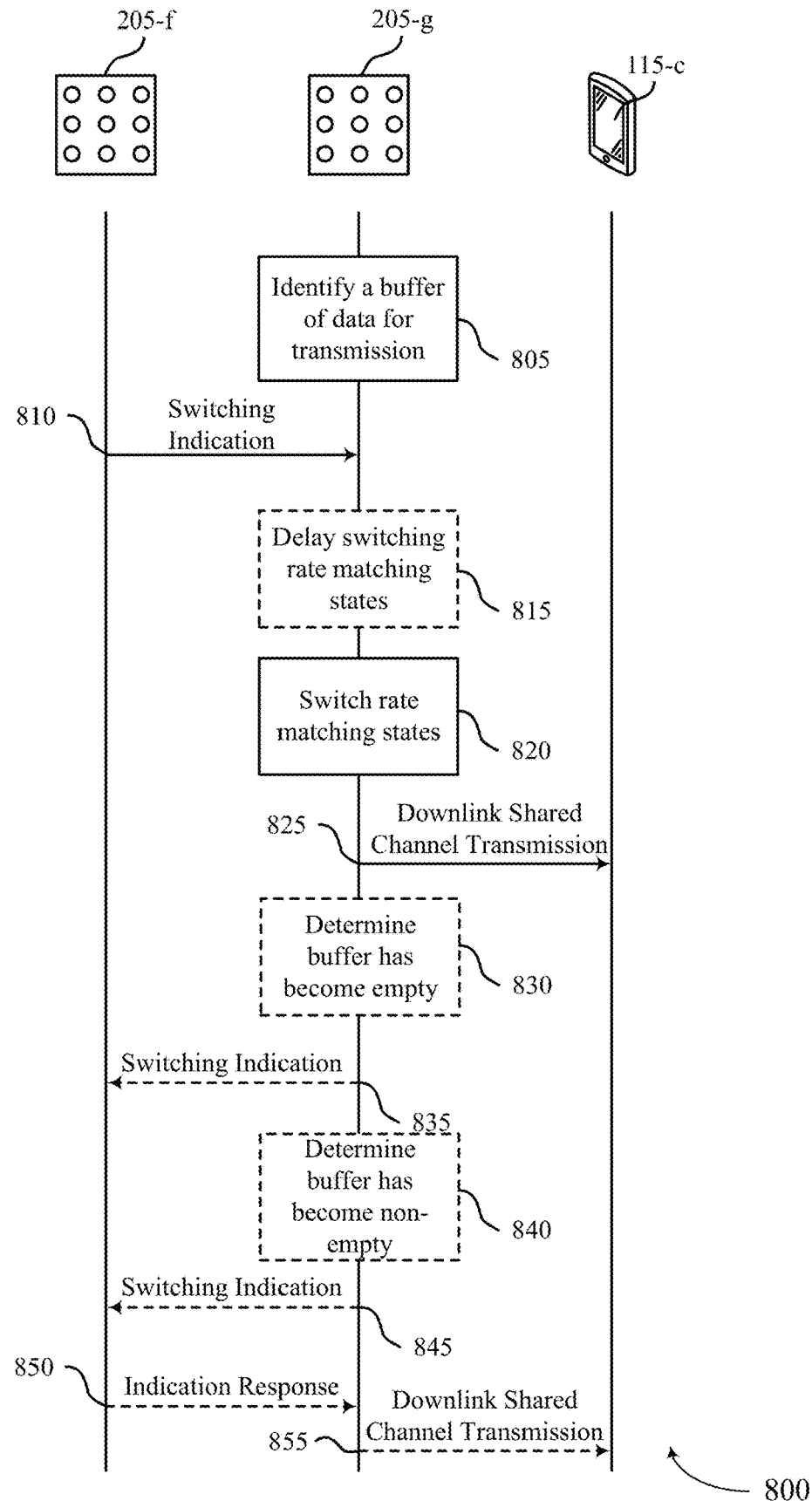

FIG. 8 illustrates an example of a process flow 800 that supports semi-dynamic rate matching in accordance with aspects of the present disclosure. In some examples, process flow 800 may implement aspects of wireless communications system 100. For instance, process flow may include UE 115-c, which may be an example of a UE 115 as described with reference to FIG. 1, and transceiver nodes 205-f and 205-g, which may be examples of transceiver nodes 205 as described with reference to FIG. 2.

At 805, transceiver node 205-g may identify a buffer of data for transmission to UE 115-c. UE 115-c may be in communication with transceiver node 205-g.

At 810, transceiver node 205-f may transmit an indication to switch between rate matching states. Transceiver node 205-g may receive the indication.

At 815, transceiver node 205-g may delay switching from a first rate matching state to a second rate matching state for a number of slots after receiving the indication. Transceiver node 205-g may perform this delay if the buffer of data is non-empty.

At 820, transceiver node 205-g may switch from the first rate matching state to the second rate matching state.

At 825, transceiver node 205-g may transmit a downlink shared channel transmission (e.g., a PDSCH transmission) based on a resource configuration associated with the second rate matching state.

At 830, transceiver node 205-g may determine that the buffer of data has changed from non-empty to empty.

At 835, transceiver node 205-g may transmit an indication to switch between rate matching states. Transceiver node 205-f may receive the indication and may switch from a first rate matching state of transceiver node 205-f to a second rate matching state of transceiver node 205-f.

At 840, transceiver node 205-g may determine that the buffer of data has changed from empty to non-empty (e.g., transceiver node 205-g may receive new data from a higher entity).

At 845, transceiver node 205-g may transmit an indication to switch between rate matching states. Transceiver node 205-f may receive the indication and may switch from the second rate matching state of transceiver node 205-f to the first rate matching state of transceiver node 205-f.

At 850, transceiver node 205-f may transmit response to the indication. The response may, for instance, be an ACK or a NACK. Transceiver node 205-g may receive the indication.

At 855, transceiver node 205-g may transmit a second downlink shared channel transmission. The second downlink shared channel transmission may be transmitted after receiving the ACK or may be transmitted after a delay from transmitting the indication at 845.

Figure 9:
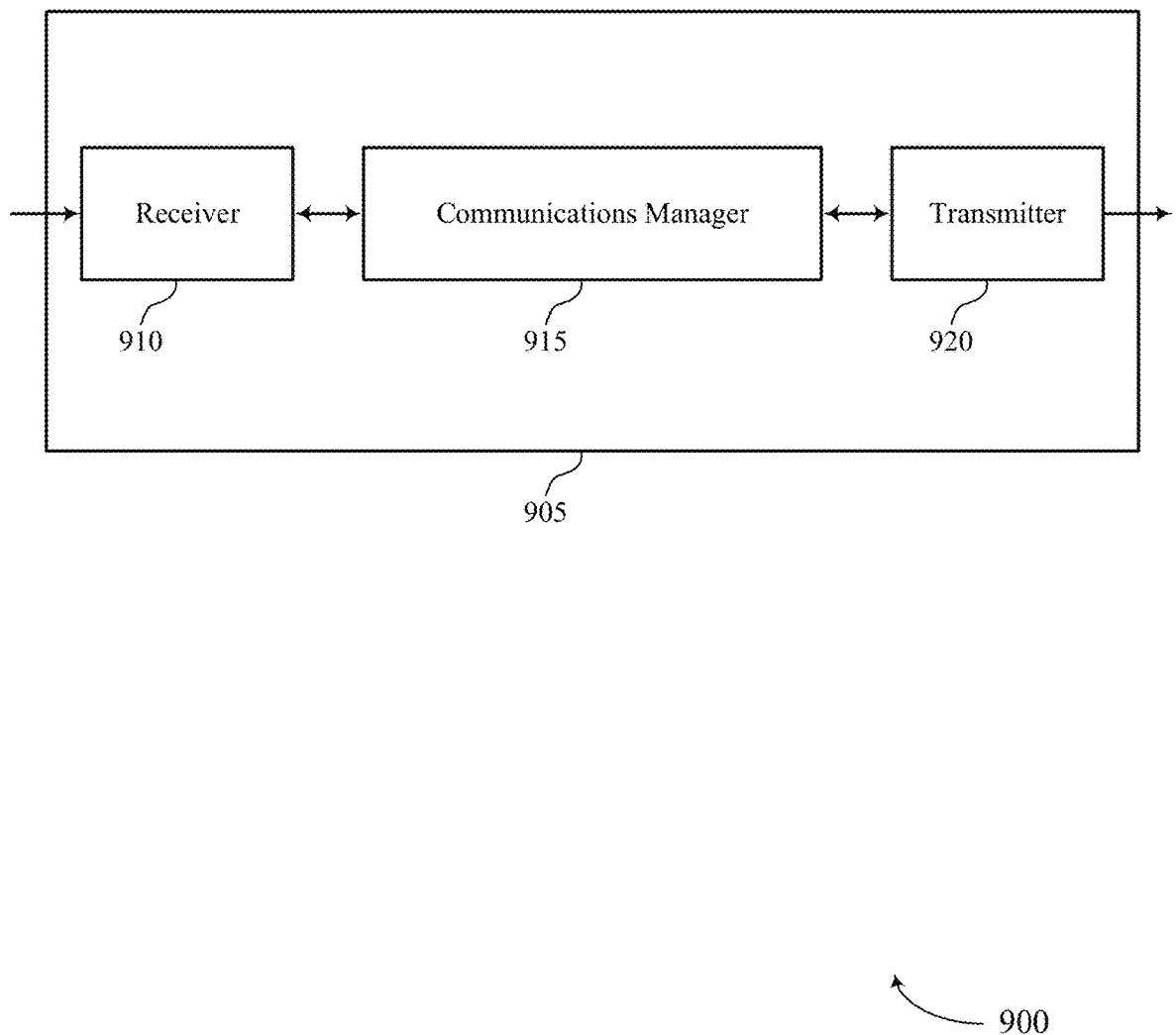
FIGS. 9 and 10 show block diagrams of devices that support semi-dynamic rate matching in accordance with aspects of the present disclosure.

FIG. 9 shows a block diagram 900 of a device 905 that supports semi-dynamic rate matching in accordance with aspects of the present disclosure. The device 905 may be an example of aspects of a UE 115 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to semi-dynamic rate matching, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may identify a transceiver node operation mode for the UE, receive an indication of rate matching information for a downlink shared channel for the UE, determine an antenna port configuration for the downlink shared channel based on the transceiver node operation mode and the rate matching information, and monitor for the downlink shared channel based on the antenna port configuration. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

In some examples, the communications manager 915 may be implemented as an integrated circuit or chipset for a mobile device modem, and the receiver 910 and transmitter 920 may be implemented as analog components (e.g., amplifiers, filters, antennas, etc.) coupled with the mobile device modem to enable wireless transmission and reception over one or more bands.

The communications manager 915 as described herein may be implemented to realize one or more potential advantages. One implementation may enable the device 905 to receive more data from a transceiver node when the device 905 is operating in a multi-transceiver-node mode, which may result in greater capacity for wireless communications at the device 905 and more efficient (e.g., higher throughput) data receptions during one or more monitoring occasions.

Based on techniques for increasing capacity and efficiency of data reception, the device 905 may use fewer monitoring occasions to receive the same amount of data than a device not implementing the techniques of the present disclosure. As such, a processor or one or more processing units of the device 905 associated with monitoring for and receiving data may perform fewer processing operations and spend longer durations in a sleep mode, which may result in improved power savings and increased battery life of the device 905.

Figure 10:
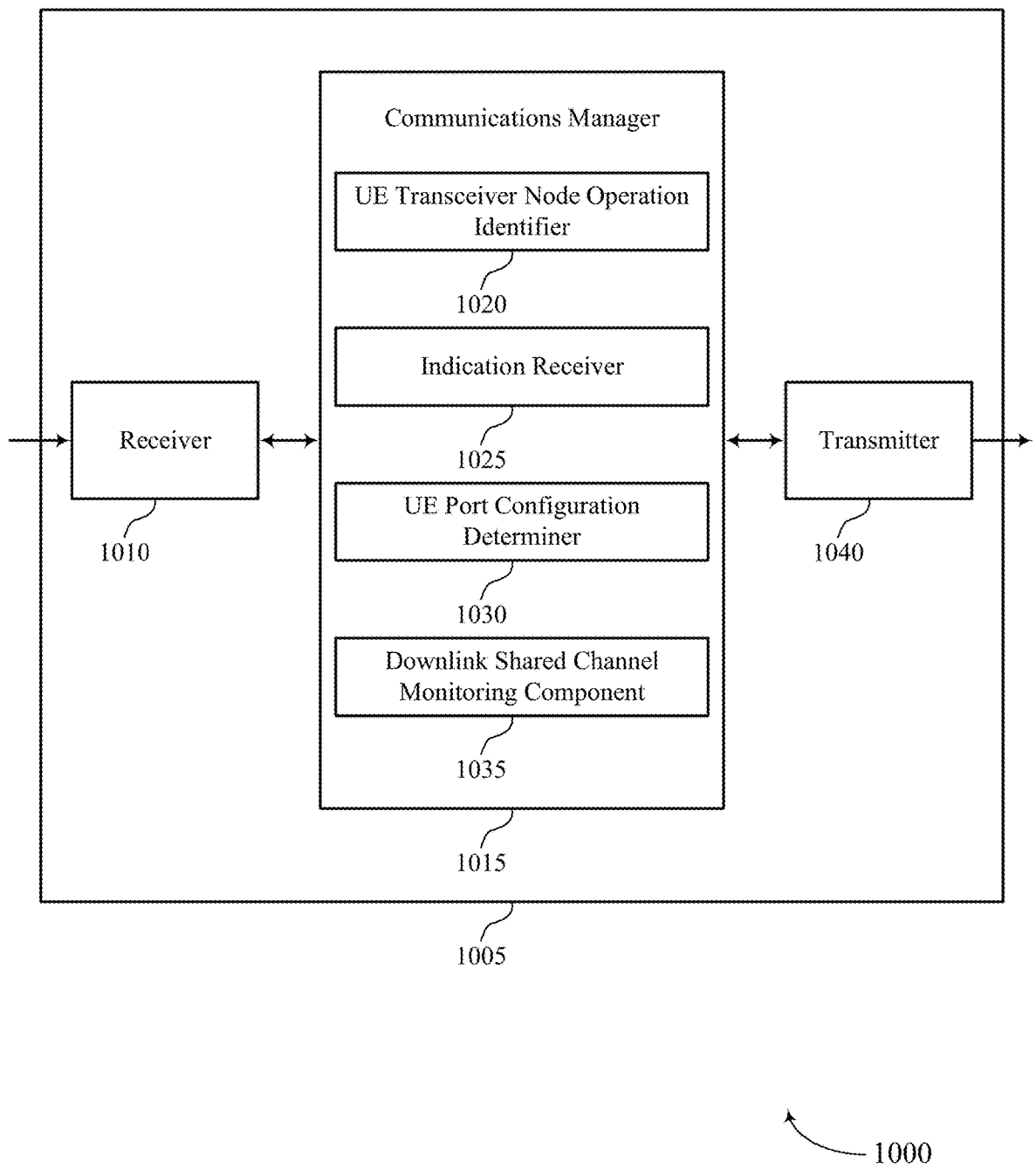

FIG. 10 shows a block diagram 1000 of a device 1005 that supports semi-dynamic rate matching in accordance with aspects of the present disclosure. The device 1005 may be an example of aspects of a device 905, or a UE 115 as described herein. The device 1005 may include a receiver 1010, a communications manager 1015, and a transmitter 1040. The device 1005 may also include a processor. Each of these components may be in communication with one another (e.g., via one or more buses).

The receiver 1010 may receive information such as packets, user data, or control information associated with various information channels (e.g., control channels, data channels, and information related to semi-dynamic rate matching, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a UE transceiver node operation identifier 1020, an indication receiver 1025, a UE port configuration determiner 1030, and a downlink shared channel monitoring component 1035. The communications manager 1015 may be an example of aspects of the communications manager 1210 described herein.

The UE transceiver node operation identifier 1020 may identify a transceiver node operation mode for the UE.

The indication receiver 1025 may receive an indication of rate matching information for a downlink shared channel for the UE.

The UE port configuration determiner 1030 may determine an antenna port configuration for the downlink shared channel based on the transceiver node operation mode and the rate matching information.

The downlink shared channel monitoring component 1035 may monitor for the downlink shared channel based on the antenna port configuration.

The transmitter 1040 may transmit signals generated by other components of the device 1005. In some examples, the transmitter 1040 may be collocated with a receiver 1010 in a transceiver module. For example, the transmitter 1040 may be an example of aspects of the transceiver 1220 described with reference to FIG. 12. The transmitter 1040 may utilize a single antenna or a set of antennas.

Figure 11:
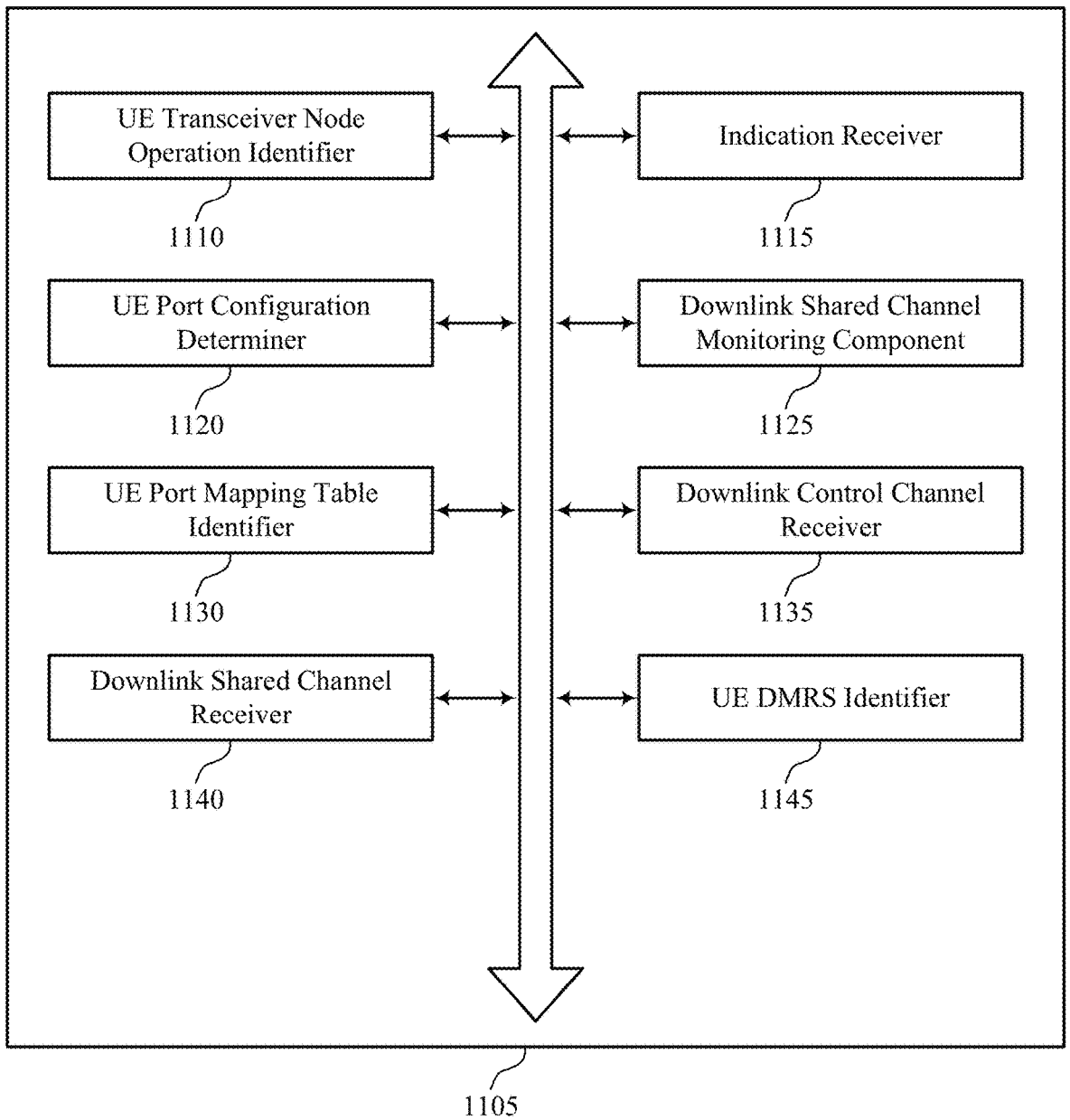
FIG. 11 shows a block diagram of a communications manager that supports semi-dynamic rate matching in accordance with aspects of the present disclosure.

FIG. 11 shows a block diagram 1100 of a communications manager 1105 that supports semi-dynamic rate matching in accordance with aspects of the present disclosure. The communications manager 1105 may be an example of aspects of a communications manager 915, a communications manager 1015, or a communications manager 1210 described herein. The communications manager 1105 may include a UE transceiver node operation identifier 1110, an indication receiver 1115, a UE port configuration determiner 1120, a downlink shared channel monitoring component 1125, a UE port mapping table identifier 1130, a downlink control channel receiver 1135, a downlink shared channel receiver 1140, and a UE DMRS identifier 1145. Each of these modules may communicate, directly or indirectly, with one another (e.g., via one or more buses).

The UE transceiver node operation identifier 1110 may identify a transceiver node operation mode for the UE. In some examples, the UE transceiver node operation identifier 1110 may receive an indication of the transceiver node operation mode or a change in mode operation via control signaling. In some cases, the transceiver node operation mode includes one of a single TRP operation mode or a multiple TRP operation mode. In some cases, the single TRP operation mode is associated with a first antenna port mapping table. In some cases, the multiple TRP operation mode is associated with a second antenna port mapping table different from the first antenna port mapping table. In some cases, the multiple TRP operation mode is associated with a set of antenna port mapping tables including the second antenna port mapping table.

The indication receiver 1115 may receive an indication of rate matching information for a downlink shared channel for the UE.

The UE port configuration determiner 1120 may determine an antenna port configuration for the downlink shared channel based on the transceiver node operation mode and the rate matching information. In some examples, the UE port configuration determiner 1120 may determine the antenna port configuration for the downlink shared channel based on the antenna port mapping table.

The downlink shared channel monitoring component 1125 may monitor for the downlink shared channel based on the antenna port configuration. In some examples, the downlink shared channel monitoring component 1125 may monitor for data of the downlink shared channel via a set of resources allocated based on the antenna port configuration.

The UE port mapping table identifier 1130 may identify an antenna port mapping table of a set of antenna port mapping tables based on the transceiver node operation mode. In some examples, the UE port mapping table identifier 1130 may identify the antenna port mapping table based on an MAC-CE of the downlink control channel. In some cases, the antenna port mapping table includes a DMRS port mapping table indicating a number of DMRS code division multiplexing groups and a set of DMRS port indices. In some cases, the antenna port mapping table of the set of antenna port mapping tables is associated with the transceiver node operation mode. In some cases, a second antenna port mapping table of the set of antenna port mapping tables is associated with a second transceiver node operation mode different from the transceiver node operation mode. In some cases, the antenna port mapping table is a repurposed version of the second antenna port mapping table such that a size of the antenna port mapping table is the same as a size of the second antenna port mapping table.

The downlink control channel receiver 1135 may receive a downlink control channel that includes the indication of rate matching information, where the antenna port mapping table is identified based on the downlink control channel.

The downlink shared channel receiver 1140 may receive the downlink shared channel based on the monitoring, where the downlink shared channel is received via a set of REs allocated for DMRS transmission from another transceiver node based on the antenna port configuration.

The UE DMRS identifier 1145 may identify a set of DMRSs and a set of DMRS port indices based on the antenna port configuration.

Figure 12:
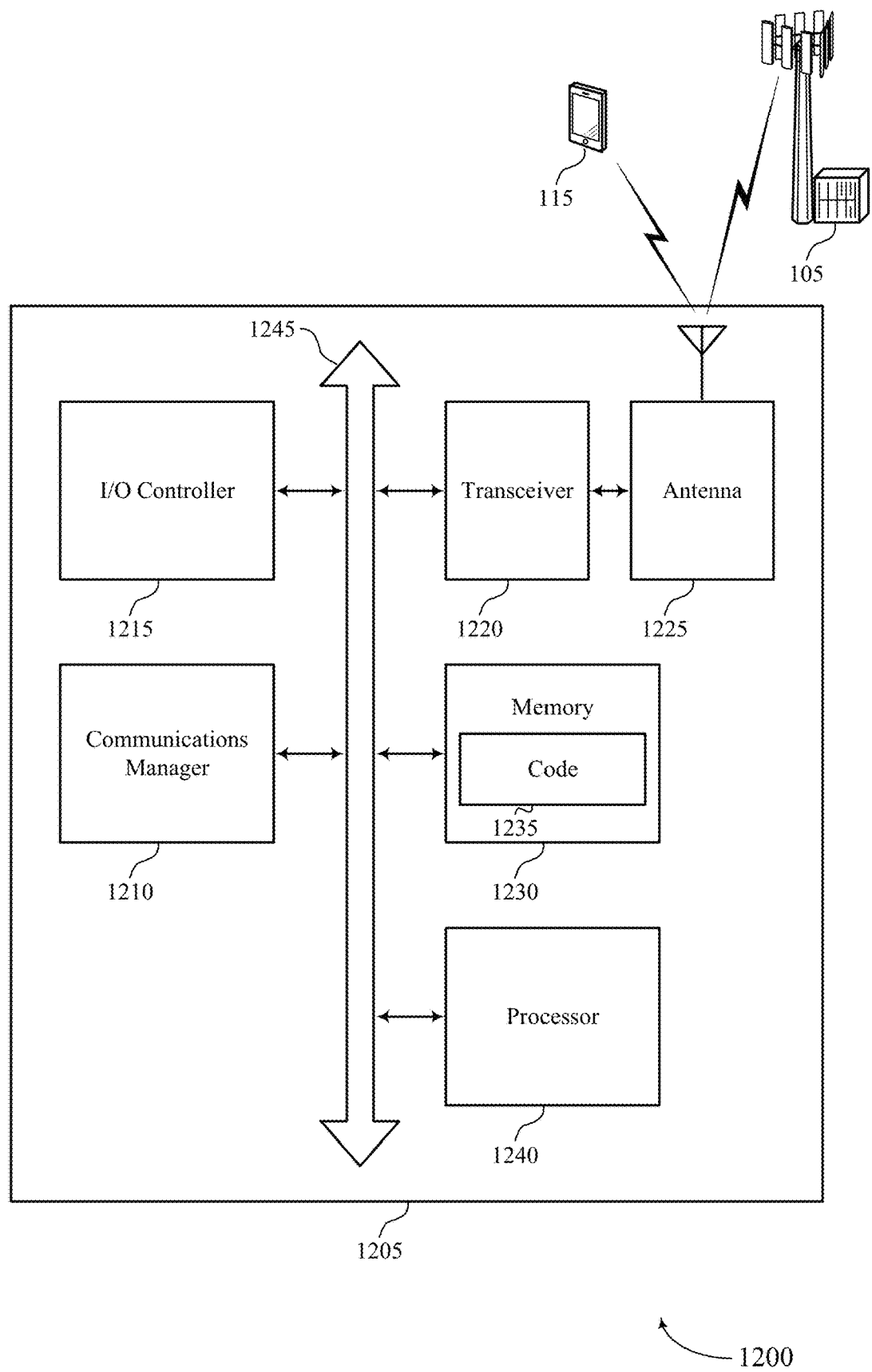
FIG. 12 shows a diagram of a system including a device that supports semi-dynamic rate matching in accordance with aspects of the present disclosure.

FIG. 12 shows a diagram of a system 1200 including a device 1205 that supports semi-dynamic rate matching in accordance with aspects of the present disclosure. The device 1205 may be an example of or include the components of device 905, device 1005, or a UE 115 as described herein. The device 1205 may include components for bi-directional voice and data communications including components for transmitting and receiving communications, including a communications manager 1210, an I/O controller 1215, a transceiver 1220, an antenna 1225, memory 1230, and a processor 1240. These components may be in electronic communication via one or more buses (e.g., bus 1245).

The communications manager 1210 may identify a transceiver node operation mode for the UE, receive an indication of rate matching information for a downlink shared channel for the UE, determine an antenna port configuration for the downlink shared channel based on the transceiver node operation mode and the rate matching information, and monitor for the downlink shared channel based on the antenna port configuration.

The I/O controller 1215 may manage input and output signals for the device 1205. The I/O controller 1215 may also manage peripherals not integrated into the device 1205. In some cases, the I/O controller 1215 may represent a physical connection or port to an external peripheral. In some cases, the I/O controller 1215 may utilize an operating system such as iOS®, ANDROID®, MS-DOS®, MS-WIN-DOWS®, OS/2®, UNIX®, LINUX®, or another known operating system. In other cases, the I/O controller 1215 may represent or interact with a modem, a keyboard, a mouse, a touchscreen, or a similar device. In some cases, the I/O controller 1215 may be implemented as part of a processor. In some cases, a user may interact with the device 1205 via the I/O controller 1215 or via hardware components controlled by the I/O controller 1215.

The transceiver 1220 may communicate bi-directionally, via one or more antennas, wired, or wireless links as described herein. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include random-access memory (RAM) and read-only memory (ROM). The memory 1230 may store computer-readable, computer-executable code 1235 including instructions that, when executed, cause the processor to perform various functions described herein. In some cases, the memory 1230 may contain, among other things, a basic I/O system (BIOS) which may control basic hardware or software operation such as the interaction with peripheral components or devices.

The processor 1240 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 1240 may be configured to operate a memory array using a memory controller. In other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting semi-dynamic rate matching).

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
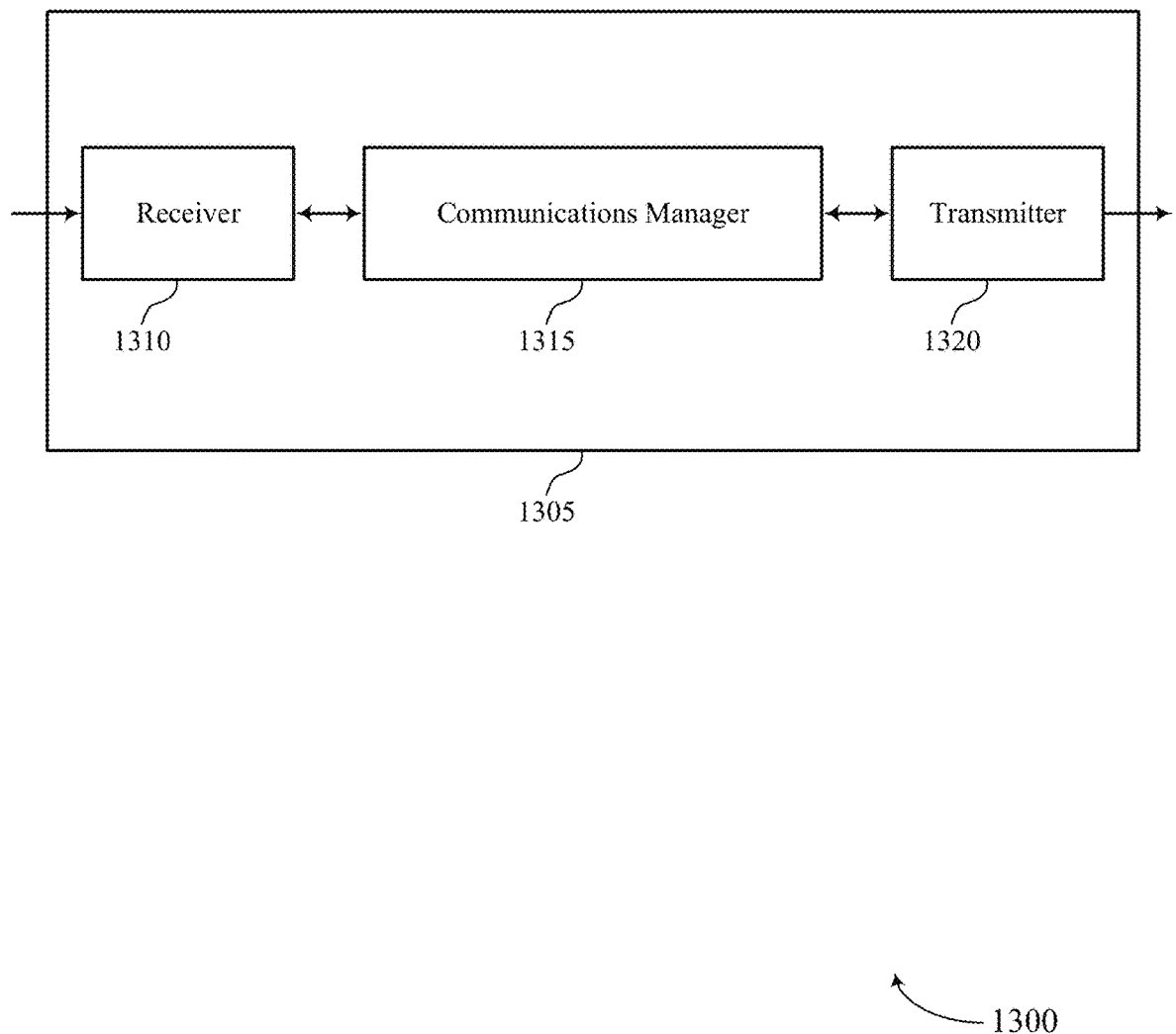
FIGS. 13 and 14 show block diagrams of devices that support semi-dynamic rate matching in accordance with aspects of the present disclosure.

FIG. 13 shows a block diagram 1300 of a device 1305 that supports semi-dynamic rate matching in accordance with aspects of the present disclosure. The device 1305 may be an example of aspects of a base station 105 or a transceiver node 210 as described herein. The device 1305 may include a receiver 1310, a communications manager 1315, and a transmitter 1320. The device 1305 may also include a processor. Each of these components may be in communication with one another (e.g., via one or more buses).

The receiver 1310 may receive information such as packets, user data, or control information associated with various information channels (e.g., control channels, data channels, and information related to semi-dynamic rate matching, etc.). Information may be passed on to other components of the device 1305. The receiver 1310 may be an example of aspects of the transceiver 1620 described with reference to FIG. 16. The receiver 1310 may utilize a single antenna or a set of antennas.

The communications manager 1315 may identify a transceiver node operation mode for a UE in communication with the transceiver node, determine an antenna port configuration for a downlink shared channel for the UE based on the transceiver node operation mode, transmit, to the UE, an indication of rate matching information for the downlink shared channel, the rate matching information indicating the antenna port configuration, and transmit the downlink shared channel to the UE according to the antenna port configuration. The communications manager 1315 may also identify a buffer of data for transmission to a UE in communication with the first transceiver node, receive, from a second transceiver node of the set of transceiver nodes, an indication to switch between rate matching states at the first transceiver, switch from a first rate matching state to a second rate matching state based on receiving the indication, and transmit, to the UE, a downlink shared channel transmission based on a resource configuration associated with the second rate matching state. The communications manager 1315 may be an example of aspects of the communications manager 1610 described herein.

The communications manager 1315, or its sub-components, may be implemented in hardware, code (e.g., software or firmware) executed by a processor, or any combination thereof. If implemented in code executed by a processor, the functions of the communications manager 1315, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 1315, or its sub-components, may be physically located at various positions, including being distributed such that portions of functions are implemented at different physical locations by one or more physical components. In some examples, the communications manager 1315, or its sub-components, may be a separate and distinct component in accordance with various aspects of the present disclosure. In some examples, the communications manager 1315, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1320 may transmit signals generated by other components of the device 1305. In some examples, the transmitter 1320 may be collocated with a receiver 1310 in a transceiver module. For example, the transmitter 1320 may be an example of aspects of the transceiver 1620 described with reference to FIG. 16. The transmitter 1320 may utilize a single antenna or a set of antennas.

The communications manager 1315 as described herein may be implemented to realize one or more potential advantages. One implementations may enable the device 1305 to transmit more data to a UE per slot when the UE is operating in a multi-transceiver-node mode, which may result in greater capacity for wireless communications at the device 1305 and more efficient (e.g., higher throughput) data transmissions during one or more transmissions to the UE.

Based on techniques for increasing capacity and efficiency of data transmission, the device 1305 may use fewer transmissions to transmit the same amount of data than a device not implementing the techniques of the present disclosure. As such, a processor or one or more processing units of the device 1305 associated with data transmissions may perform fewer processing operations and spend longer durations in a sleep mode or spend more time performing one or more other processing operations for the device 1305, which may result in reduced power costs or greater processing capability of the device 1305, or both.

Figure 14:
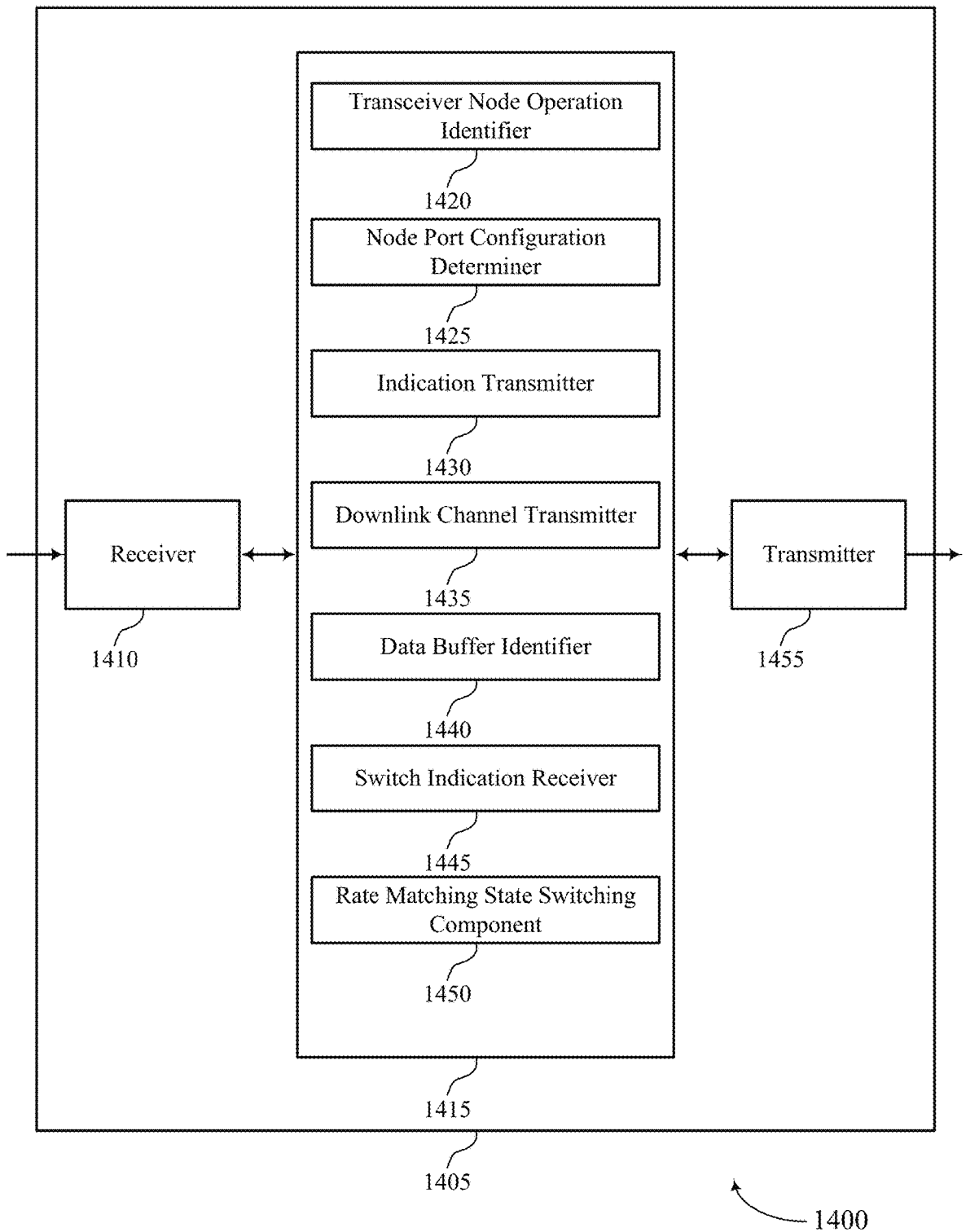

FIG. 14 shows a block diagram 1400 of a device 1405 that supports semi-dynamic rate matching in accordance with aspects of the present disclosure. The device 1405 may be an example of aspects of a device 1305, or a base station 105 as described herein. The device 1405 may include a receiver 1410, a communications manager 1415, and a transmitter 1455. The device 1405 may also include a processor. Each of these components may be in communication with one another (e.g., via one or more buses).

The receiver 1410 may receive information such as packets, user data, or control information associated with various information channels (e.g., control channels, data channels, and information related to semi-dynamic rate matching, etc.). Information may be passed on to other components of the device 1405. The receiver 1410 may be an example of aspects of the transceiver 1620 described with reference to FIG. 16. The receiver 1410 may utilize a single antenna or a set of antennas.

The communications manager 1415 may be an example of aspects of the communications manager 1315 as described herein. The communications manager 1415 may include a transceiver node operation identifier 1420, a node port configuration determiner 1425, an indication transmitter 1430, a downlink channel transmitter 1435, a data buffer identifier 1440, a switch indication receiver 1445, and a rate matching state switching component 1450. The communications manager 1415 may be an example of aspects of the communications manager 1610 described herein.

The transceiver node operation identifier 1420 may identify a transceiver node operation mode for a UE in communication with the transceiver node.

The node port configuration determiner 1425 may determine an antenna port configuration for a downlink shared channel for the UE based on the transceiver node operation mode.

The indication transmitter 1430 may transmit, to the UE, an indication of rate matching information for the downlink shared channel, the rate matching information indicating the antenna port configuration.

The downlink channel transmitter 1435 may transmit the downlink shared channel to the UE according to the antenna port configuration. The downlink channel transmitter 1435 may transmit, to the UE, a downlink shared channel transmission based on a resource configuration associated with the second rate matching state.

The data buffer identifier 1440 may identify a buffer of data for transmission to a UE in communication with the first transceiver node.

The switch indication receiver 1445 may receive, from a second transceiver node of the set of transceiver nodes, an indication to switch between rate matching states at the first transceiver.

The rate matching state switching component 1450 may switch from a first rate matching state to a second rate matching state based on receiving the indication.

The transmitter 1455 may transmit signals generated by other components of the device 1405. In some examples, the transmitter 1455 may be collocated with a receiver 1410 in a transceiver module. For example, the transmitter 1455 may be an example of aspects of the transceiver 1620 described with reference to FIG. 16. The transmitter 1455 may utilize a single antenna or a set of antennas.

Figure 15:
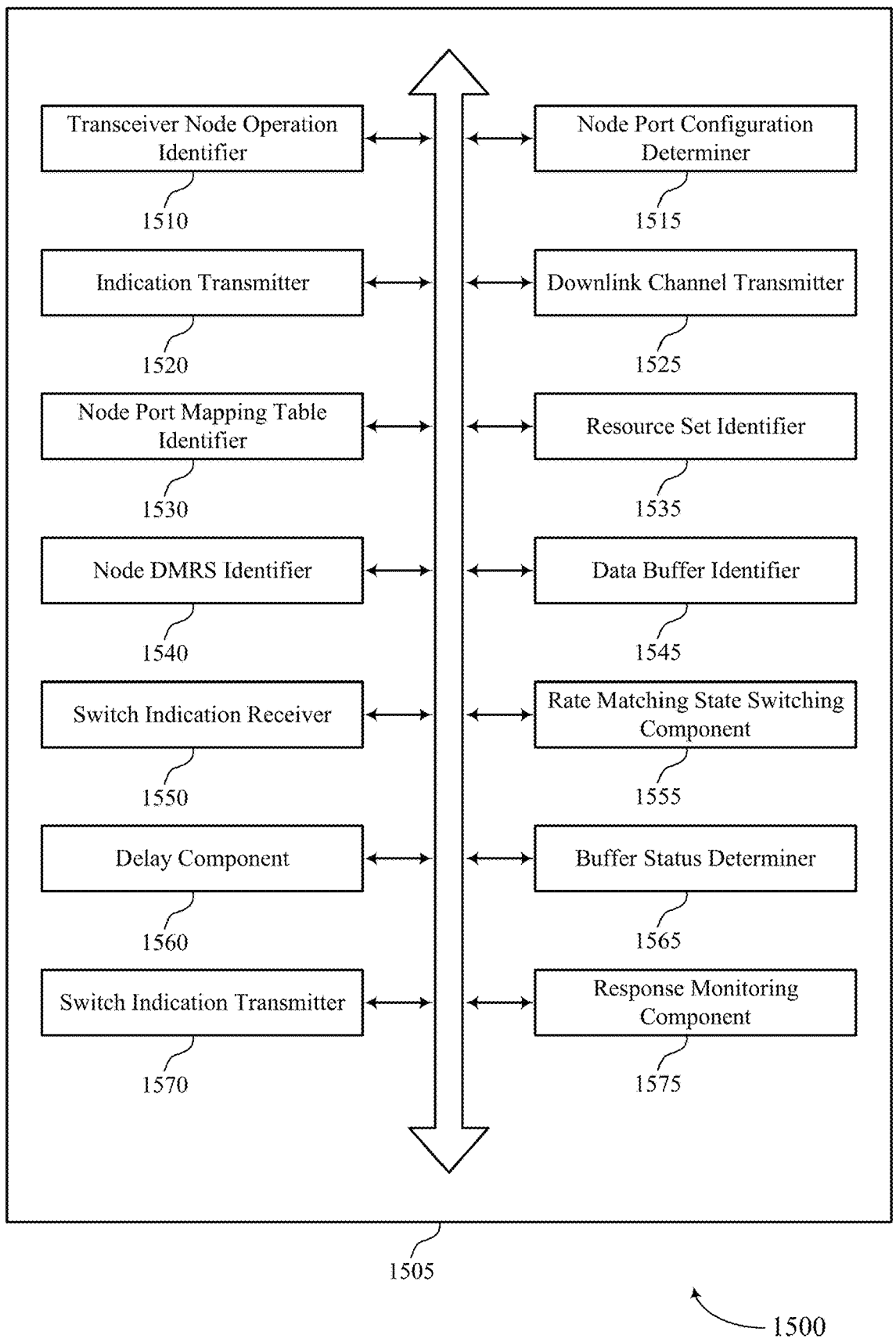
FIG. 15 shows a block diagram of a communications manager that supports semi-dynamic rate matching in accordance with aspects of the present disclosure.

FIG. 15 shows a block diagram 1500 of a communications manager 1505 that supports semi-dynamic rate matching in accordance with aspects of the present disclosure. The communications manager 1505 may be an example of aspects of a communications manager 1315, a communications manager 1415, or a communications manager 1610 described herein. The communications manager 1505 may include a transceiver node operation identifier 1510, a node port configuration determiner 1515, an indication transmitter 1520, a downlink channel transmitter 1525, a node port mapping table identifier 1530, a resource set identifier 1535, a node DMRS identifier 1540, a data buffer identifier 1545, a switch indication receiver 1550, a rate matching state switching component 1555, a delaying component 1560, a buffer status determiner 1565, a switch indication transmitter 1570, and a response monitoring component 1575. Each of these modules may communicate, directly or indirectly, with one another (e.g., via one or more buses).

The transceiver node operation identifier 1510 may identify a transceiver node operation mode for a UE in communication with the transceiver node. In some examples, the transceiver node operation identifier 1510 may transmit, to the UE, an indication of the transceiver node operation mode or a change in mode operation via control signaling. In some cases, the transceiver node operation mode includes one of a single TRP operation mode or a multiple TRP operation mode. In some cases, the single TRP operation mode is associated with a first antenna port mapping table. In some cases, the multiple TRP operation mode is associated with a second antenna port mapping table different from the first antenna port mapping table. In some cases, the multiple TRP operation mode is associated with a set of antenna port mapping tables including the second antenna port mapping table.

The node port configuration determiner 1515 may determine an antenna port configuration for a downlink shared channel for the UE based on the transceiver node operation mode. In some examples, the node port configuration determiner 1515 may determine the antenna port configuration for the downlink shared channel based on the antenna port mapping table.

The indication transmitter 1520 may transmit, to the UE, an indication of rate matching information for the downlink shared channel, the rate matching information indicating the antenna port configuration.

The downlink channel transmitter 1525 may transmit the downlink shared channel to the UE according to the antenna port configuration. In some examples, the downlink channel transmitter 1525 may transmit, to the UE, a downlink shared channel transmission based on a resource configuration associated with the second rate matching state. In some examples, transmitting, to the UE, a downlink control channel that includes the indication of rate matching information and the antenna port mapping table. In some examples, the downlink channel transmitter 1525 may transmit the downlink shared channel via a set of resources over which an associated DMRS is transmitted. In some examples, the downlink channel transmitter 1525 may transmit the downlink shared channel based on the set of DMRSs and the set of DMRS port indices. In some examples, the downlink channel transmitter 1525 may transmit a second downlink shared channel transmission based on a resource configuration associated with the first rate matching state, where the second downlink shared channel transmission is transmitted after receiving the indication and before switching from the first rate matching state to the second rate matching state.

In some examples, the downlink channel transmitter 1525 may transmit the downlink shared channel transmission in the first slot based on the buffer of data being empty. In some examples, the downlink channel transmitter 1525 may transmit a second downlink shared channel transmission to the UE after transmitting the second indication to switch between rate matching states at the second transceiver node. In some examples, the downlink channel transmitter 1525 may transmit the downlink shared channel transmission after the number of slots. In some examples, the downlink channel transmitter 1525 may transmit the second downlink shared channel transmission upon receiving the response. In some examples, downlinking shared channel transmissions from the first transceiver node in the first rate matching state are associated with a second resource configuration that includes a second set of REs, the second set of REs including a second set of DMRS resources and a second set of data resources. In some cases, the resource configuration includes a set of REs allocated for a set of DMRS resources and a set of data resources. In some cases, a number of the second set of data resources is greater than the first set of data resources. In some cases, a number of the second set of data resources is fewer than the first set of data resources.

The node port mapping table identifier 1530 may identify an antenna port mapping table of a set of antenna port mapping tables based on the transceiver node operation mode. In some cases, the antenna port mapping table includes a DMRS port mapping table indicating a number of DMRS code division multiplexing groups and a set of DMRS port indices. In some cases, the antenna port mapping table of the set of antenna port mapping tables is associated with the transceiver node operation mode. In some cases, a second antenna port mapping table of the set of antenna port mapping tables is associated with a second transceiver node operation mode different from the transceiver node operation mode. In some cases, the antenna port mapping table is a repurposed version of the second antenna port mapping table such that a size of the antenna port mapping table is the same as a size of the second antenna port mapping table. In some cases, the antenna port mapping table is indicated by an MAC-CE of the downlink control channel.

The resource set identifier 1535 may identify a set of REs allocated for DMRS transmission from another transceiver node based on the antenna port configuration. In some examples, the resource set identifier 1535 may allocate the set of REs to at least a portion of data based on the antenna port configuration and the transceiver node operation mode. In some examples, the resource set identifier 1535 may empty the set of REs based on the antenna port configuration and the transceiver node operation mode.

The node DMRS identifier 1540 may identify a set of DMRSs and a set of DMRS port indices based on the antenna port configuration.

The data buffer identifier 1545 may identify a buffer of data for transmission to a UE in communication with the first transceiver node.

The switch indication receiver 1550 may receive, from a second transceiver node of the set of transceiver nodes, an indication to switch between rate matching states at the first transceiver. In some examples, the switch indication receiver 1550 may receive, from the second transceiver node, a third indication to switch between rate matching states at the first transceiver node. In some cases, the indication is received via a backhaul link.

The rate matching state switching component 1555 may switch from a first rate matching state to a second rate matching state based on receiving the indication. In some examples, the rate matching state switching component 1555 may switch from the first rate matching state to the second rate matching state after the number of slots. In some examples, the rate matching state switching component 1555 may switch from the first rate matching state to the second rate matching state in a first slot consecutive to a slot in which the indication is received.

The delaying component 1560 may delay switching from the first rate matching state to the second rate matching state for a number of slots after receiving the indication. In some examples, the delaying component 1560 may delay switching is based on the buffer of data being non-empty. In some examples, the delaying component 1560 may delay transmission of the second downlink shared channel transmission for a number of slots after transmitting the second indication to switch between rate matching states at the second transceiver node. In some examples, the delaying component 1560 may delay the transmission is based on a rate matching state of the first transceiver node at a time of receipt of the indication to switch between rate matching states at the first transceiver node.

The buffer status determiner 1565 may determine, after transmitting the downlink shared channel transmission, that the buffer of data has changed from non-empty to empty. In some examples, the buffer status determiner 1565 may determine that the buffer of data has changed from empty to non-empty.

The switch indication transmitter 1570 may transmit, to the second transceiver node, a second indication to switch between rate matching states at the second transceiver node. In some examples, the switch indication transmitter 1570 may transmit, to the second transceiver node, a second indication to switch between rate matching states at the second transceiver node. In some examples, the switch indication transmitter 1570 may transmit an acknowledgement to the second transceiver node in response to receiving the indication. In some examples, the switch indication transmitter 1570 may transmit a non-acknowledgement to the second transceiver node after receiving the indication.

The response monitoring component 1575 may monitor for a response to the second indication to switch between rate matching states at the second transceiver node. In some examples, the response monitoring component 1575 may monitor for the response is based on a rate matching state of the first transceiver node at a time of receipt of the indication to switch between rate matching states at the first transceiver node.

Figure 16:
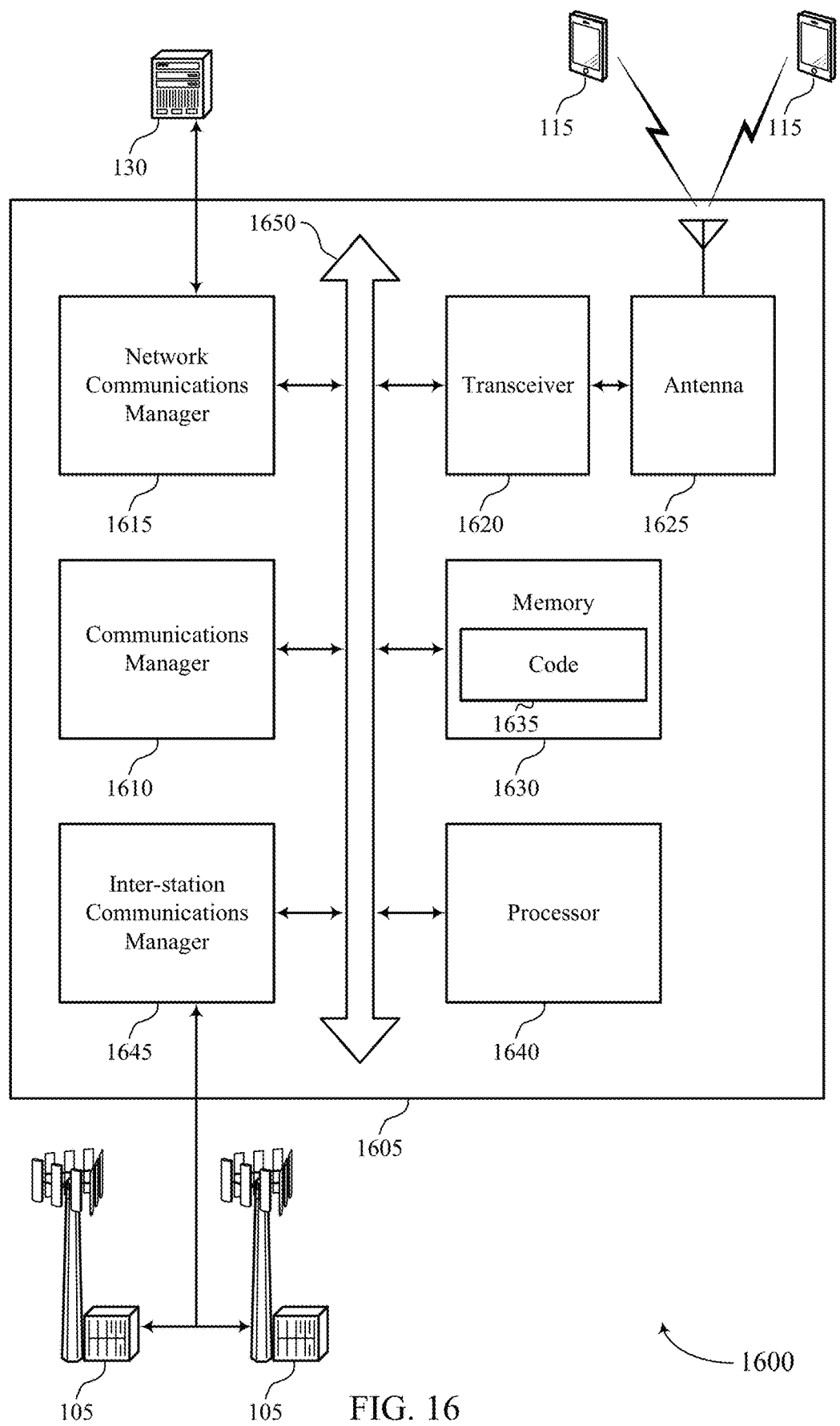
FIG. 16 shows a diagram of a system including a device that supports semi-dynamic rate matching in accordance with aspects of the present disclosure.

FIG. 16 shows a diagram of a system 1600 including a device 1605 that supports semi-dynamic rate matching in accordance with aspects of the present disclosure. The device 1605 may be an example of or include the components of device 1305, device 1405, or a base station 105 as described herein. The device 1605 may include components for bi-directional voice and data communications including components for transmitting and receiving communications, including a communications manager 1610, a network communications manager 1615, a transceiver 1620, an antenna 1625, memory 1630, a processor 1640, and an inter-station communications manager 1645. These components may be in electronic communication via one or more buses (e.g., bus 1650).

The communications manager 1610 may identify a transceiver node operation mode for a UE in communication with the transceiver node, determine an antenna port configuration for a downlink shared channel for the UE based on the transceiver node operation mode, transmit, to the UE, an indication of rate matching information for the downlink shared channel, the rate matching information indicating the antenna port configuration, and transmit the downlink shared channel to the UE according to the antenna port configuration. The communications manager 1610 may also identify a buffer of data for transmission to a UE in communication with the first transceiver node, receive, from a second transceiver node of the set of transceiver nodes, an indication to switch between rate matching states at the first transceiver, switch from a first rate matching state to a second rate matching state based on receiving the indication, and transmit, to the UE, a downlink shared channel transmission based on a resource configuration associated with the second rate matching state.

The network communications manager 1615 may manage communications with the core network (e.g., via one or more wired backhaul links). For example, the network communications manager 1615 may manage the transfer of data communications for client devices, such as one or more UEs 115.

The transceiver 1620 may communicate bi-directionally, via one or more antennas, wired, or wireless links as described herein. For example, the transceiver 1620 may represent a wireless transceiver and may communicate bi-directionally with another wireless transceiver. The transceiver 1620 may also include a modem to modulate the packets and provide the modulated packets to the antennas for transmission, and to demodulate packets received from the antennas.

In some cases, the wireless device may include a single antenna 1625. However, in some cases the device may have more than one antenna 1625, which may be capable of concurrently transmitting or receiving multiple wireless transmissions.

The memory 1630 may include RAM, ROM, or a combination thereof. The memory 1630 may store computer-readable code 1635 including instructions that, when executed by a processor (e.g., the processor 1640) cause the device to perform various functions described herein. In some cases, the memory 1630 may contain, among other things, a BIOS which may control basic hardware or software operation such as the interaction with peripheral components or devices.

The processor 1640 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1640 may be configured to operate a memory array using a memory controller. In some cases, a memory controller may be integrated into processor 1640. The processor 1640 may be configured to execute computer-readable instructions stored in a memory (e.g., the memory 1630) to cause the device 1605 to perform various functions (e.g., functions or tasks supporting semi-dynamic rate matching).

The inter-station communications manager 1645 may manage communications with other base station 105, and may include a controller or scheduler for controlling communications with UEs 115 in cooperation with other base stations 105. For example, the inter-station communications manager 1645 may coordinate scheduling for transmissions to UEs 115 for various interference mitigation techniques such as beamforming or joint transmission. In some examples, the inter-station communications manager 1645 may provide an X2 interface within an LTE/LTE-A wireless communication network technology to provide communication between base stations 105.

The code 1635 may include instructions to implement aspects of the present disclosure, including instructions to support wireless communications. The code 1635 may be stored in a non-transitory computer-readable medium such as system memory or other type of memory. In some cases, the code 1635 may not be directly executable by the processor 1640 but may cause a computer (e.g., when compiled and executed) to perform functions described herein.

Figure 17:
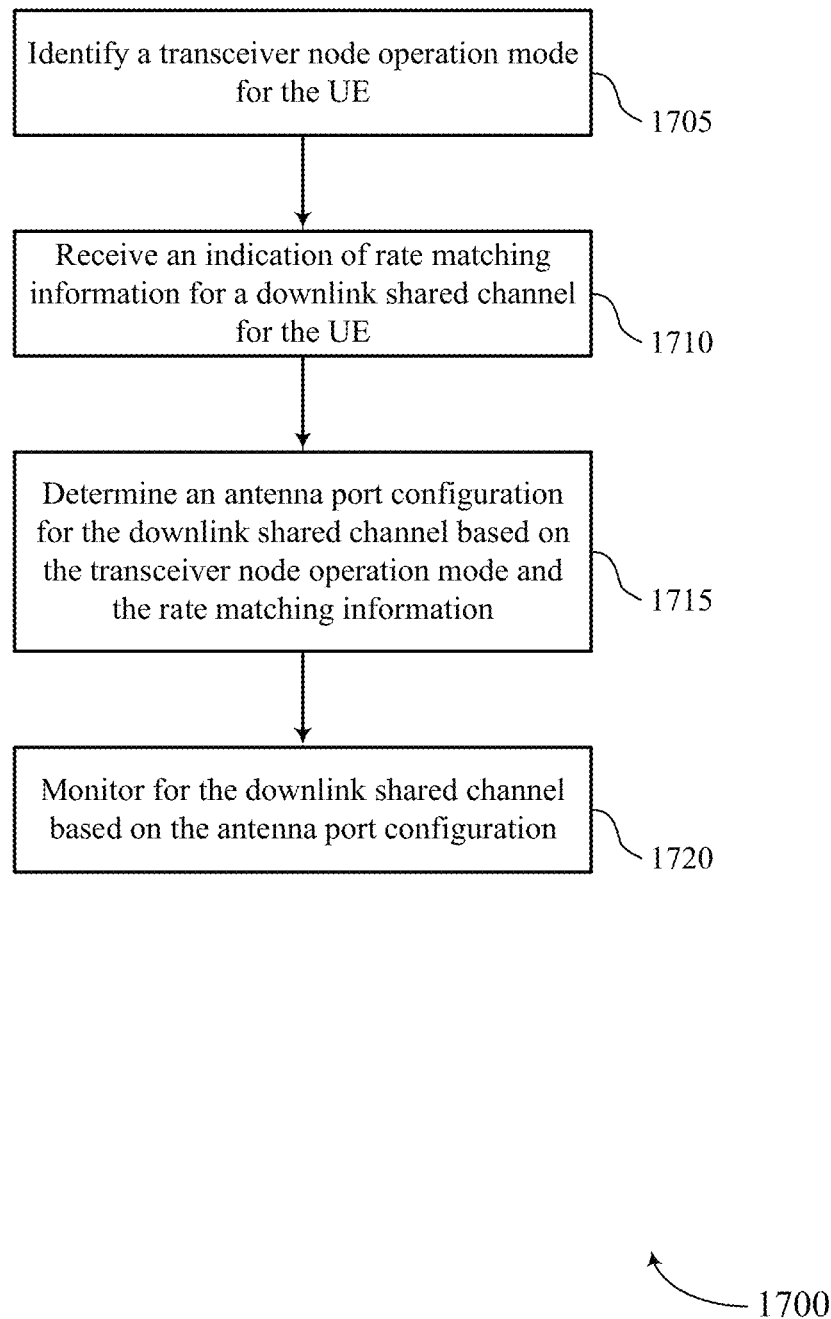
FIGS. 17 through 26 show flowcharts illustrating methods that support semi-dynamic rate matching in accordance with aspects of the present disclosure.

FIG. 17 shows a flowchart illustrating a method 1700 that supports semi-dynamic rate matching in accordance with aspects of the present disclosure. The operations of method 1700 may be implemented by a UE 115 or its components as described herein. For example, the operations of method 1700 may be performed by a communications manager as described with reference to FIGS. 9 through 12. In some examples, a UE may execute a set of instructions to control the functional elements of the UE to perform the functions described herein. Additionally or alternatively, a UE may perform aspects of the functions described herein using special-purpose hardware.

At 1705, the UE may identify a transceiver node operation mode for the UE. The operations of 1705 may be performed according to the methods described herein. In some examples, aspects of the operations of 1705 may be performed by a UE transceiver node operation identifier as described with reference to FIGS. 9 through 12.

At 1710, the UE may receive an indication of rate matching information for a downlink shared channel for the UE. The operations of 1710 may be performed according to the methods described herein. In some examples, aspects of the operations of 1710 may be performed by an indication receiver as described with reference to FIGS. 9 through 12.

At 1715, the UE may determine an antenna port configuration for the downlink shared channel based on the transceiver node operation mode and the rate matching information. The operations of 1715 may be performed according to the methods described herein. In some examples, aspects of the operations of 1715 may be performed by a UE port configuration determiner as described with reference to FIGS. 9 through 12.

At 1720, the UE may monitor for the downlink shared channel based on the antenna port configuration. The operations of 1720 may be performed according to the methods described herein. In some examples, aspects of the operations of 1720 may be performed by a downlink shared channel monitoring component as described with reference to FIGS. 9 through 12.

Figure 18:
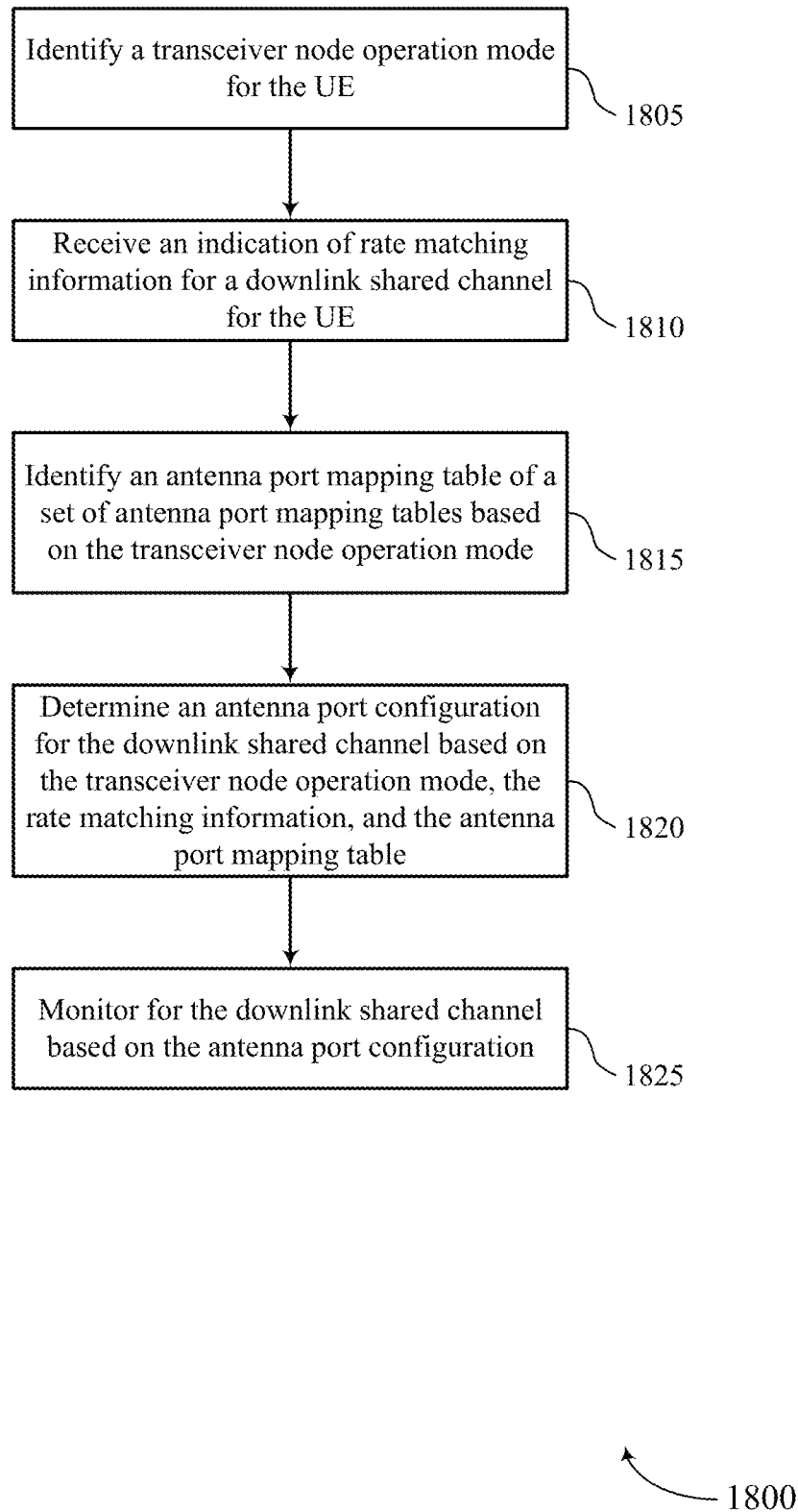

FIG. 18 shows a flowchart illustrating a method 1800 that supports semi-dynamic rate matching in accordance with aspects of the present disclosure. The operations of method 1800 may be implemented by a UE 115 or its components as described herein. For example, the operations of method 1800 may be performed by a communications manager as described with reference to FIGS. 9 through 12. In some examples, a UE may execute a set of instructions to control the functional elements of the UE to perform the functions described herein. Additionally or alternatively, a UE may perform aspects of the functions described herein using special-purpose hardware.

At 1805, the UE may identify a transceiver node operation mode for the UE. The operations of 1805 may be performed according to the methods described herein. In some examples, aspects of the operations of 1805 may be performed by a UE transceiver node operation identifier as described with reference to FIGS. 9 through 12.

At 1810, the UE may receive an indication of rate matching information for a downlink shared channel for the UE. The operations of 1810 may be performed according to the methods described herein. In some examples, aspects of the operations of 1810 may be performed by an indication receiver as described with reference to FIGS. 9 through 12.

At 1815, the UE may identify an antenna port mapping table of a set of antenna port mapping tables based on the transceiver node operation mode. The operations of 1815 may be performed according to the methods described herein. In some examples, aspects of the operations of 1815 may be performed by a UE port mapping table identifier as described with reference to FIGS. 9 through 12.

At 1820, the UE may determine an antenna port configuration for the downlink shared channel based on the transceiver node operation mode, the rate matching information, and the antenna port mapping table. The operations of 1820 may be performed according to the methods described herein. In some examples, aspects of the operations of 1820 may be performed by a UE port configuration determiner as described with reference to FIGS. 9 through 12.

At 1825, the UE may monitor for the downlink shared channel based on the antenna port configuration. The operations of 1825 may be performed according to the methods described herein. In some examples, aspects of the operations of 1825 may be performed by a downlink shared channel monitoring component as described with reference to FIGS. 9 through 12.

Figure 19:
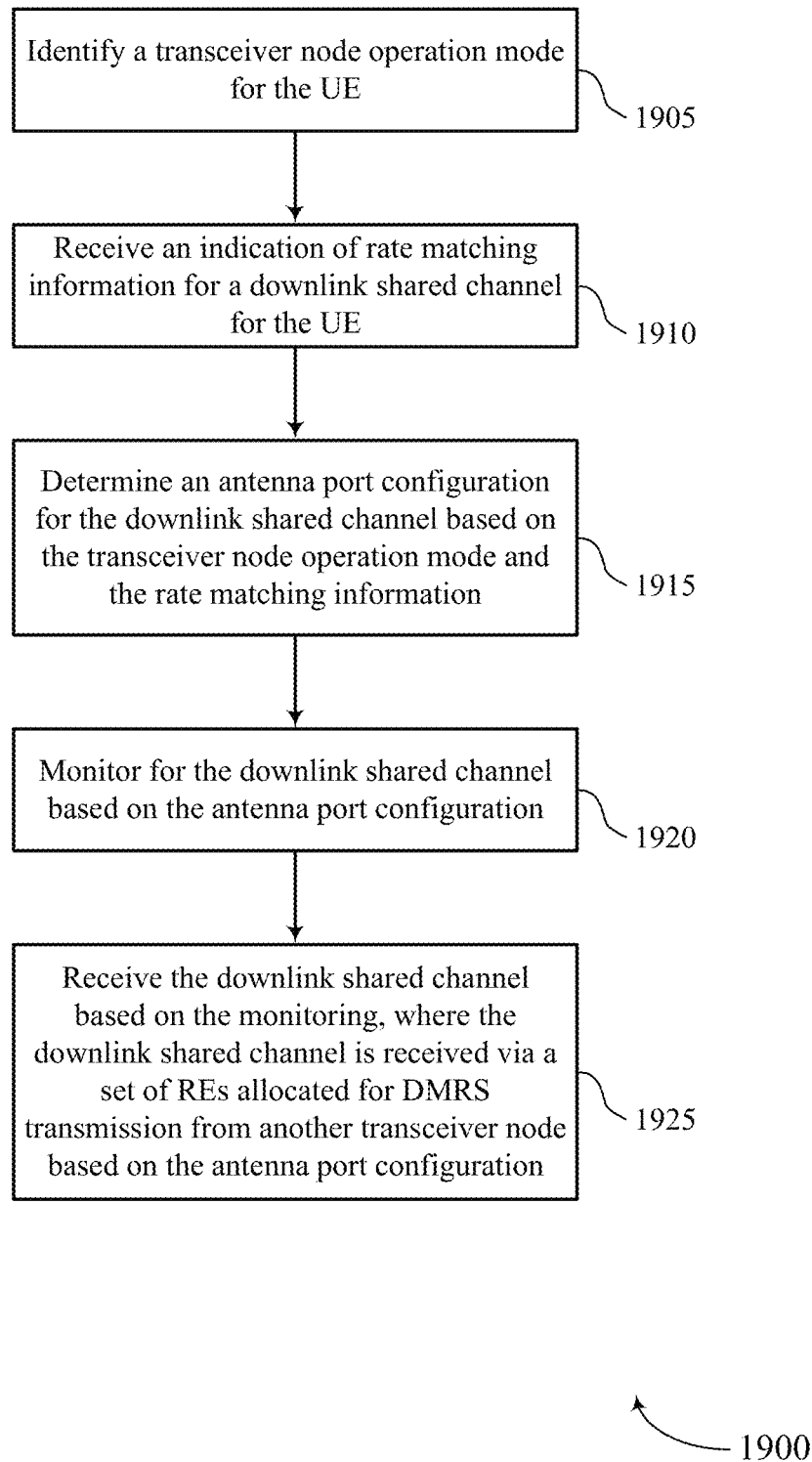

FIG. 19 shows a flowchart illustrating a method 1900 that supports semi-dynamic rate matching in accordance with aspects of the present disclosure. The operations of method 1900 may be implemented by a UE 115 or its components as described herein. For example, the operations of method 1900 may be performed by a communications manager as described with reference to FIGS. 9 through 12. In some examples, a UE may execute a set of instructions to control the functional elements of the UE to perform the functions described herein. Additionally or alternatively, a UE may perform aspects of the functions described herein using special-purpose hardware.

At 1905, the UE may identify a transceiver node operation mode for the UE. The operations of 1905 may be performed according to the methods described herein. In some examples, aspects of the operations of 1905 may be performed by a UE transceiver node operation identifier as described with reference to FIGS. 9 through 12.

At 1910, the UE may receive an indication of rate matching information for a downlink shared channel for the UE. The operations of 1910 may be performed according to the methods described herein. In some examples, aspects of the operations of 1910 may be performed by an indication receiver as described with reference to FIGS. 9 through 12.

At 1915, the UE may determine an antenna port configuration for the downlink shared channel based on the transceiver node operation mode and the rate matching information. The operations of 1915 may be performed according to the methods described herein. In some examples, aspects of the operations of 1915 may be performed by a UE port configuration determiner as described with reference to FIGS. 9 through 12.

At 1920, the UE may monitor for the downlink shared channel based on the antenna port configuration. The operations of 1920 may be performed according to the methods described herein. In some examples, aspects of the operations of 1920 may be performed by a downlink shared channel monitoring component as described with reference to FIGS. 9 through 12.

At 1925, the UE may receive the downlink shared channel based on the monitoring, where the downlink shared channel is received via a set of REs allocated for DMRS transmission from another transceiver node based on the antenna port configuration. The operations of 1925 may be performed according to the methods described herein. In some examples, aspects of the operations of 1925 may be performed by a downlink shared channel receiver as described with reference to FIGS. 9 through 12.

Figure 20:
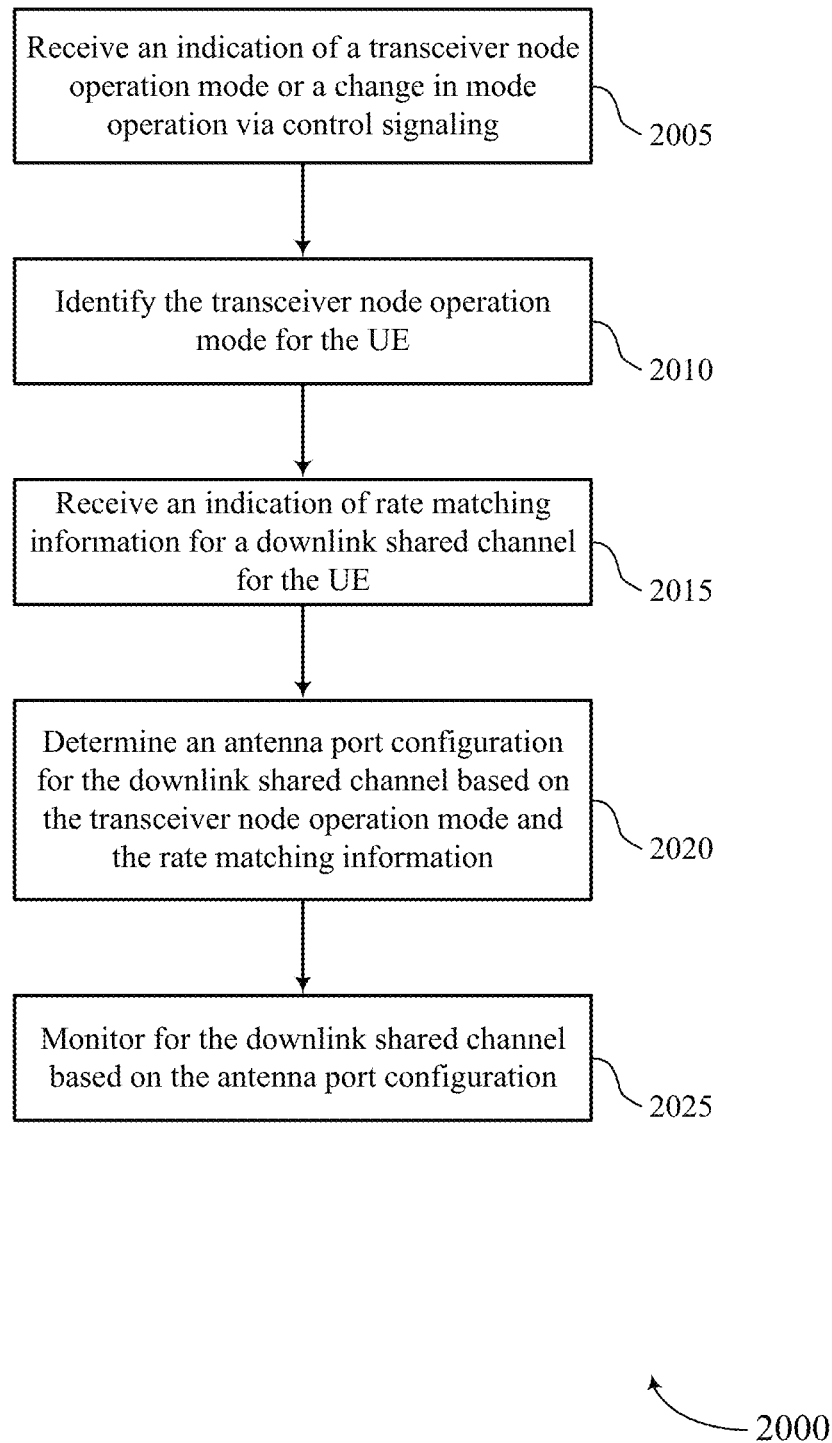

FIG. 20 shows a flowchart illustrating a method 2000 that supports semi-dynamic rate matching in accordance with aspects of the present disclosure. The operations of method 2000 may be implemented by a UE 115 or its components as described herein. For example, the operations of method 2000 may be performed by a communications manager as described with reference to FIGS. 9 through 12. In some examples, a UE may execute a set of instructions to control the functional elements of the UE to perform the functions described herein. Additionally or alternatively, a UE may perform aspects of the functions described herein using special-purpose hardware.

At 2005, the UE may receive an indication of a transceiver node operation mode or a change in mode operation via control signaling. The operations of 2005 may be performed according to the methods described herein. In some examples, aspects of the operations of 2005 may be performed by a UE transceiver node operation identifier as described with reference to FIGS. 9 through 12.

At 2010, the UE may identify the transceiver node operation mode for the UE. The operations of 2010 may be performed according to the methods described herein. In some examples, aspects of the operations of 2010 may be performed by a UE transceiver node operation identifier as described with reference to FIGS. 9 through 12.

At 2015, the UE may receive an indication of rate matching information for a downlink shared channel for the UE. The operations of 2015 may be performed according to the methods described herein. In some examples, aspects of the operations of 2015 may be performed by an indication receiver as described with reference to FIGS. 9 through 12.

At 2020, the UE may determine an antenna port configuration for the downlink shared channel based on the transceiver node operation mode and the rate matching information. The operations of 2020 may be performed according to the methods described herein. In some examples, aspects of the operations of 2020 may be performed by a UE port configuration determiner as described with reference to FIGS. 9 through 12.

At 2025, the UE may monitor for the downlink shared channel based on the antenna port configuration. The operations of 2025 may be performed according to the methods described herein. In some examples, aspects of the operations of 2025 may be performed by a downlink shared channel monitoring component as described with reference to FIGS. 9 through 12.

Figure 21:
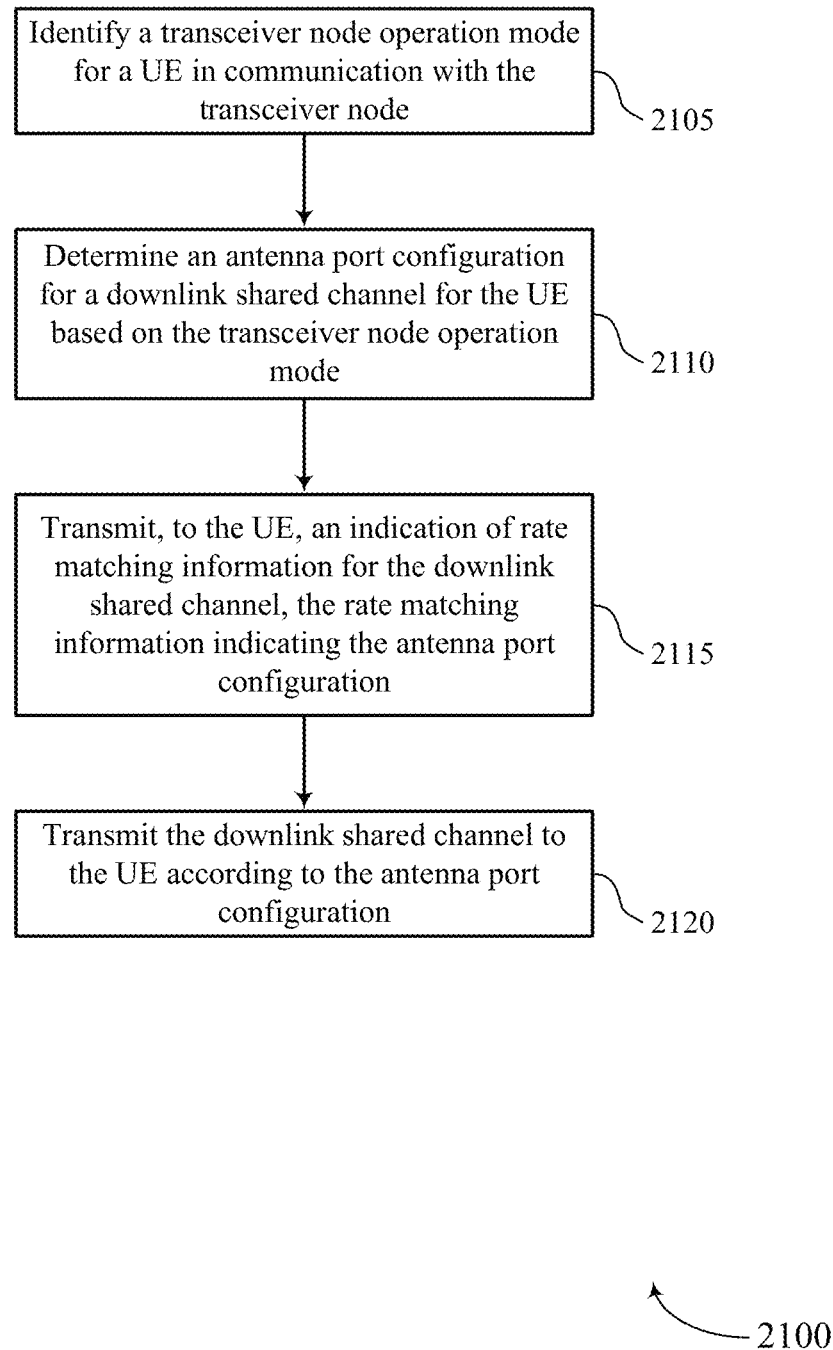

FIG. 21 shows a flowchart illustrating a method 2100 that supports semi-dynamic rate matching in accordance with aspects of the present disclosure. The operations of method 2100 may be implemented by a base station 105 or its components as described herein. For example, the operations of method 2100 may be performed by a communications manager as described with reference to FIGS. 13 through 16. In some examples, a base station may execute a set of instructions to control the functional elements of the base station to perform the functions described herein. Additionally or alternatively, a base station may perform aspects of the functions described herein using special-purpose hardware.

At 2105, the base station may identify a transceiver node operation mode for a UE in communication with the transceiver node. The operations of 2105 may be performed according to the methods described herein. In some examples, aspects of the operations of 2105 may be performed by a transceiver node operation identifier as described with reference to FIGS. 13 through 16.

At 2110, the base station may determine an antenna port configuration for a downlink shared channel for the UE based on the transceiver node operation mode. The operations of 2110 may be performed according to the methods described herein. In some examples, aspects of the operations of 2110 may be performed by a node port configuration determiner as described with reference to FIGS. 13 through 16.

At 2115, the base station may transmit, to the UE, an indication of rate matching information for the downlink shared channel, the rate matching information indicating the antenna port configuration. The operations of 2115 may be performed according to the methods described herein. In some examples, aspects of the operations of 2115 may be performed by an indication transmitter as described with reference to FIGS. 13 through 16.

At 2120, the base station may transmit the downlink shared channel to the UE according to the antenna port configuration. The operations of 2120 may be performed according to the methods described herein. In some examples, aspects of the operations of 2120 may be performed by a downlink channel transmitter as described with reference to FIGS. 13 through 16.

Figure 22:
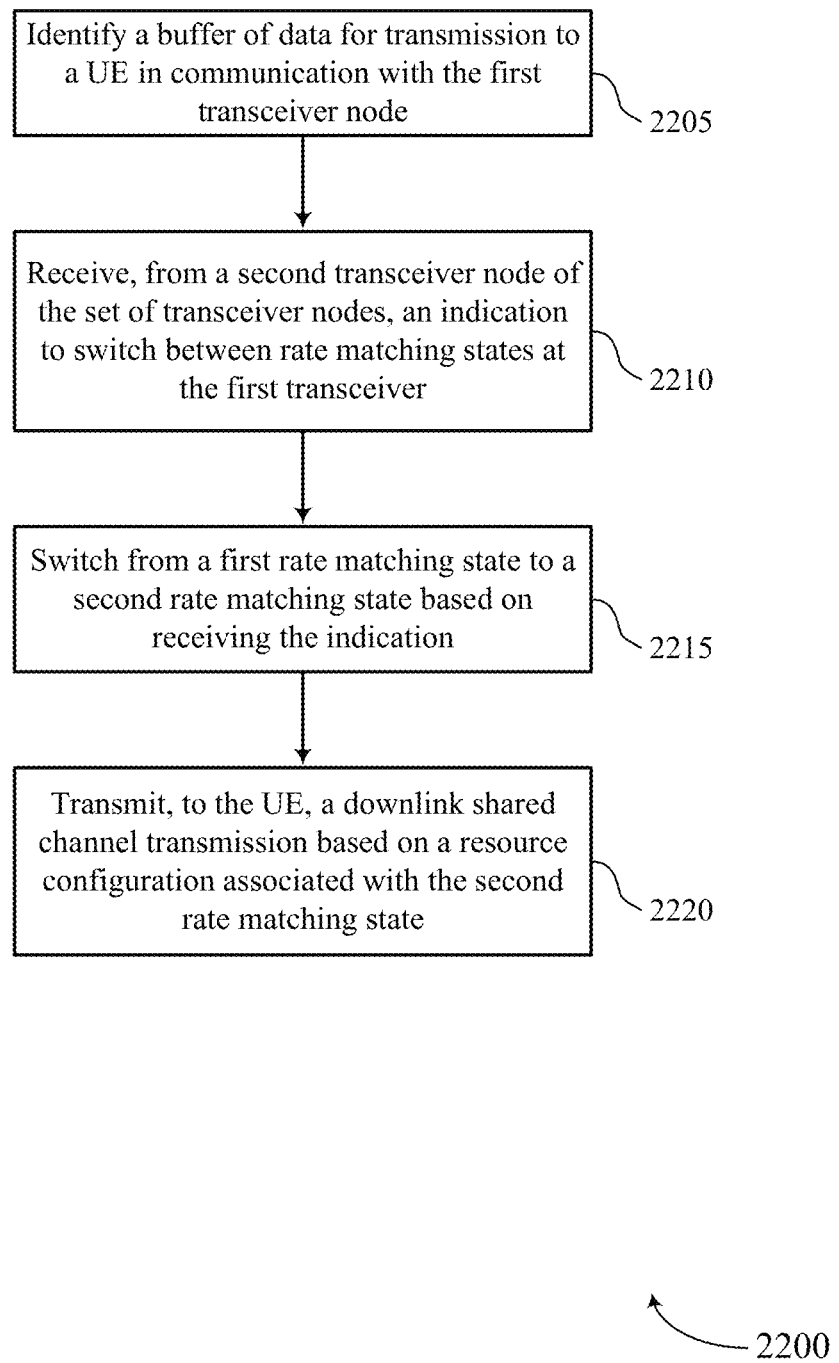

FIG. 22 shows a flowchart illustrating a method 2200 that supports semi-dynamic rate matching in accordance with aspects of the present disclosure. The operations of method 2200 may be implemented by a base station 105 or its components as described herein. For example, the operations of method 2200 may be performed by a communications manager as described with reference to FIGS. 13 through 16. In some examples, a base station may execute a set of instructions to control the functional elements of the base station to perform the functions described herein. Additionally or alternatively, a base station may perform aspects of the functions described herein using special-purpose hardware.

At 2205, the base station may identify a buffer of data for transmission to a UE in communication with the first transceiver node. The operations of 2205 may be performed according to the methods described herein. In some examples, aspects of the operations of 2205 may be performed by a data buffer identifier as described with reference to FIGS. 13 through 16.

At 2210, the base station may receive, from a second transceiver node of the set of transceiver nodes, an indication to switch between rate matching states at the first transceiver. The operations of 2210 may be performed according to the methods described herein. In some examples, aspects of the operations of 2210 may be performed by a switch indication receiver as described with reference to FIGS. 13 through 16.

At 2215, the base station may switch from a first rate matching state to a second rate matching state based on receiving the indication. The operations of 2215 may be performed according to the methods described herein. In some examples, aspects of the operations of 2215 may be performed by a rate matching state switching component as described with reference to FIGS. 13 through 16.

At 2220, the base station may transmit, to the UE, a downlink shared channel transmission based on a resource configuration associated with the second rate matching state. The operations of 2220 may be performed according to the methods described herein. In some examples, aspects of the operations of 2220 may be performed by a downlink channel transmitter as described with reference to FIGS. 13 through 16.

Figure 23:
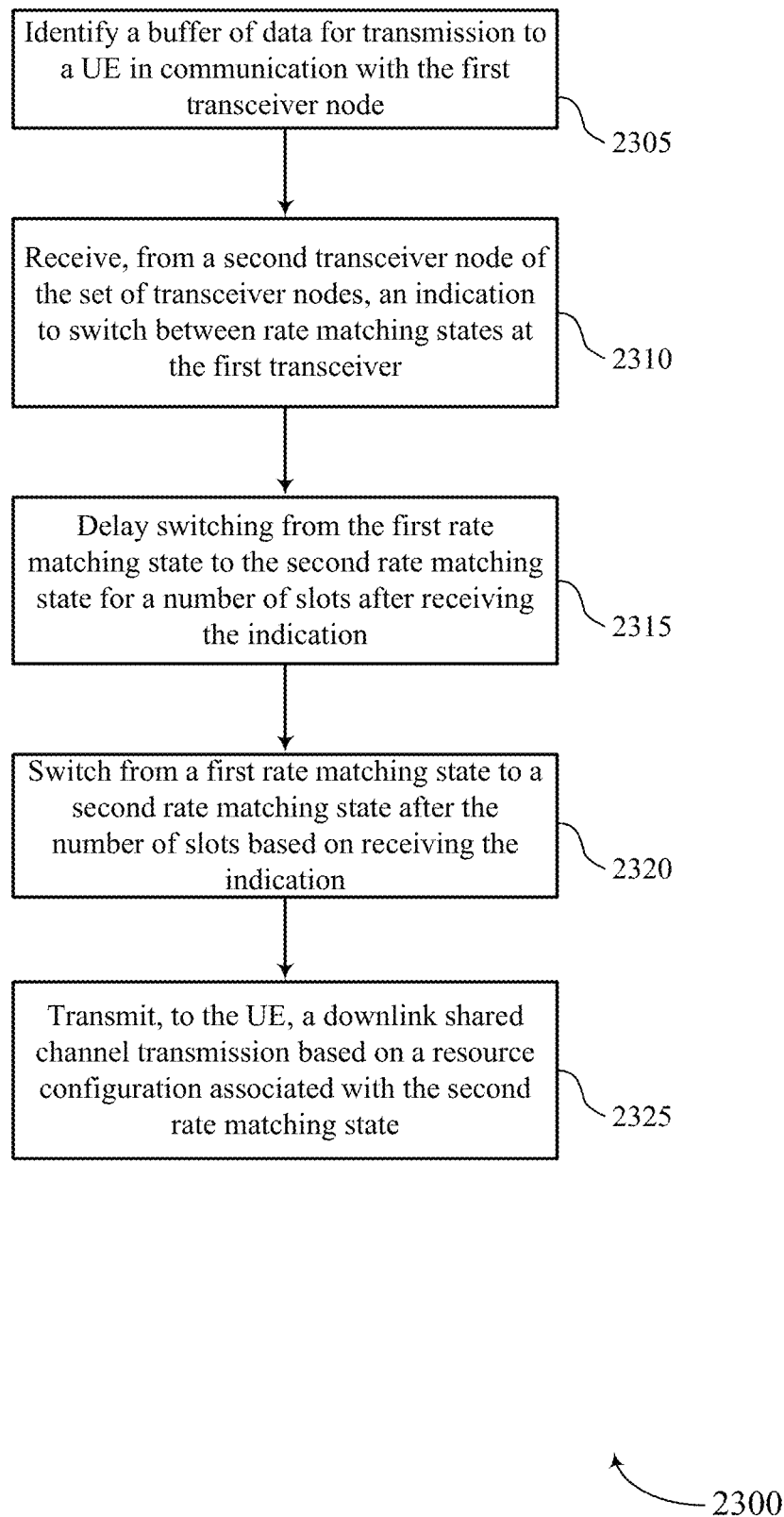

FIG. 23 shows a flowchart illustrating a method 2300 that supports semi-dynamic rate matching in accordance with aspects of the present disclosure. The operations of method 2300 may be implemented by a base station 105 or its components as described herein. For example, the operations of method 2300 may be performed by a communications manager as described with reference to FIGS. 13 through 16. In some examples, a base station may execute a set of instructions to control the functional elements of the base station to perform the functions described herein. Additionally or alternatively, a base station may perform aspects of the functions described herein using special-purpose hardware.

At 2305, the base station may identify a buffer of data for transmission to a UE in communication with the first transceiver node. The operations of 2305 may be performed according to the methods described herein. In some examples, aspects of the operations of 2305 may be performed by a data buffer identifier as described with reference to FIGS. 13 through 16.

At 2310, the base station may receive, from a second transceiver node of the set of transceiver nodes, an indication to switch between rate matching states at the first transceiver. The operations of 2310 may be performed according to the methods described herein. In some examples, aspects of the operations of 2310 may be performed by a switch indication receiver as described with reference to FIGS. 13 through 16.

At 2315, the base station may delay switching from the first rate matching state to the second rate matching state for a number of slots after receiving the indication. The operations of 2315 may be performed according to the methods described herein. In some examples, aspects of the operations of 2315 may be performed by a delaying component as described with reference to FIGS. 13 through 16.

At 2320, the base station may switch from a first rate matching state to a second rate matching state after the number of slots based on receiving the indication. The operations of 2320 may be performed according to the methods described herein. In some examples, aspects of the operations of 2320 may be performed by a rate matching state switching component as described with reference to FIGS. 13 through 16.

At 2325, the base station may transmit, to the UE, a downlink shared channel transmission based on a resource configuration associated with the second rate matching state. The operations of 2325 may be performed according to the methods described herein. In some examples, aspects of the operations of 2325 may be performed by a downlink channel transmitter as described with reference to FIGS. 13 through 16.

Figure 24:
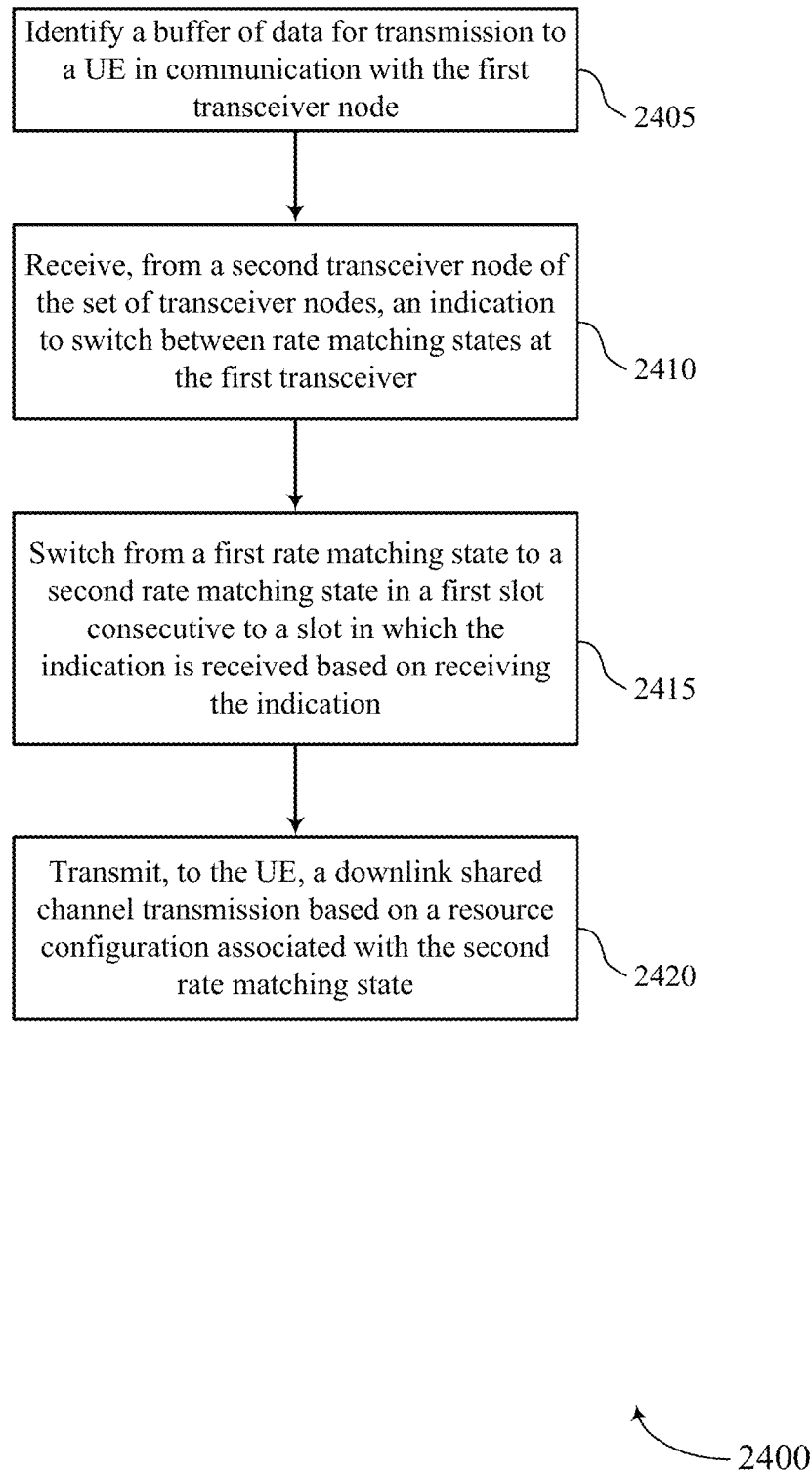

FIG. 24 shows a flowchart illustrating a method 2400 that supports semi-dynamic rate matching in accordance with aspects of the present disclosure. The operations of method 2400 may be implemented by a base station 105 or its components as described herein. For example, the operations of method 2400 may be performed by a communications manager as described with reference to FIGS. 13 through 16. In some examples, a base station may execute a set of instructions to control the functional elements of the base station to perform the functions described herein. Additionally or alternatively, a base station may perform aspects of the functions described herein using special-purpose hardware.

At 2405, the base station may identify a buffer of data for transmission to a UE in communication with the first transceiver node. The operations of 2405 may be performed according to the methods described herein. In some examples, aspects of the operations of 2405 may be performed by a data buffer identifier as described with reference to FIGS. 13 through 16.

At 2410, the base station may receive, from a second transceiver node of the set of transceiver nodes, an indication to switch between rate matching states at the first transceiver. The operations of 2410 may be performed according to the methods described herein. In some examples, aspects of the operations of 2410 may be performed by a switch indication receiver as described with reference to FIGS. 13 through 16.

At 2415, the base station may switch from a first rate matching state to a second rate matching state in a first slot consecutive to a slot in which the indication is received based on receiving the indication. The operations of 2415 may be performed according to the methods described herein. In some examples, aspects of the operations of 2415 may be performed by a rate matching state switching component as described with reference to FIGS. 13 through 16.

At 2420, the base station may transmit, to the UE, a downlink shared channel transmission based on a resource configuration associated with the second rate matching state. The operations of 2420 may be performed according to the methods described herein. In some examples, aspects of the operations of 2420 may be performed by a downlink channel transmitter as described with reference to FIGS. 13 through 16.

Figure 25:
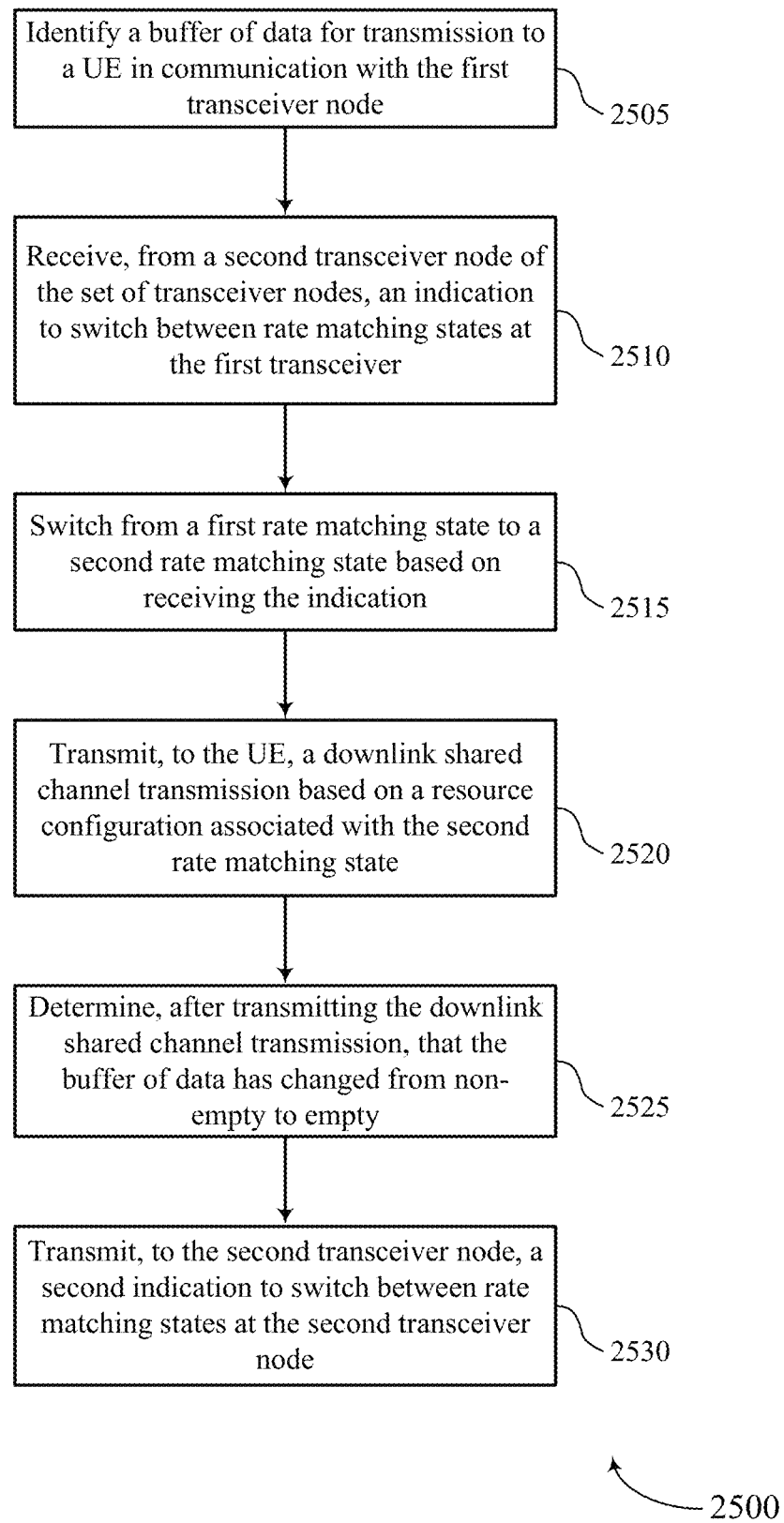

FIG. 25 shows a flowchart illustrating a method 2500 that supports semi-dynamic rate matching in accordance with aspects of the present disclosure. The operations of method 2500 may be implemented by a base station 105 or its components as described herein. For example, the operations of method 2500 may be performed by a communications manager as described with reference to FIGS. 13 through 16. In some examples, a base station may execute a set of instructions to control the functional elements of the base station to perform the functions described herein. Additionally or alternatively, a base station may perform aspects of the functions described herein using special-purpose hardware.

At 2505, the base station may identify a buffer of data for transmission to a UE in communication with the first transceiver node. The operations of 2505 may be performed according to the methods described herein. In some examples, aspects of the operations of 2505 may be performed by a data buffer identifier as described with reference to FIGS. 13 through 16.

At 2510, the base station may receive, from a second transceiver node of the set of transceiver nodes, an indication to switch between rate matching states at the first transceiver. The operations of 2510 may be performed according to the methods described herein. In some examples, aspects of the operations of 2510 may be performed by a switch indication receiver as described with reference to FIGS. 13 through 16.

At 2515, the base station may switch from a first rate matching state to a second rate matching state based on receiving the indication. The operations of 2515 may be performed according to the methods described herein. In some examples, aspects of the operations of 2515 may be performed by a rate matching state switching component as described with reference to FIGS. 13 through 16.

At 2520, the base station may transmit, to the UE, a downlink shared channel transmission based on a resource configuration associated with the second rate matching state. The operations of 2520 may be performed according to the methods described herein. In some examples, aspects of the operations of 2520 may be performed by a downlink channel transmitter as described with reference to FIGS. 13 through 16.

At 2525, the base station may determine, after transmitting the downlink shared channel transmission, that the buffer of data has changed from non-empty to empty. The operations of 2525 may be performed according to the methods described herein. In some examples, aspects of the operations of 2525 may be performed by a buffer status determiner as described with reference to FIGS. 13 through 16.

At 2530, the base station may transmit, to the second transceiver node, a second indication to switch between rate matching states at the second transceiver node. The operations of 2530 may be performed according to the methods described herein. In some examples, aspects of the operations of 2530 may be performed by a switch indication transmitter as described with reference to FIGS. 13 through 16.

Figure 26:
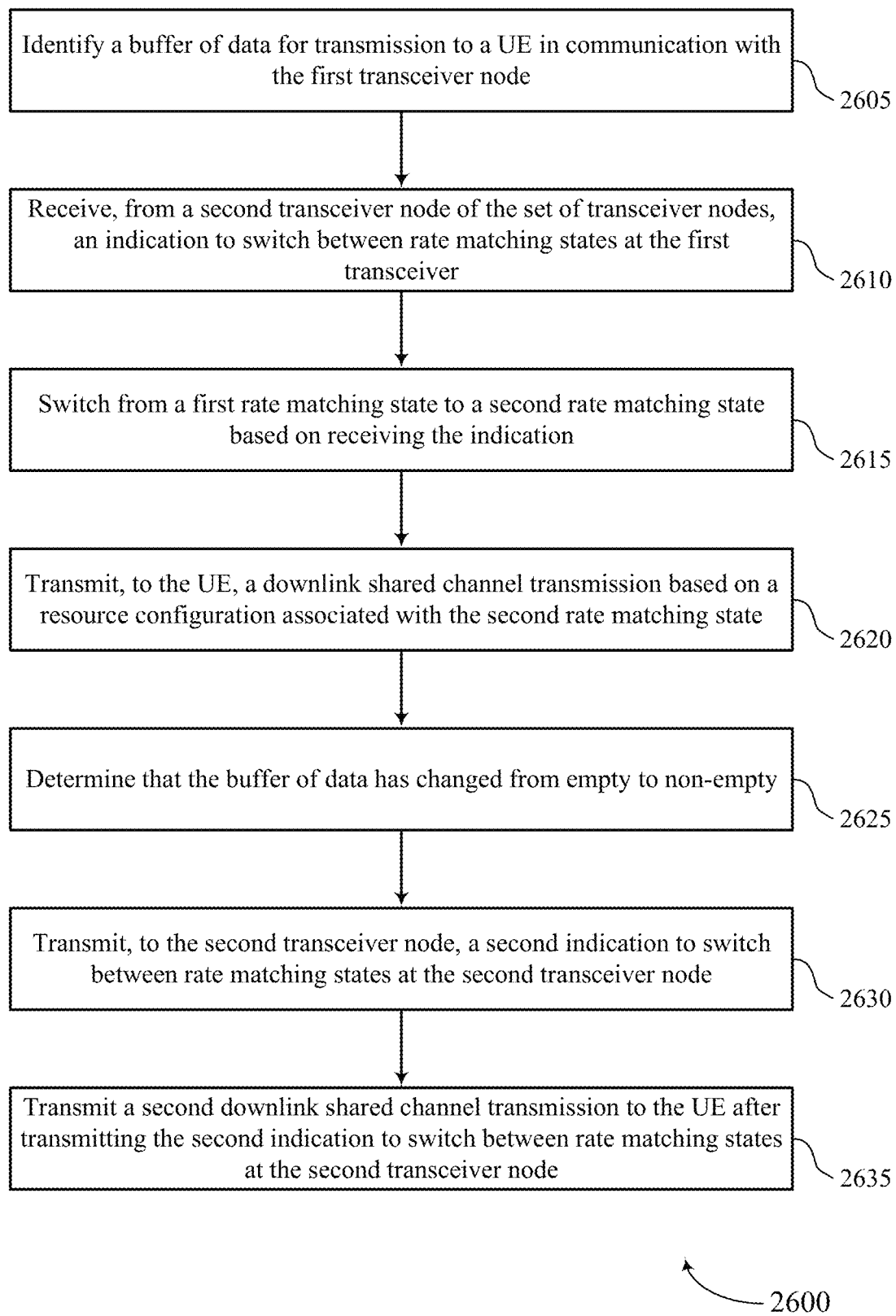

FIG. 26 shows a flowchart illustrating a method 2600 that supports semi-dynamic rate matching in accordance with aspects of the present disclosure. The operations of method 2600 may be implemented by a base station 105 or its components as described herein. For example, the operations of method 2600 may be performed by a communications manager as described with reference to FIGS. 13 through 16. In some examples, a base station may execute a set of instructions to control the functional elements of the base station to perform the functions described herein. Additionally or alternatively, a base station may perform aspects of the functions described herein using special-purpose hardware.

At 2605, the base station may identify a buffer of data for transmission to a UE in communication with the first transceiver node. The operations of 2605 may be performed according to the methods described herein. In some examples, aspects of the operations of 2605 may be performed by a data buffer identifier as described with reference to FIGS. 13 through 16.

At 2610, the base station may receive, from a second transceiver node of the set of transceiver nodes, an indication to switch between rate matching states at the first transceiver. The operations of 2610 may be performed according to the methods described herein. In some examples, aspects of the operations of 2610 may be performed by a switch indication receiver as described with reference to FIGS. 13 through 16.

At 2615, the base station may switch from a first rate matching state to a second rate matching state based on receiving the indication. The operations of 2615 may be performed according to the methods described herein. In some examples, aspects of the operations of 2615 may be performed by a rate matching state switching component as described with reference to FIGS. 13 through 16.

At 2620, the base station may transmit, to the UE, a downlink shared channel transmission based on a resource configuration associated with the second rate matching state. The operations of 2620 may be performed according to the methods described herein. In some examples, aspects of the operations of 2620 may be performed by a downlink channel transmitter as described with reference to FIGS. 13 through 16.

At 2625, the base station may determine that the buffer of data has changed from empty to non-empty. The operations of 2625 may be performed according to the methods described herein. In some examples, aspects of the operations of 2625 may be performed by a buffer status determiner as described with reference to FIGS. 13 through 16.

At 2630, the base station may transmit, to the second transceiver node, a second indication to switch between rate matching states at the second transceiver node. The operations of 2630 may be performed according to the methods described herein. In some examples, aspects of the operations of 2630 may be performed by a switch indication transmitter as described with reference to FIGS. 13 through 16.

At 2635, the base station may transmit a second downlink shared channel transmission to the UE after transmitting the second indication to switch between rate matching states at the second transceiver node. The operations of 2635 may be performed according to the methods described herein. In some examples, aspects of the operations of 2635 may be performed by a downlink channel transmitter as described with reference to FIGS. 13 through 16.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications by a user equipment (UE), comprising:
    receiving, by the UE, a downlink control channel that schedules a downlink shared channel for a first transceiver node associated with a multiple downlink control information (multi-DCI) based transceiver node operation mode for the UE, the multi-DCI based transceiver node operation mode comprising a multiple transmission reception point (multi-TRP) operation mode, wherein the multi-DCI based transceiver node operation mode is associated with multiple DCIs such that a respective DCI schedules communications for a respective transceiver node of a plurality of transceiver nodes;
    receiving an indication of rate matching information for the downlink shared channel for the UE, wherein the rate matching information is based at least in part on the multi-DCI based transceiver node operation mode;
    selecting, using the rate matching information, a first antenna port mapping table from a plurality of antenna port mapping tables based at least in part on operating in the multi-TRP operation mode, the antenna port mapping table comprising a demodulation reference signal port mapping table; and
    monitoring a first set of resource elements for the downlink shared channel based at least in part on an antenna port configuration associated with the first antenna port mapping table, the first set of resource elements being different from a second set of resource elements assigned as demodulation reference signal resources for another transceiver node of the plurality of transceiver nodes.

2. The method of claim 1, further comprising:
    receiving a second downlink control channel that comprises the indication of the rate matching information, wherein the first antenna port mapping table is further identified based at least in part on the second downlink control channel.

3. The method of claim 1, wherein the demodulation reference signal port mapping table indicates a number of demodulation reference signal code division multiplexing groups and a set of demodulation reference signal port indices.

4. The method of claim 1, wherein:
    the first antenna port mapping table is associated with the multi-DCI based transceiver node operation mode; and
    a second antenna port mapping table of the plurality of antenna port mapping tables is associated with a second transceiver node operation mode different from the multi-DCI based transceiver node operation mode.

5. The method of claim 1, further comprising:
    receiving the downlink shared channel based at least in part on the monitoring, wherein the downlink shared channel is received via a third set of resource elements allocated for demodulation reference signal transmission from another transceiver node based at least in part on the antenna port configuration;
    identifying a set of demodulation reference signals and a set of demodulation reference signal port indices based at least in part on the antenna port configuration; and
    monitoring for data of the downlink shared channel via a set of resources allocated based at least in part on the antenna port configuration.

6. The method of claim 1, wherein the multi-TRP operation mode is associated with the plurality of antenna port mapping tables.

7. The method of claim 1, further comprising:
    receiving an indication of the multi-DCI based transceiver node operation mode or a change in mode operation via control signaling.

8. A method for wireless communications by a transceiver node, comprising:
    transmitting a downlink control channel that schedules a downlink shared channel associated with a multiple downlink control information (multi-DCI) based transceiver node operation mode for a user equipment (UE) in communication with the transceiver node, the multi-DCI based transceiver node operation mode comprising a multiple transmission reception point (multi-TRP) operation mode, wherein the multi-DCI based transceiver node operation mode is associated with multiple DCIs such that a respective DCI schedules communications for a respective transceiver node of a plurality of transceiver nodes;
    generating, based at least in part on the multi-TRP operation mode and on a buffer state of a second transceiver node of the plurality of transceiver nodes, rate matching information, wherein the rate matching information is associated with an antenna port configuration for the downlink shared channel for the UE;
    transmitting an indication of the rate matching information, wherein the indication of the rate matching information comprises an indication of a first antenna port mapping table identified from a plurality of antenna port mapping tables based at least in part on the antenna port configuration, the first antenna port mapping table comprising a demodulation reference signal port mapping table; and transmitting the downlink shared channel via a first set of resource elements according to the antenna port configuration and based at least in part on the rate matching information, the first set of resource elements being different from a second set of resource elements assigned as demodulation reference signal resources for another transceiver node plurality of transceiver nodes.

9. The method of claim 8, further comprising:
transmitting a second downlink control channel that comprises the indication of the rate matching information and the first antenna port mapping table.

10. The method of claim 8, wherein the demodulation reference signal port mapping table indicates a number of demodulation reference signal code division multiplexing groups and a set of demodulation reference signal port indices.

11. The method of claim 8, wherein:
the first antenna port mapping table is associated with the multi-DCI based transceiver node operation mode; and
a second antenna port mapping table of the plurality of antenna port mapping tables is associated with a second transceiver node operation mode different from the multi-DCI based transceiver node operation mode.

12. The method of claim 8, further comprising:
transmitting the downlink shared channel via a set of resources over which an associated demodulation reference signal is transmitted.

13. The method of claim 8, further comprising:
identifying a third set of resource elements allocated for demodulation reference signal transmission from another transceiver node based at least in part on the antenna port configuration; and
allocating the third set of resource elements to at least a portion of data based at least in part on the antenna port configuration and the multi-DCI based transceiver node operation mode.

14. The method of claim 13, further comprising:
identifying the third set of resource elements based at least in part on the antenna port configuration and the multi-DCI based transceiver node operation mode; or
identifying a set of demodulation reference signals and a set of demodulation reference signal port indices based at least in part on the antenna port configuration; and
transmitting the downlink shared channel based at least in part on the set of demodulation reference signals and the set of demodulation reference signal port indices.

15. The method of claim 8, wherein the multi-TRP operation mode is associated with the plurality of antenna port mapping tables.

16. A user equipment (UE) for wireless communications, comprising:
one or more memories storing processor-executable code; and
one or more processors coupled with the one or more memories and individually or collectively operable to execute the code to cause the UE to:
receive, by the UE, a downlink control channel that schedules a downlink shared channel for a first transceiver node associated with a multiple downlink control information (multi-DCI) based transceiver node operation mode for the UE, the multi-DCI based transceiver node operation mode comprising a multiple transmission reception point (multi-TRP) operation mode, wherein the multi-DCI based transceiver node operation mode is associated with multiple DCIs such that a respective DCI schedules communications for a respective transceiver node of a plurality of transceiver nodes;
receive an indication of rate matching information for the downlink shared channel for the UE, wherein the rate matching information is based at least in part on the multi-DCI based transceiver node operation mode;
select using the rate matching information, a first antenna port mapping table from a plurality of antenna port mapping tables based at least in part on operating in the multi-TRP operation mode, the antenna port mapping table comprising a demodulation reference signal port mapping table; and
monitor a first set of resource elements for the downlink shared channel based at least in part on an antenna port configuration associated with the first antenna port mapping table, the first set of resource elements being different from a second set of resource elements assigned as demodulation reference signal resources for another transceiver node of the plurality of transceiver nodes.

17. The UE of claim 16, wherein the one or more processors are individually or collectively further operable to execute the code to cause the UE to:
receive a second downlink control channel that comprises the indication of the rate matching information, wherein the first antenna port mapping table is further identified based at least in part on the second downlink control channel.

18. The UE of claim 16, wherein the demodulation reference signal port mapping table indicates a number of demodulation reference signal code division multiplexing groups and a set of demodulation reference signal port indices.

19. The UE of claim 16, wherein:
the first antenna port mapping table is associated with the multi-DCI based transceiver node operation mode; and
a second antenna port mapping table of the plurality of antenna port mapping tables is associated with a second transceiver node operation mode different from the multi-DCI based transceiver node operation mode.

20. The UE of claim 16, wherein the one or more processors are individually or collectively further operable to execute the code to cause the UE to:
receive the downlink shared channel based at least in part on the first set of resource elements being monitored for the downlink shared channel, wherein the downlink shared channel is received via a third set of resource elements allocated for demodulation reference signal transmission from another transceiver node based at least in part on the antenna port configuration;
identify a set of demodulation reference signals and a set of demodulation reference signal port indices based at least in part on the antenna port configuration; and
monitor for data of the downlink shared channel via a set of resources allocated based at least in part on the antenna port configuration.

21. The UE of claim 16, wherein the multi-TRP operation mode is associated with the plurality of antenna port mapping tables.

22. The UE of claim 16, wherein the one or more processors are individually or collectively further operable to execute the code to cause the UE to:

receive an indication of the multi-DCI based transceiver node operation mode or a change in mode operation via control signaling.

23. A transceiver node for wireless communications, comprising:
one or more memories storing processor-executable code; and
one or more processors coupled with the one or more memories and individually or collectively operable to execute the code to cause the transceiver node to:
transmit a downlink control channel that schedules a downlink shared channel associated with a multiple downlink control information (multi-DCI) based transceiver node operation mode for a user equipment (UE) in communication with the transceiver node, the multi-DCI based transceiver node operation mode comprising a multiple transmission reception point (multi-TRP) operation mode, wherein the multi-DCI based transceiver node operation mode is associated with multiple DCIs such that a respective DCI schedules communications for a respective transceiver node of a plurality of transceiver nodes;
generate, based at least in part on the multi-TRP operation mode and on a buffer state of a second transceiver node of the plurality of transceiver nodes, rate matching information, wherein the rate matching information is associated with an antenna port configuration for the downlink shared channel for the UE;
transmit an indication of the rate matching information, wherein the indication of the rate matching information comprises an indication of a first an antenna port mapping table identified from a plurality of antenna port mapping tables based at least in part on the antenna port configuration, the first antenna port mapping table comprising a demodulation reference signal port mapping table; and
transmit the downlink shared channel via a first set of resource elements according to the antenna port configuration and based at least in part on the rate matching information, the first set of resource elements being different from a second set of resource elements assigned as demodulation reference signal resources for another transceiver node of the plurality of transceiver nodes.

24. The transceiver node of claim 23 wherein the one or more processors are individually or collectively further operable to execute the code to cause the transceiver node to:
transmit a second downlink control channel that comprises the indication of the rate matching information and the first antenna port mapping table.

25. The transceiver node of claim 23 wherein the demodulation reference signal port mapping table indicates a number of demodulation reference signal code division multiplexing groups and a set of demodulation reference signal port indices.

26. The transceiver node of claim 23 wherein:
the first antenna port mapping table is associated with the multi-DCI based transceiver node operation mode; and
a second antenna port mapping table of the plurality of antenna port mapping tables is associated with a second transceiver node operation mode different from the multi-DCI based transceiver node operation mode.

* * * * *